(12) United States Patent
Umetsu et al.

(10) Patent No.: US 10,886,533 B2
(45) Date of Patent: Jan. 5, 2021

(54) NONAQUEOUS LITHIUM POWER STORAGE ELEMENT

(71) Applicant: Asahi Kasei Kabushiki Kaisha, Tokyo (JP)

(72) Inventors: Kazuteru Umetsu, Tokyo (JP); Nobuhiro Okada, Tokyo (JP); Koichi Hiraoka, Tokyo (JP); Atsushi Hosokibara, Tokyo (JP); Taku Suetomi, Tokyo (JP)

(73) Assignee: Asahi Kasei Kabushiki Kaisha, Tokyo (JP)

( * ) Notice: Subject to any disclaimer, the term of this patent is extended or adjusted under 35 U.S.C. 154(b) by 24 days.

(21) Appl. No.: 16/070,425

(22) PCT Filed: Jan. 20, 2017

(86) PCT No.: PCT/JP2017/002008
§ 371 (c)(1),
(2) Date: Jul. 16, 2018

(87) PCT Pub. No.: WO2017/126689
PCT Pub. Date: Jul. 27, 2017

(65) Prior Publication Data
US 2019/0020030 A1    Jan. 17, 2019

(30) Foreign Application Priority Data

Jan. 22, 2016 (JP) ................. 2016-010895
Aug. 8, 2016 (JP) ................. 2016-155805
(Continued)

(51) Int. Cl.
*H01M 4/58* (2010.01)
*H01M 4/02* (2006.01)
(Continued)

(52) U.S. Cl.
CPC .......... *H01M 4/5825* (2013.01); *H01G 11/06* (2013.01); *H01G 11/24* (2013.01);
(Continued)

(58) Field of Classification Search
CPC ........... H01M 4/5825; H01M 10/0525; H01M 10/0568; H01M 10/0569;
(Continued)

(56) References Cited

U.S. PATENT DOCUMENTS 5,427,875 A   6/1995  Yamamoto et al.
5,702,843 A   12/1997 Mitate et al.
(Continued)

FOREIGN PATENT DOCUMENTS

CN     101641811 A    2/2010
EP      2219247 A1    8/2010
(Continued)

OTHER PUBLICATIONS

Supplemental European Search Report issued in corresponding European Patent Application No. 17741566.8 dated Jan. 11, 2019.
(Continued)

*Primary Examiner* — Milton I Cano
*Assistant Examiner* — Christian Roldan
(74) *Attorney, Agent, or Firm* — Morgan, Lewis & Bockius LLP

(57) ABSTRACT

Provided is a nonaqueous lithium power storage element that can suppress excessive decomposition of a lithium compound remaining in a positive electrode, can suppress gas generation at high voltages, and can suppress capacity declines during high-load charge/discharge cycling. The nonaqueous lithium power storage element according to the present embodiment has a positive electrode that contains a lithium compound other than an active material, a negative electrode, a separator, and a lithium ion-containing nonaque-
(Continued)

ous electrolyte, wherein in the elemental map provided by SEM-EDX of the surface of the positive electrode, the area overlap ratio $U_1$ of the fluorine map relative to the oxygen map, as provided by binarization based on the average value of the brightness values, is 40% to 99%.

30 Claims, 5 Drawing Sheets

(30) Foreign Application Priority Data

Sep. 30, 2016 (JP) .................. 2016-192443
Sep. 30, 2016 (JP) .................. 2016-192745

(51) Int. Cl.

| | | |
|---|---|---|
| H01G 11/50 | (2013.01) | |
| H01G 11/52 | (2013.01) | |
| H01G 11/70 | (2013.01) | |
| H01M 10/0585 | (2010.01) | |
| H01G 11/38 | (2013.01) | |
| H01M 10/0567 | (2010.01) | |
| H01M 10/052 | (2010.01) | |
| H01G 11/06 | (2013.01) | |
| H01G 11/24 | (2013.01) | |
| H01M 4/1393 | (2010.01) | |
| H01G 11/58 | (2013.01) | |
| H01G 11/78 | (2013.01) | |
| H01M 10/0525 | (2010.01) | |
| H01M 10/0568 | (2010.01) | |
| H01M 10/0569 | (2010.01) | |
| H01G 11/62 | (2013.01) | |
| H01G 11/60 | (2013.01) | |
| H01G 11/26 | (2013.01) | |
| H02J 9/00 | (2006.01) | |

(52) U.S. Cl.
CPC ............ *H01G 11/38* (2013.01); *H01G 11/50* (2013.01); *H01G 11/52* (2013.01); *H01G 11/58* (2013.01); *H01G 11/70* (2013.01); *H01G 11/78* (2013.01); *H01M 4/1393* (2013.01); *H01M 10/052* (2013.01); *H01M 10/0525* (2013.01); *H01M 10/0567* (2013.01); *H01M 10/0568* (2013.01); *H01M 10/0569* (2013.01); *H01M 10/0585* (2013.01); *H01G 11/26* (2013.01); *H01G 11/60* (2013.01); *H01G 11/62* (2013.01); *H01M 2004/028* (2013.01); *H02J 9/00* (2013.01); *Y02E 60/13* (2013.01); *Y02T 10/70* (2013.01)

(58) Field of Classification Search
CPC ......... H01M 2004/028; H01M 4/1393; H01M 10/052; H01M 10/0567; H01M 10/0585; H01G 11/58; H01G 11/78; H01G 11/50; H01G 11/52; H01G 11/70; H01G 11/26; H01G 11/24; H01G 11/38; H01G 11/60; H01G 11/62; H01G 11/06; H01G 11/46; H02J 9/00; Y02T 10/7022; Y02E 60/13
USPC ......................................................... 429/94
See application file for complete search history.

(56) References Cited

U.S. PATENT DOCUMENTS

| | | |
|---|---|---|
| 5,928,812 A | 7/1999 | Xue |
| 6,294,292 B1* | 9/2001 | Tsushima ............ H01M 4/364 |
| | | 429/162 |
| 10,396,361 B2 | 8/2019 | Kamijo et al. |
| 10,403,447 B2 | 9/2019 | Umetsu et al. |
| 2004/0126659 A1* | 7/2004 | Graetz .................. H01G 9/155 |
| | | 429/218.1 |
| 2005/0233218 A1 | 10/2005 | Ogawa et al. |
| 2005/0271944 A1 | 12/2005 | Suhara et al. |
| 2006/0105242 A1 | 5/2006 | Sato et al. |
| 2006/0194114 A1 | 8/2006 | Saito |
| 2006/0209493 A1 | 9/2006 | Fujino et al. |
| 2007/0020385 A1 | 1/2007 | Naoi et al. |
| 2007/0281216 A1 | 12/2007 | Petrat et al. |
| 2008/0055819 A1 | 3/2008 | Taguchi et al. |
| 2008/0254368 A1 | 10/2008 | Ooyama et al. |
| 2010/0117031 A1 | 5/2010 | Akagi et al. |
| 2010/0255377 A1 | 10/2010 | Tsubata et al. |
| 2011/0039160 A1* | 2/2011 | Takahata ................ H01M 2/34 |
| | | 429/231.1 |
| 2011/0159382 A1 | 6/2011 | Matsui et al. |
| 2012/0094177 A1 | 4/2012 | Honoki et al. |
| 2012/0212186 A1 | 8/2012 | Fujii et al. |
| 2012/0218683 A1 | 8/2012 | Kondou et al. |
| 2013/0208405 A1 | 8/2013 | Okada et al. |
| 2013/0224608 A1 | 8/2013 | Sasaki et al. |
| 2014/0038003 A1 | 2/2014 | Tsunaki et al. |
| 2015/0162598 A1* | 6/2015 | Kim ..................... H01M 4/364 |
| | | 429/223 |
| 2015/0255781 A1* | 9/2015 | Hashimoto ............ H01G 11/24 |
| | | 429/188 |
| 2017/0200943 A1 | 7/2017 | Kawakami |
| 2017/0207459 A1 | 7/2017 | Okada et al. |

FOREIGN PATENT DOCUMENTS

| | | |
|---|---|---|
| EP | 2485303 A1 | 8/2012 |
| JP | H04-328278 A | 11/1992 |
| JP | H05-343066 A | 12/1993 |
| JP | 2001-126718 A | 5/2001 |
| JP | 2001-167767 A | 6/2001 |
| JP | 2004-095188 A | 3/2004 |
| JP | 2005-197174 A | 7/2005 |
| JP | 2007-035770 A | 2/2007 |
| JP | 2008-171593 A | 7/2008 |
| JP | 2008-177263 A | 7/2008 |
| JP | 2008-181830 A | 8/2008 |
| JP | 2008-251434 A | 10/2008 |
| JP | 2010-205827 A | 9/2010 |
| JP | 2010-225291 A | 10/2010 |
| JP | 2010-232469 A | 10/2010 |
| JP | 2011-249507 A | 12/2011 |
| JP | 2012-074467 A | 4/2012 |
| JP | 2012-174437 A | 9/2012 |
| JP | 2014-143380 A | 8/2014 |
| JP | 2014-146448 A | 8/2014 |
| JP | 2015-072867 A | 4/2015 |
| JP | 2015-092478 A | 5/2015 |
| WO | 2011/058748 A1 | 5/2011 |
| WO | 2011/080988 A1 | 7/2011 |
| WO | 2012/070397 A1 | 5/2012 |
| WO | 2012/081348 A1 | 6/2012 |
| WO | 2012/143995 A1 | 10/2012 |
| WO | 2016/006632 A1 | 1/2016 |
| WO | 2016/010056 A1 | 1/2016 |

OTHER PUBLICATIONS

Supplemental European Search Report issued in related European Patent Application No. 17741564.3 dated Nov. 23, 2018.
Barrett et al., "The Determination of Pore Volume and Area Distributions in Porous Substances: I. Computations from Nitrogen Isotherms," The Journal of the American Chemical Society, 73: 373-380 (1951).
Lippens et al., "Studies on Pore Systems in Catalysts: V. The t Method," Journal of Catalysis, 4: 319-323 (1965).
Mikhail et al., "Investigations of a Complete Pore Structure Analysis: I. Analysis of Micropores," Journal of Colloid and Interface Science, 26: 45-53 (1968).

(56) References Cited

OTHER PUBLICATIONS

International Search Report issued in corresponding International Patent Application No. PCT/JP2017/002008 dated Apr. 18, 2017.
International Preliminary Report on Patentability and Written Opinion issued in corresponding International Patent Application No. PCT/JP2017/002008 dated Aug. 2, 2018.
Decision to Grant issued in corresponding Japanese Patent Application No. 2017-509051 dated Nov. 7, 2017.
Liu et al., "Surface phenomena of high energy Li(Ni1/3Co1/3Mn1/3)O2/graphite cells at high temperature and high cutoff voltages," Journal of Power Sources, 269: 920-926 (2014).
Nanda et al., "Local State-of-Charge Mapping of Lithium-Ion Battery Electrodes," Advanced Functional Materials, 21: 3282-3290 (2011).

* cited by examiner

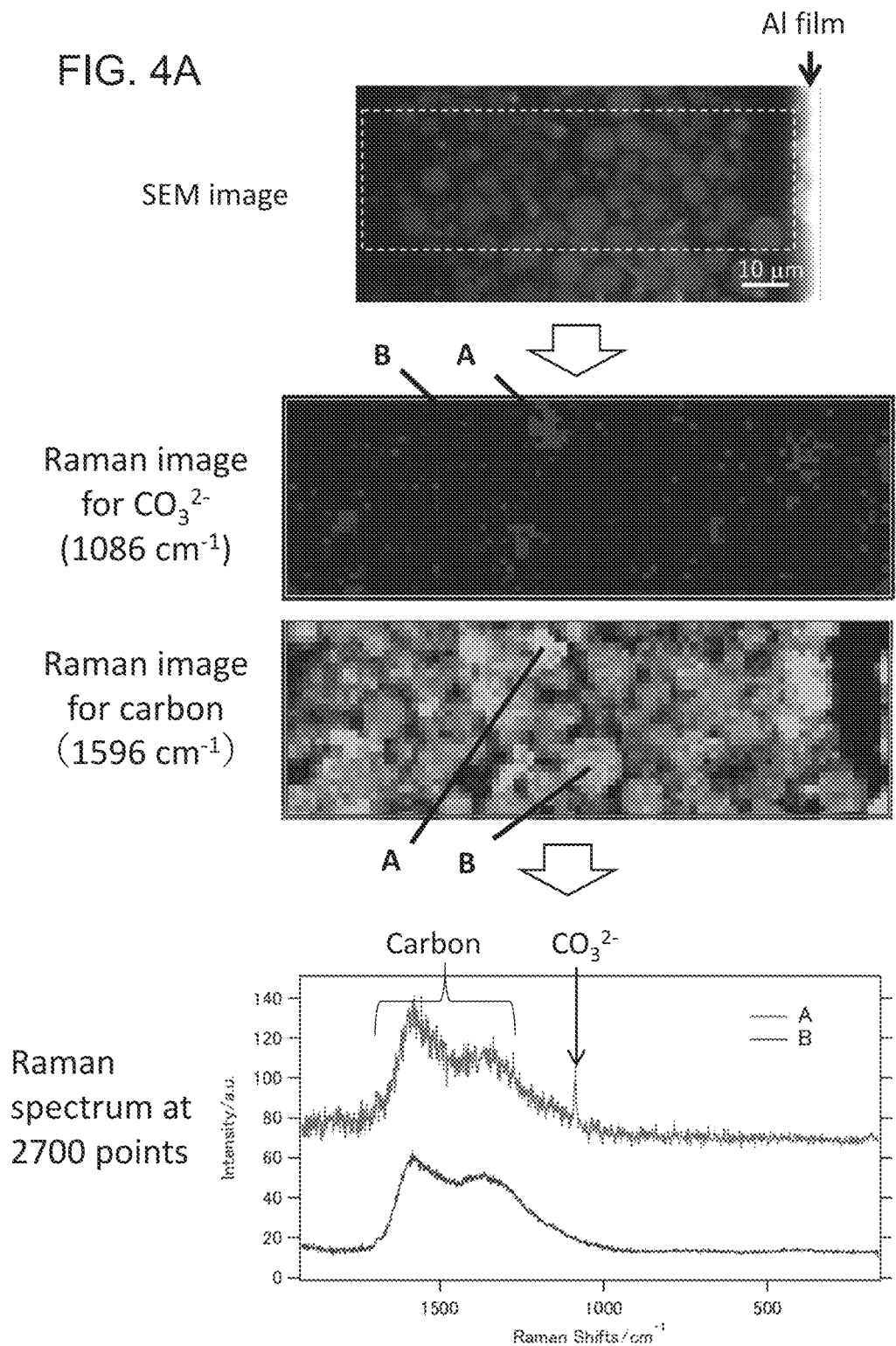

Set a baseline from 1071 cm$^{-1}$ to 1104 cm$^{-1}$

Histogram for peak areas of $CO_3^{2-}$ based on area exceeding the baseline

Histogram for peak area of $CO_3^{2-}$ with noise component subtracted

NONAQUEOUS LITHIUM POWER STORAGE ELEMENT

FIELD

The present invention relates to a nonaqueous lithium power storage element.

BACKGROUND

In recent years, with an aim toward effective utilization of energy for greater environmental conservation and reduced usage of resources, a great deal of attention is being directed to power smoothing systems for wind power generation or overnight charging electric power storage systems, household dispersive power storage systems based on solar power generation technology, and power storage systems for electric vehicles and the like.

The number one requirement for cells used in such power storage systems is high energy density. The development of lithium ion batteries is therefore advancing at a rapid pace, as an effective strategy for cells with high energy density that can meet this requirement.

The second requirement is a high output characteristic. A high power discharge characteristic is required for a power storage system during acceleration in, for example, a combination of a high efficiency engine and a power storage system (such as in a hybrid electric vehicle), or a combination of a fuel cell and a power storage system (such as in a fuel cell electric vehicle).

Electrical double layer capacitors and nickel hydrogen cells are currently under development as high output power storage devices.

Electrical double layer capacitors that employ activated carbon in the electrodes have output characteristics of about 0.5 to 1 kW/L. Such electrical double layer capacitors have high durability (cycle characteristics and high-temperature storage characteristics), and have been considered optimal devices in fields where high output is required. However, their energy densities are no more than about 1 to 5 Wh/L. A need therefore exists for even higher energy density.

On the other hand, nickel hydrogen batteries employed in existing hybrid electric vehicles exhibit high output equivalent to electrical double layer capacitors, and have energy densities of about 160 Wh/L. Still, research is being actively pursued toward further increasing their energy density and output, and increasing their durability (especially stability at high temperatures).

Research is also advancing toward increased outputs for lithium ion batteries as well. For example, lithium ion batteries are being developed that yield high output exceeding 3 kW/L at 50% depth of discharge (a value representing the state of the percentage of discharge of the service capacity of a power storage element). However, the energy density is 100 Wh/L or less, and the design is such that high energy density, as the major feature of a lithium ion battery, is reduced. Also, the durability (especially cycle characteristic and high-temperature storage characteristic) is inferior to that of an electrical double layer capacitor. In order to provide practical durability, therefore, these are used with a depth of discharge in a narrower range than 0 to 100%. Because the usable capacity is even lower, research is actively being pursued toward further increasing durability.

There is a strong demand for implementation of power storage elements exhibiting high energy density, high output characteristics and durability, as mentioned above. Nevertheless, the existing power storage elements mentioned above have their advantages and disadvantages. New power storage elements are therefore desired that can meet these technical requirements. Promising candidates are power storage elements known as lithium ion capacitors, which are being actively developed in recent years.

A lithium ion capacitor is a type of power storage element using a nonaqueous electrolytic solution comprising a lithium salt (or, "nonaqueous lithium power storage element"), wherein charge/discharge is accomplished by: non-Faraday reaction by adsorption/desorption of anions similar to an electrical double layer capacitor at about 3 V or higher, at the positive electrode; and Faraday reaction by intercalation/release of lithium ions similar to a lithium ion battery, at the negative electrode.

To summarize these electrode materials and their characteristics: when charge/discharge is carried out using a material such as activated carbon as an electrode, by adsorption and desorption of ions on the activated carbon surface (non-Faraday reaction), it is possible to obtain high output and high durability, but with lower energy density (for example, 1×). On the other hand, when charge/discharge is carried out by Faraday reaction using an oxide or carbon material as the electrode, the energy density is higher (for example, 10 times that of non-Faraday reaction using activated carbon), but then durability and output characteristic become issues.

Electrical double layer capacitors that combine these electrode materials employ activated carbon as the positive electrode and negative electrode (energy density: 1×), and carry out charge/discharge by non-Faraday reaction at both the positive and negative electrodes, and are characterized by having high output and high durability, but also low energy density (positive electrode: 1×∗negative electrode: 1×=1).

Lithium ion secondary batteries use a lithium transition metal oxide (energy density: 10×) for the positive electrode and a carbon material (energy density: 10×) for the negative electrode, carrying out charge/discharge by Faraday reaction at both the positive and negative electrodes, but while their energy density is high (positive electrode: 10×∗negative electrode: 10×=100), they have issues in terms of output characteristic and durability. In addition, the depth of discharge must be restricted in order to satisfy the high durability required for hybrid electric vehicles, and with lithium ion secondary batteries only 10 to 50% of the energy can be utilized.

A lithium ion capacitor is a new type of asymmetric capacitor that employs activated carbon (energy density: 1×) for the positive electrode and a carbon material (energy density: 10×) for the negative electrode, and it is characterized by carrying out charge/discharge by non-Faraday reaction at the positive electrode and Faraday reaction at the negative electrode, and thus having the characteristics of both an electrical double layer capacitor and a lithium ion secondary battery. It also exhibits high output and high durability, while also having high energy density (positive electrode: 1×∗negative electrode: 10×=10) and requiring no restrictions on depth of discharge as with a lithium ion secondary battery.

The purposes for which lithium ion capacitors are used may be electricity storage for, for example, railways, construction machines and automobiles. For such uses, it is necessary for the capacitors used to have an excellent input/output characteristic because of the harsh operating environments, while high safety and a high load charge/discharge cycle characteristic are also simultaneously required.

Much research is being carried out in regard to positive electrodes for the power storage elements mentioned above (especially lithium ion secondary batteries).

In PTL 1 there is proposed a lithium ion secondary battery using a positive electrode containing lithium carbonate in the positive electrode, and having a current shielding mechanism that operates in response to increased internal pressure in the battery. In PTL 2 there is proposed a lithium ion secondary battery employing a lithium complex oxide such as lithium manganate as the positive electrode, and with reduced elution of manganese by including lithium carbonate in the positive electrode. In PTL 3 there is proposed a method of causing restoration of the capacitance of a deteriorated power storage element by oxidizing different lithium compounds as coated oxides at the positive electrode.

With these methods, however, there have been problems of increased resistance due to decomposition of residual lithium compounds in the positive electrode, and reduced energy density, while further room for improvement also exists in terms of the high load charge/discharge characteristic.

In PTL 4 there is proposed a lithium ion capacitor having an electrode body housed in a metal casing. Also, PTL 5 proposes a secondary battery having a degassing valve that can control the internal pressure of the container, mounted on a metal casing.

In most batteries, however, a nonaqueous electrolytic solution is used, and inorganic deposits such as LiF formed by reduction reaction on the surface of the negative electrode form a coating film. Inorganic deposits such as LiF react with the lithium ion in the negative electrode active material layer when the positive electrode is exposed to high potential, forming active products of fluorine ions and the like (such as HF, for example). Consequently, reaction takes place with HF on the inner sides of the metal casing and the degassing valve, sometimes resulting in leakage and causing concerns regarding the safety of the power storage element.

CITATION LIST

Patent Literature

[PTL 1] Japanese Unexamined Patent Publication HEI No. 4-328278
[PTL 2] Japanese Unexamined Patent Publication No. 2001-167767
[PTL 3] Japanese Unexamined Patent Publication No. 2012-174437
[PTL 4] International Patent Publication No. WO2012/143995
[PTL 5] International Patent Publication No. WO2011/080988

Non-Patent Literature

[NPL 1] E. P. Barrett, L. G. Joyner and P. Halenda, J. Am. Chem. Soc., 73, 373(1951)
[NPL 2] B. C. Lippens, J. H. de Boer, J. Catalysis, 4319 (1965)
[NPL 3] R. S. Mikhail, S. Brunauer, E. E. Bodor, J. Colloid Interface Sci., 26, 45 (1968)

SUMMARY

Technical Problem

The present invention has been devised in light of the existing situation as described above.

One problem to be solved by the invention is to suppress excessive decomposition of lithium compounds remaining in the positive electrode, to suppress gas generation under high voltage, and to suppress reduction in capacitance during high load charge/discharge cycling. According to a second embodiment, one problem to be solved by the invention is to obtain high output, to suppress thermal runaway during overcharge, to suppress increase in resistance during high load charge/discharge cycling, and to suppress gas generation under high voltage. According to a third embodiment, wherein the electrode body is housed in a metal casing and has at least one valve capable of controlling the pressure in the casing to a low pressure, one problem to be solved by the invention is to exhibit a high input/output characteristic while simultaneously providing high safety and a high load charge/discharge cycle characteristic.

Solution to Problem

The aforementioned problem is solved by the following technical means.

Specifically, the present invention provides the following.
[1]
A nonaqueous lithium power storage element having a positive electrode that contains a lithium compound other than an active material, a negative electrode, a separator, and a lithium ion-containing nonaqueous electrolytic solution, wherein in elemental mapping obtained by SEM-EDX of the positive electrode surface, the area overlap ratio $U_1$ of fluorine mapping relative to oxygen mapping, as binarized based on the average value of brightness, is 40% to 99%.
[2]
The nonaqueous lithium power storage element according to [1], wherein the area overlap ratio $U_2$ of fluorine mapping relative to oxygen mapping, as binarized based on the average value of brightness, is 10% to 60%, in element mapping of the BIB-processed positive electrode cross-section by SEM-EDX.
[3]
The nonaqueous lithium power storage element according to [1] or [2], wherein power collectors of the positive electrode and the negative electrode are metal foils without through-holes.
[4]
The nonaqueous lithium power storage element according to any one of [1] to [3], wherein the lithium compound is at least one selected from among lithium carbonate, lithium hydroxide and lithium oxide.
[5]
The nonaqueous lithium power storage element according to any one of [1] to [4], wherein the amount of lithium compound in the positive electrode is 1 weight % to 50 weight %.
[6]
The nonaqueous lithium power storage element according to any one of [1] to [5], wherein, in an image obtained by microscopic Raman spectroscopy of a cross-section of the positive electrode, the area ratio S of carbonate ion mapping of the cross-sectional area is 1% to 50%.
[7]
The nonaqueous lithium power storage element according to any one of [1] to [6], wherein the lithium compound is lithium carbonate.

[8]

A nonaqueous lithium power storage element according to any one of [1] to [7], which is a nonaqueous lithium power storage element comprising:

an electrode laminated body or wound electrode comprising the positive electrode that contains a lithium compound other than the active material, the negative electrode and the separator, and having the positive electrode and the negative electrode laminated or wound across the separator; and the lithium ion-containing nonaqueous electrolytic solution;

wherein at least one of the positive electrodes contains a nonporous positive electrode power collector and has the active material coated on both sides of the nonporous positive electrode power collector, at least one of the negative electrodes contains a nonporous negative electrode power collector and has a negative electrode active material capable of intercalating and releasing lithium ions coated on both sides of the nonporous negative electrode power collector, in the electrode laminated body or wound electrode, at least one of the negative electrodes faces at least two of the positive electrodes, the electrode laminated body or wound electrode contains the positive electrode as at least one outermost layer, the positive electrode of the outermost layer having a positive electrode active material layer $C_x$ side that does not face a negative electrode, $C_{x1}$ is 5.0 to 25.0, where $C_{x1}$ (g/m$^2$) is the amount of carbonate per area contained on the $C_x$ side, and $C_{y1}$ is 0.1 to 15.0 and $C_{x1} > C_{y1}$, where the $C_y$ side is the positive electrode active material layer on the back side of the $C_x$ side and $C_{y1}$ (g/m$^2$) is the amount of carbonate per area contained on the $C_y$ side.

[9]

The nonaqueous lithium power storage element according to [8], wherein $C_{x2}/C_{y2}$ is 0.86 to 1.14, where $C_{x2}$ (g/m$^2$) is the amount of active material per area contained on the $C_x$ side, and $C_{y2}$ (g/m$^2$) is the amount of active material per area contained on the $C_y$ side.

[10]

The nonaqueous lithium power storage element according to [8] or [9], wherein the lithium compound is lithium carbonate, and in an image obtained by microscopic Raman spectroscopy of the $C_x$ side, $S_x$ is 10 to 50, where $S_x$ % is the area ratio of carbonate ion mapping.

[11]

The nonaqueous lithium power storage element according to [10], wherein the lithium compound is lithium carbonate, and in an image obtained by microscopic Raman spectroscopy of the $C_y$ side, $S_y$ is 1 to 40 and $S_y < S_x$, where $S_y$ % is the area ratio of carbonate ion mapping.

[12]

The nonaqueous lithium power storage element according to any one of [8] to [11], wherein the $C_y$ side contains one or more compounds represented by the following formulas (1) to (3):

   formula (1)

{where R$^1$ is an alkylene group of 1 to 4 carbon atoms or a halogenated alkylene group of 1 to 4 carbon atoms, and X$^1$ and X$^2$ respectively and independently represent —(COO)$_n$ (where n is 0 or 1)},

   formula (2)

{where R$^1$ is an alkylene group of 1 to 4 carbon atoms or a halogenated alkylene group of 1 to 4 carbon atoms, R$^2$ is hydrogen, an alkyl group of 1 to 10 carbon atoms, a mono- or polyhydroxyalkyl group of 1 to 10 carbon atoms, an alkenyl group of 2 to 10 carbon atoms, a mono- or polyhydroxyalkenyl group of 2 to 10 carbon atoms, a cycloalkyl group of 3 to 6 carbon atoms, or an aryl group, and X$^1$ and X$^2$ respectively and independently represent —(COO)$_n$ (where n is 0 or 1)}, and

   formula (3)

{where R$^1$ is an alkylene group of 1 to 4 carbon atoms or a halogenated alkylene group of 1 to 4 carbon atoms, R$^2$ and R$^3$ respectively and independently represent hydrogen, an alkyl group of 1 to 10 carbon atoms, a polyhydroxyalkyl group of 1 to 10 carbon atoms, an alkenyl group of 2 to 10 carbon atoms, a mono- or polyhydroxyalkenyl group of 2 to 10 carbon atoms, a cycloalkyl group of 3 to 6 carbon atoms or an aryl group, and X$^1$ and X$^2$ respectively and independently represent —(COO)$_n$ (where n is 0 or 1)}, and $C_{y3}$ is $1.60 \times 10^{-4}$ to $300 \times 10^4$, where $C_{y3}$ (mol/g) is the total content of the compound represented by formulas (1) to (3) per unit weight on the $C_y$ side.

The nonaqueous lithium power storage element according to [12], wherein $C_{y3}/A_{y3}$ is 0.2 to 20, where $A_{y3}$ (mol/g) is the total content of the compound represented by formulas (1) to (3) on the $A_y$ side of the negative electrode active material layer that faces the $C_y$ side.

[14]

The nonaqueous lithium power storage element according to any one of [1] to [13], comprising an electrode laminated body or wound electrode having the positive electrode and the negative electrode laminated or wound across the separator, and the lithium ion-containing nonaqueous electrolytic solution, in a metal casing, wherein the casing has at least one valve capable of controlling the pressure in the casing, the positive electrode has the positive electrode power collector and a positive electrode active material layer on one or both sides of the positive electrode power collector, and contains a lithium compound in an amount of 1 weight % to 50 weight % based on the total weight of the positive electrode active material layer, the positive electrode active material layer comprising a positive electrode active material containing activated carbon, the negative electrode has a negative electrode power collector and a negative electrode active material layer on one or both sides of the negative electrode power collector, the negative electrode active material layer comprises a negative electrode active material that can intercalate and release lithium ions, and 0.1 μm ≤ $G_1$ ≤ 10 μm, where $G_1$ is the mean particle diameter of the lithium compound, and 2 μm ≤ $H_1$ ≤ 20 μm and $G_1 \leq H_1$, where $H_1$ is the mean particle diameter of the positive electrode active material.

[15]

The nonaqueous lithium power storage element according to [14], wherein the metal casing is rectilinear.

[16]

The nonaqueous lithium power storage element according to [14], wherein the metal casing is cylindrical.

[17]

The nonaqueous lithium power storage element according to any one of [14] to [16], wherein the nonaqueous electrolyte solution comprises at least one organic solvent selected from the group consisting of ethylene carbonate, propylene carbonate, butylene carbonate, vinylene carbonate and fluoroethylene carbonate.

[18]

The nonaqueous lithium power storage element according to any one of [14] to [17], wherein the nonaqueous electrolytic solution contains at least one from among $LiPF_6$ and $LiBF_4$.

[19]

The nonaqueous lithium power storage element according to any one of [14] to [18], wherein the concentration of $LiN(SO_2F)_2$ in the nonaqueous electrolytic solution is 0.3 mol/L to 1.5 mol/L based on the total amount of the nonaqueous electrolytic solution.

[20]

The nonaqueous lithium power storage element according to any one of [14] to [19], wherein the value of fluorine atoms (atomic %) divided by carbon atoms (atomic %), calculated from the relative element concentration of atoms obtained by XPS (X-ray photoelectron spectroscopy) measurement of the separator surface, is $1.0 \times 10^{-2}$ to $10 \times 10^{-2}$.

[21]

The nonaqueous lithium power storage element according to any one of [14] to [20], wherein in SEM observation of the surface of the separator, the number of particulates of 50 nm to 500 nm on the separator surface is $1.5/\mu m^2$ to $15/\mu m^2$.

[22]

The nonaqueous lithium power storage element according to any one of [1] to [21], wherein the positive electrode has the positive electrode power collector and the positive electrode active material layer containing the positive electrode active material, formed on one or both sides of the positive electrode power collector, and the positive electrode active material in the positive electrode active material layer is activated carbon satisfying $0.3<V_1\leq 0.8$ and $0.5\leq V_2\leq 1.0$, where $V_1$ (cc/g) is the mesopore volume due to pores with diameters of 20 Å to 500 Å as calculated by the BJH method, and $V_2$ (cc/g) is the micropore volume due to pores with diameters of smaller than 20 Å as calculated by the MP method, and has a specific surface area of 1,500 $m^2$/g to 3,000 $m^2$/g, as measured by the BET method.

[23]

The nonaqueous lithium power storage element according to any one of [1] to [21], wherein the positive electrode active material in the positive electrode active material layer is activated carbon in which the mesopore volume due to pores with diameters of 20 Å to 500 Å as calculated by the BJH method $V_1$ (cc/g) satisfies $0.8<V_1\leq 2.5$, the micropore volume due to pores with diameters of smaller than 20 Å as calculated by the MP method $V_2$ (cc/g) satisfies $0.8<V_2\leq 3.0$, and the specific surface area as measured by the BET method is 2,300 $m^2$/g to 4,000 $m^2$/g.

[24]

The nonaqueous lithium power storage element according to any one of [1] to [23], wherein the negative electrode contains a negative electrode active material, and the doping amount of lithium ion in the negative electrode active material is 530 mAh/g to 2,500 mAh/g per unit weight.

[25]

The nonaqueous lithium power storage element according to any one of [1] to [24], wherein the BET specific surface area of the negative electrode active material is 100 $m^2$/g to 1,500 $m^2$/g.

[26]

The nonaqueous lithium power storage element according to any one of [1] to [23], wherein the negative electrode contains a negative electrode active material, and the doping amount of lithium ion in the negative electrode active material is 50 mAh/g to 700 mAh/g per unit weight.

[27]

The nonaqueous lithium power storage element according to any one of [1] to [23] and [26], wherein the BET specific surface area of the negative electrode active material is 1 $m^2$/g to 50 $m^2$/g.

[28]

The nonaqueous lithium power storage element according to any one of [1] to [23], [26] and [27], wherein the mean particle diameter of the negative electrode active material is 1 μm to 10 μm.

[29]

A power storage module employing a nonaqueous lithium power storage element according to any one of [1] to [28].

[30]

A power regenerating system employing a nonaqueous lithium power storage element according to any one of [1] to [29].

[31]

A power load-leveling system employing a nonaqueous lithium power storage element according to any one of [1] to [29].

[32]

An uninterruptable power source system employing a nonaqueous lithium power storage element according to any one of [1] to [29].

[33]

A non-contact power supply system employing a nonaqueous lithium power storage element according to any one of [1] to [29].

[34]

An energy harvesting system employing a nonaqueous lithium power storage element according to any one of [1] to [29].

[35]

A power storage system employing a nonaqueous lithium power storage element according to any one of [1] to [29].

Advantageous Effects of Invention

According to the invention, with its first embodiment, there is provided a nonaqueous lithium power storage element in which excessive decomposition of lithium compound remaining in the positive electrode is suppressed, gas generation under high voltage is suppressed, and reduced capacitance during high load charge/discharge cycling is suppressed. With its second embodiment, there is provided a nonaqueous lithium power storage element having high output, wherein thermal runaway during overcharge is suppressed, increase in resistance during high load charge/discharge cycling is suppressed, and gas generation under high voltage is suppressed. With the third embodiment, there is provided a nonaqueous lithium power storage element wherein an electrode body is housed in a metal casing and has at least one valve capable of controlling the pressure in the casing to a low pressure, whereby it is possible to exhibit a high input/output characteristic while simultaneously providing high safety and a high load charge/discharge cycle characteristic.

BRIEF DESCRIPTION OF DRAWINGS

FIGS. 4A and 4B show SEM and Raman images and graphs used in the analysis and calculation of S, $S_x$ and $S_y$.

DESCRIPTION OF EMBODIMENTS

Figure 1:
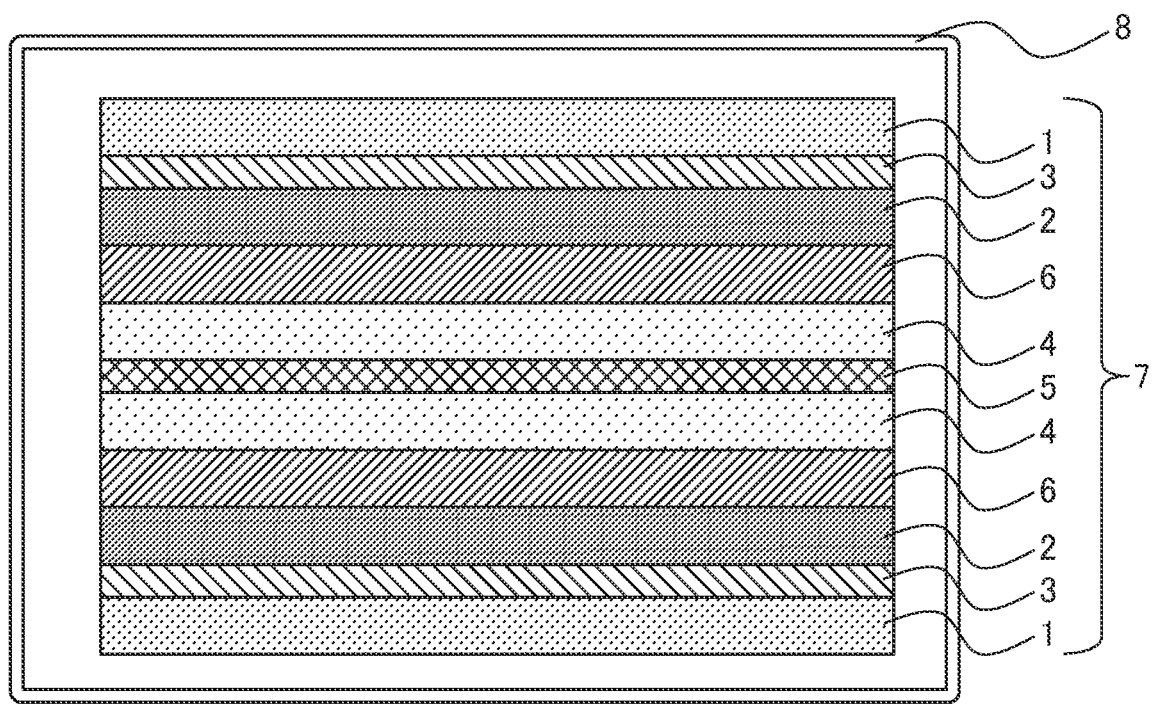
FIG. 1 is a cross-sectional schematic drawing of a nonaqueous lithium power storage element according to the second embodiment of the invention, in the direction of thickness.
Figure 2:
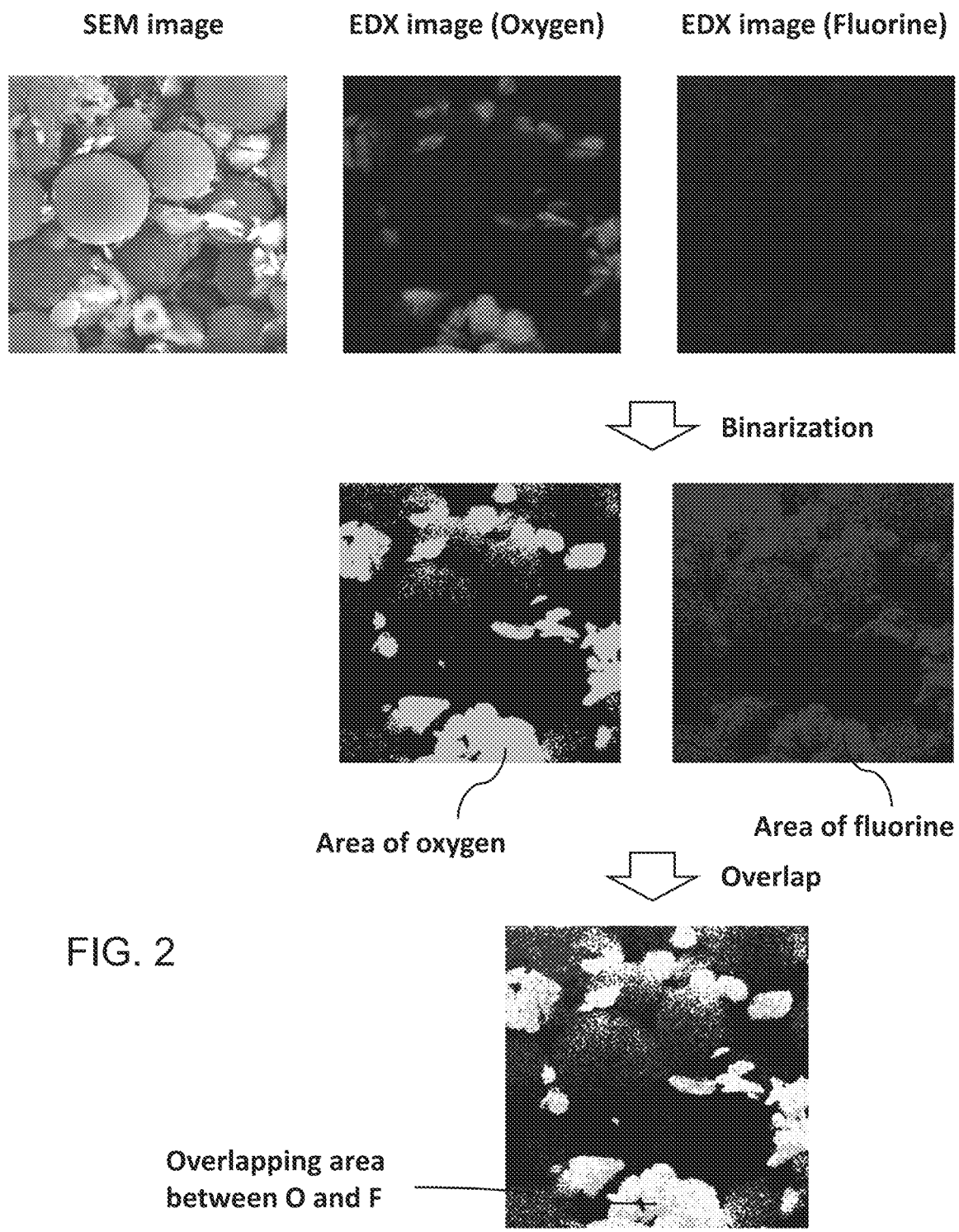
FIG. 2 shows SEM and EDX images and the method of determining area overlapping ratio $U_1$ of fluorine mapping relative to oxygen mapping.
Figure 3:
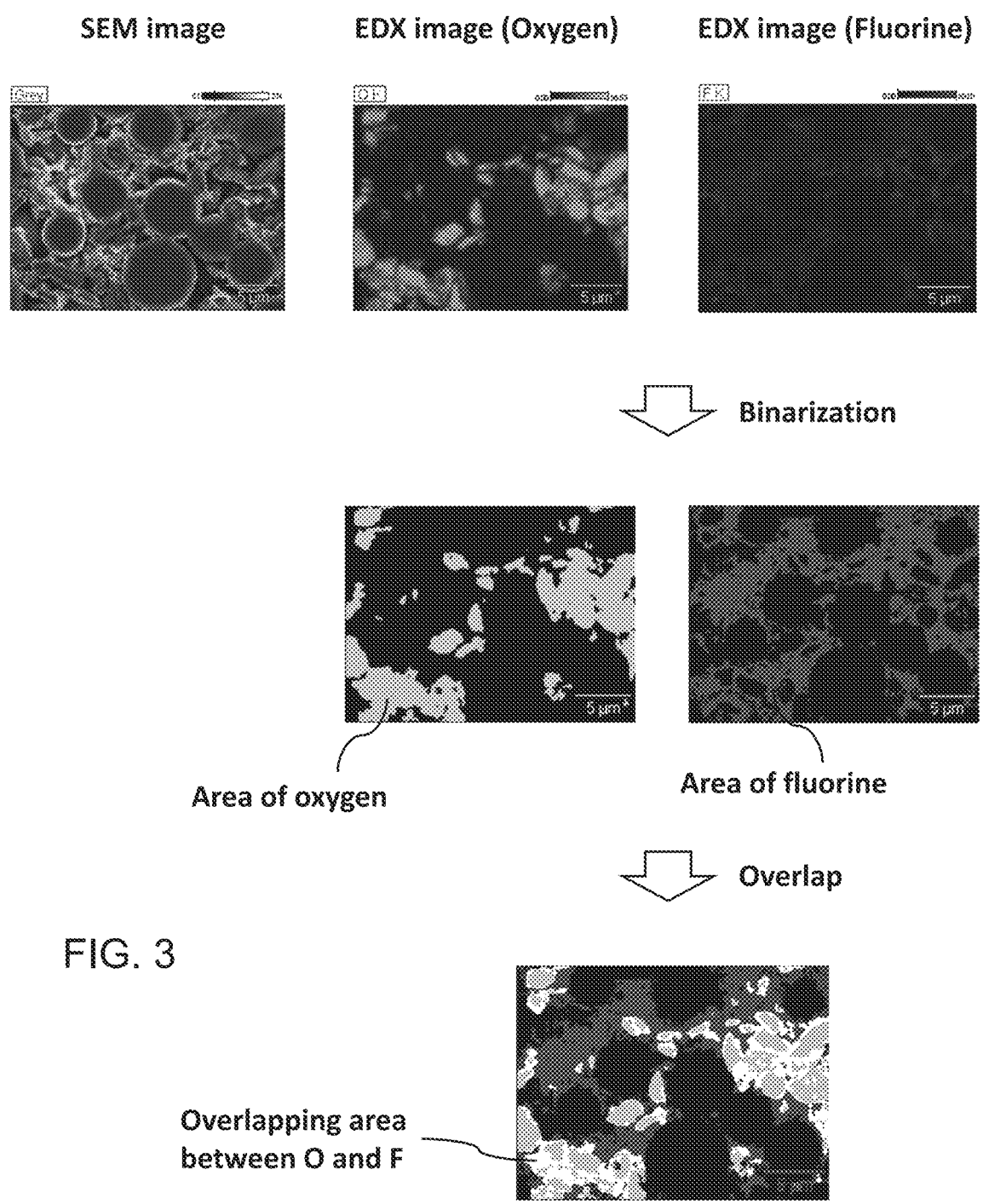
FIG. 3 shows SEM and EDX images and the method of determining area overlapping ratio $U_2$ of fluorine mapping relative to oxygen mapping.
Figure 4B:
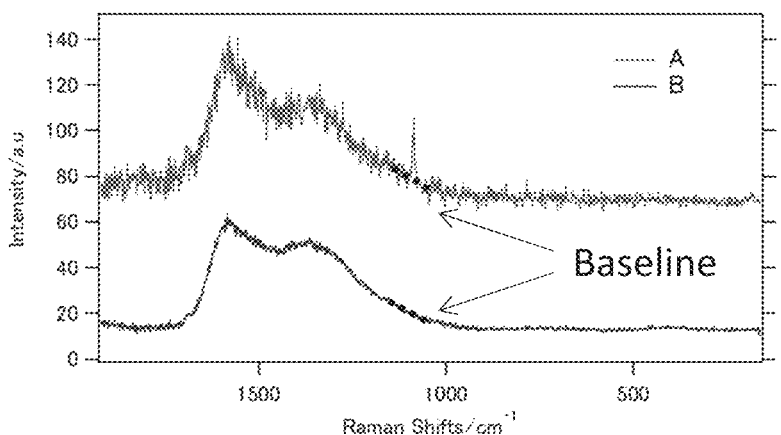
Figure 4B:
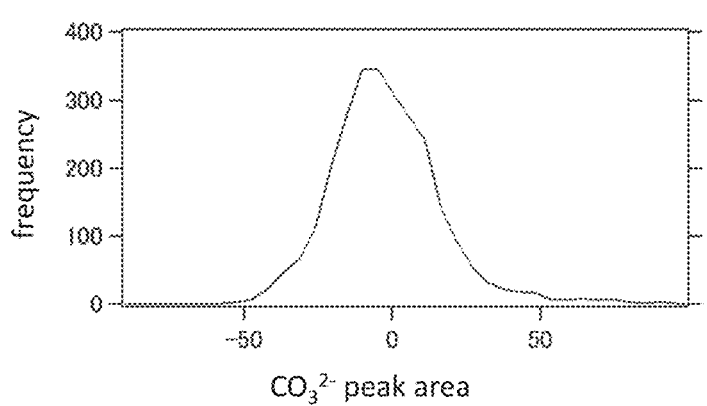
Figure 4B:
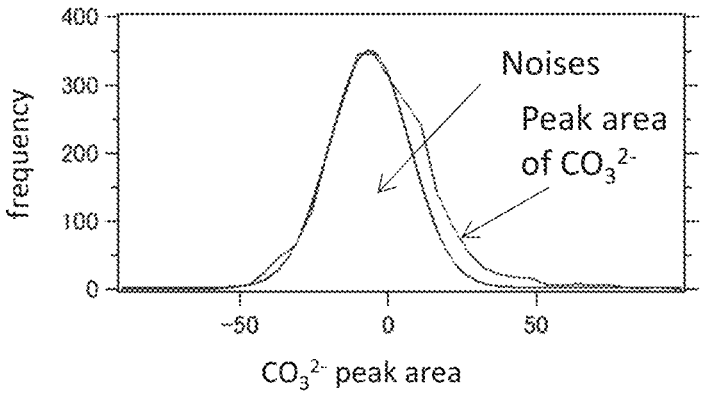

Embodiments of the invention (hereunder referred to as "first embodiment", "second embodiment", "third embodiment", etc., and hereunder collectively referred to as "this embodiment") will now be explained in detail as examples, with the understanding that the invention is not limited to these embodiments. The upper limits and lower limits for the numerical ranges for this embodiment may be combined as desired to constitute any desired numerical ranges.

A nonaqueous lithium power storage element generally comprises a positive electrode, a negative electrode, a separator and an electrolytic solution, as the major constituent elements. The electrolytic solution used is an organic solvent containing lithium ions (hereunder also referred to as "nonaqueous electrolytic solution").

The nonaqueous lithium power storage element of the first embodiment is a nonaqueous lithium power storage element that has a positive electrode containing a lithium compound other than an active material, a negative electrode, a separator, and a lithium ion-containing nonaqueous electrolytic solution, wherein in elemental mapping obtained by SEM-EDX of the positive electrode surface, the area overlap ratio $U_1$ of fluorine mapping relative to oxygen mapping, as binarized based on the average value of brightness, is 40% to 99%.

The nonaqueous lithium power storage element of the second embodiment is a nonaqueous lithium power storage element comprising:

an electrode laminated body or wound electrode comprising a positive electrode that contains a lithium compound other than an active material, a negative electrode and a separator, and having the positive electrode and the negative electrode laminated or wound across a separator; and a lithium ion-containing nonaqueous electrolytic solution;

wherein, in elemental mapping obtained by SEM-EDX of the positive electrode surface, the area overlap ratio $U_1$ of fluorine mapping relative to oxygen mapping, as binarized based on the average value of brightness, is 40% to 99%, at least one of the positive electrodes contains a nonporous positive electrode power collector and has an active material coated on both sides of the nonporous positive electrode power collector, at least one of the negative electrodes contains a nonporous negative electrode power collector and has a negative electrode active material capable of intercalating and releasing lithium ions coated on both sides of the nonporous negative electrode power collector, in the electrode laminated body or wound electrode, at least one of the negative electrodes faces at least two of the positive electrodes, the electrode laminated body or wound electrode contains the positive electrode as at least one outermost layer, the positive electrode of the outermost layer having a positive electrode active material layer $C_x$ side that does not face a negative electrode, $C_{x1}$ is 5.0 to 25.0, where $C_{x1}$ (g/m$^2$) is the amount of carbonate per area contained on the $C_x$ side, and $C_{y1}$ is 0.1 to 15.0 and $C_{x1} > C_{y1}$, where the $C_y$ side is the positive electrode active material layer on the back side of the $C_x$ side and $C_{y1}$ (g/m$^2$) is the amount of carbonate per area contained on the $C_y$ side.

The nonaqueous lithium power storage element of the third embodiment is a nonaqueous lithium power storage element comprising:

an electrode laminated body or wound electrode having a positive electrode that contains a lithium compound other than an active material, and a negative electrode, laminated or wound across a separator; and a lithium ion-containing nonaqueous electrolytic solution; in a metal casing, wherein in elemental mapping obtained by SEM-EDX of the positive electrode surface, the area overlap ratio $U_1$ of fluorine mapping relative to oxygen mapping, as binarized based on the average value of brightness, is 40% to 99%, the casing has at least one valve capable of controlling the pressure in the casing, the positive electrode has a positive electrode power collector and a positive electrode active material layer on one or both sides of the positive electrode power collector, and contains a lithium compound in an amount of 1 weight % to 50 weight % based on the total weight of the positive electrode active material layer, the positive electrode active material layer comprising a positive electrode active material containing activated carbon, the negative electrode has a negative electrode power collector and a negative electrode active material layer on one or both sides of the negative electrode power collector, the negative electrode active material layer comprises a negative electrode active material that can intercalate and release lithium ions, and 0.1 μm≤$G_1$≤10 μm, where $G_1$ is the mean particle diameter of the lithium compound, and 2 μm≤$H_1$≤20 μm and $G_1$<$H_1$, where $H_1$ is the mean particle diameter of the positive electrode active material.

FIG. 1 is a cross-sectional schematic drawing of a nonaqueous lithium power storage element according to the second embodiment, in the direction of thickness. An electrode laminated body (7) or wound electrode (not shown) comprising a positive electrode and negative electrode laminated or wound across a separator (6) is housed in the external body (8) of the nonaqueous lithium power storage element according to the second embodiment.

The electrode laminated body (7) or wound electrode (not shown) is constructed in such a manner that one positive electrode faces one side of one negative electrode, and another positive electrode faces the other side of the same negative electrode.

At least one positive electrode comprises a nonporous positive electrode power collector (3), and has an active material coated onto both sides of the nonporous positive electrode power collector (3). At least one of the outermost layers of the electrode laminated body (7) is a positive electrode, the positive electrode serving as the outermost layer having a positive electrode active material layer $C_x$ side (1) that does not face a negative electrode. In the case of a wound electrode (not shown), the positive electrode active material layer $C_x$ side (1) is the exposed side of the wound body, and a side that does not face a negative electrode. Also, the side opposite the $C_x$ side of the positive electrode (the "back side" of the positive electrode) is the positive electrode active material layer $C_y$ side (2).

At least one negative electrode comprises a nonporous negative electrode power collector (5), and has a negative electrode active material capable of intercalating and releasing lithium ions, coated onto both sides of the nonporous negative electrode power collector (5). The negative electrode active material layer $A_y$ side (4) of the negative electrode faces the positive electrode active material layer $C_y$ side (2), optionally across a separator (6).

<Positive Electrode>

According to this embodiment, the positive electrode has a positive electrode power collector, and a positive electrode active material layer situated on one or both sides thereof. At least one of the positive electrodes of the second embodiment has a nonporous positive electrode power collector and a positive electrode active material layer containing a positive electrode active material, formed on both sides thereof.

Throughout the present specification, "nonporous positive electrode power collector" means a positive electrode power collector that, at least in the region where the positive electrode active material layer has been coated, lacks pores that would allow lithium ions to pass through the positive electrode power collector and result in uniformity of lithium ions on the front and back sides of the positive electrode. Therefore, it does not exclude positive electrode power collectors having very small or microlevel pores, or positive electrode power collectors having pores in regions of the positive electrode active material layer that are not coated, within a range in which the effect of the invention is exhibited. According to the second embodiment, at least the region of the positive electrode power collector that is coated with the positive electrode active material layer is nonporous, and the remaining sections of the positive electrode power collector that are not coated with the positive electrode active material may either have or lack pores.

The positive electrode of this embodiment preferably contains a lithium compound other than an active material as the positive electrode precursor, prior to assembly of the power storage element. As explained below, when assembling the power storage element of this embodiment, preferably the negative electrode is predoped with lithium ion. The predoping method for this embodiment is preferably application of a voltage between the positive electrode precursor and negative electrode, after the power storage element has been assembled using the positive electrode precursor containing a lithium compound, the negative electrode, the separators, the casing and the nonaqueous electrolytic solution. The positive electrode active material layer formed on the positive electrode power collector of the positive electrode precursor preferably comprises a lithium compound.

Throughout the present specification, "positive electrode precursor" is defined as the state of the positive electrode before lithium doping, and "positive electrode" is defined as the state of the positive electrode after lithium doping.

[Positive Electrode Active Material Layer]

The positive electrode active material layer preferably comprises a positive electrode active material containing a carbon material, and if necessary it may also additionally contain optional components such as a conductive filler, binder and dispersion stabilizer, as necessary.

The positive electrode active material layer of the positive electrode precursor preferably comprises a lithium compound.

[Positive Electrode Active Material]

The positive electrode active material preferably contains a carbon material. The carbon material used is more preferably carbon nanotubes, a conductive polymer or a porous carbon material, and more preferably activated carbon. One or more different materials may also be used in admixture as the positive electrode active material, and it may even contain a material other than a carbon material (for example, a complex oxide of lithium and a transition metal).

Preferably, the content of the carbon material with respect to the total amount of the positive electrode active material is 50 weight % or greater, and more preferably 70 weight % or greater. The carbon material content may be 100 weight %, but from the viewpoint of obtaining a satisfactory effect by combined use with other materials, it is preferably, for example, no greater than 90 weight %, and may even be 80 weight % or lower.

When activated carbon is used as the positive electrode active material, there are no particular restrictions on the type of activated carbon or its starting material. However, preferably the pores of the activated carbon are optimally controlled to obtain both a high input/output characteristic and high energy density. Specifically, if $V_1$ (cc/g) is the mesopore volume due to pores with diameters of 20 Å to 500 Å as calculated by the BJH method, and $V_2$ (cc/g) is the micropore volume due to pores with diameters of smaller than 20 Å as calculated by the MP method, then:

(1) in order to obtain a high input/output characteristic, activated carbon satisfying $0.3<V_1\leq0.8$ and $0.5\leq V_2\leq 1.0$ and exhibiting a specific surface area of 1,500 m$^2$/g to 3,000 m$^2$/g as measured by the BET method (hereunder also referred to as activated carbon 1) is preferred, and (2) in order to obtain high energy density, activated carbon satisfying $0.8<V_1\leq2.5$ and $0.8<V_2\leq3.0$ and exhibiting a specific surface area of 2,300 m$^2$/g to 4,000 m$^2$/g as measured by the BET method (hereunder also referred to as activated carbon 2), is preferred.

The (1) activated carbon 1 and (2) activated carbon 2 will each be explained in order.

(Activated Carbon 1)

The mesopore volume $V_1$ of activated carbon 1 is preferably a value larger than 0.3 cc/g, from the viewpoint of a greater input/output characteristic when the positive electrode material has been incorporated into a power storage element. The mesopore volume is also preferably no greater than 0.8 cc/g from the viewpoint of minimizing reduction in the bulk density of the positive electrode. $V_1$ is more preferably 0.35 cc/g to 0.7 cc/g and even more preferably 0.4 cc/g to 0.6 cc/g.

The micropore volume $V_2$ of activated carbon 1 is preferably 0.5 cc/g or greater in order to increase the specific surface area of the activated carbon and increase capacitance. From the viewpoint of reducing the bulk of the activated carbon, increasing the density as an electrode and increasing the capacitance per unit volume, the micropore volume is also preferably no greater than 1.0 cc/g. $V_2$ is more preferably 0.6 cc/g to 1.0 cc/g and even more preferably 0.8 cc/g to 1.0 cc/g.

The ratio of the mesopore volume $V_1$ to the micropore volume $V_2$ of the activated carbon 1 ($V_1/V_2$) is preferably in the range of $0.3\leq V_1/V_2\leq0.9$. That is, $V_1/V_2$ is preferably 0.3 or greater from the viewpoint of increasing the ratio of the mesopore volume to the micropore volume to a degree allowing reduction in the output characteristic to be minimized while maintaining high capacitance. $V_1/V_2$ is preferably no greater than 0.9 from the viewpoint of increasing the ratio of the micropore volume with respect to the mesopore volume, to a degree allowing a high output characteristic to be maintained while minimizing reduction in capacitance. The range of $V_1/V_2$ is more preferably $0.4\leq V_1/V_2\leq0.7$, and the range of $V_1/V_2$ is even more preferably $0.55\leq V_1/V_2\leq0.7$.

The upper limit and lower limit for $V_1$ and the upper limit and lower limit for $V_2$ may also be optionally combined.

Throughout the present specification, this also applies for combinations of the upper limit and lower limit of the other constituent features.

The mean pore size of the activated carbon 1 is preferably 17 Å or greater, more preferably 18 Å or greater and even more preferably 20 Å or greater, from the viewpoint of maximizing the output of the obtained power storage element. From the viewpoint of maximizing capacitance, the mean pore size of activated carbon 1 is preferably no greater than 25 Å.

The BET specific surface area of activated carbon 1 is preferably 1,500 m$^2$/g to 3,000 m$^2$/g, and more preferably 1,500 m$^2$/g to 2,500 m$^2$/g. If the BET specific surface area is 1,500 m$^2$/g or greater it will be easier to obtain satisfactory energy density, and if the BET specific surface area is 3,000 m$^2$/g or lower there will be no need to add large amounts of a binder to maintain the strength of the electrode, and therefore the performance per volume of the electrode will be higher.

The activated carbon 1 having such features can be obtained, for example, using the starting material and treatment method described below.

For this embodiment, the carbon source to be used as the starting material for activated carbon 1 is not particularly restricted. Examples include plant-based starting materials such as wood, wood dust, coconut shell, by-products of pulp production, bagasse and molasses; fossil-based starting materials such as peat, lignite, brown coal, bituminous coal, anthracite, petroleum distillation residue components, petroleum pitch, coke and coal tar; various synthetic resins such as phenol resin, vinyl chloride resin, vinyl acetate resin, melamine resin, urea resin, resorcinol resin, celluloid, epoxy resin, polyurethane resin, polyester resin and polyamide resin; synthetic rubbers such as polybutylene, polybutadiene and polychloroprene; as well as synthetic wood or synthetic pulp materials, and carbides of the foregoing. From the viewpoint of suitability for mass-production and of cost, the starting materials preferred among these are plant-based starting materials such as coconut shell and wood dust, and their carbides, with coconut shell carbides being particularly preferred.

The system used for carbonization and activation of these starting materials to obtain the activated carbon 1 may be a known system such as, for example, a fixed bed system, moving bed system, fluidized bed system, slurry system or rotary kiln system.

The carbonization method for these starting materials is a method in which an inert gas such as nitrogen, carbon dioxide, helium, argon, xenon, neon, carbon monoxide or exhaust gas, or a mixed gas composed mainly of such inert gases with other gases, is used for calcination at 400 to 700° C. (preferably 450 to 600° C.), over a period of about 30 minutes to 10 hours.

The activation method for a carbide obtained by the carbonization method is preferably a gas activation method in which an activating gas such as water vapor, carbon dioxide or oxygen is used for calcination. A method using water vapor or carbon dioxide as the activating gas is preferred.

In this activation method, preferably the activating gas is supplied at a rate of 0.5 to 3.0 kg/h (preferably 0.7 to 2.0 kg/h) while the carbide is raised to 800 to 1,000° C. over a period of 3 to 12 hours (preferably 5 to 11 hours and even more preferably 6 to 10 hours), for activation.

The carbide may be subjected to a primary activation before activation treatment of the carbide. In the primary activation, it is usually preferred to employ a method of calcination the carbon material at a temperature of below 900° C. using an activating gas such as water vapor, carbon dioxide or oxygen for gas activation.

By appropriate combinations for the calcination temperature and calcination time for the carbonization method, and the activating gas supply rate, temperature-elevating rate and maximum activation temperature in the activation method, it is possible to produce activated carbon 1 having the features described above, that may be used for this embodiment.

The mean particle diameter of the activated carbon 1 is preferably 2 to 20 μm.

If the mean particle diameter is 2 μm or greater, the capacitance per electrode volume will tend to be higher due to the higher density of the active material layer. A small mean particle diameter may lead to the disadvantage of low durability, but a mean particle diameter of at least 2 μm will help avoid this disadvantage. A mean particle diameter of no larger than 20 μm will tend to be more suitable for high-speed charge/discharge. The mean particle diameter is more preferably 2 to 15 μm and even more preferably 3 to 10 μm.

(Activated Carbon 2)

The mesopore volume $V_1$ of activated carbon 2 is preferably a value larger than 0.8 cc/g, from the viewpoint of a greater output characteristic when the positive electrode material has been incorporated into a power storage element, and it is also preferably no greater than 2.5 cc/g from the viewpoint of minimizing reduction in the capacitance of the power storage element. $V_1$ is more preferably 1.00 cc/g to 2.0 cc/g and even more preferably 1.2 cc/g to 1.8 cc/g.

On the other hand, the micropore volume $V_2$ of activated carbon 2 is preferably greater than 0.8 cc/g for a larger specific surface area of the activated carbon and to increase the capacitance, but it is also preferably no greater than 3.0 cc/g to increase the density as an activated carbon electrode, and to increase the capacitance per unit volume. $V_2$ is more preferably larger than 1.0 cc/g and no larger than 2.5 cc/g, and even more preferably 1.5 cc/g to 2.5 cc/g.

Activated carbon 2 having the mesopore volume and micropore volume described above has a higher BET specific surface area than activated carbon used in conventional electrical double layer capacitors or lithium ion capacitors. The specific value of the BET specific surface area of the activated carbon 2 is preferably 2,300 m$^2$/g to 4,000 m$^2$/g, and more preferably 3,200 m$^2$/g to 3,800 m$^2$/g. If the BET specific surface area is 2,300 m$^2$/g or greater it will be easier to obtain satisfactory energy density, and if the BET specific surface area is 4,000 m$^2$/g or lower there will be no need to add large amounts of a binder to maintain the strength of the electrode, and therefore the performance per volume of the electrode will tend to be higher.

Activated carbon 2 having such features can be obtained, for example, using the starting material and treatment method described below.

The carbonaceous material used as the starting material for activated carbon 2 is not particularly restricted so long as it is a carbon source commonly used as a starting material for activated carbon, and examples include plant-based starting materials such as wood, wood dust and coconut shell; petroleum-based starting materials such as petroleum pitch and coke; and various synthetic resins such as phenol resins, furan resins, vinyl chloride resins, vinyl acetate resins, melamine resins, urea resins and resorcinol resins. Of these starting materials, phenol resins and furan resins are especially preferred, being suitable for fabrication of activated carbon with a high specific surface area.

The system used for carbonization of these starting materials, or the heating method during activation treatment, may be a known system such as, for example, a fixed bed system, moving bed system, fluidized bed system, slurry system or rotary kiln system. The atmosphere during heating is an inert gas such as nitrogen, carbon dioxide, helium or argon, or a mixed gas composed mainly of such inert gases in admixture with other gases. A common method employs a carbonization temperature of about 400 to 700° C. and a calcination time of about 0.5 to 10 hours.

The activation method for the carbide may be a gas activation method in which calcination is accomplished using an activating gas such as water vapor, carbon dioxide or oxygen, or an alkali metal activation method in which heat treatment is carried out after mixture with an alkali metal compound, but an alkali metal activation method is preferred for fabrication of activated carbon with a high specific surface area.

In this activation method, a carbide and an alkali metal compound such as KOH or NaOH are mixed so that the weight ratio is (the amount of the alkali metal compound being equal to or greater than the amount of the carbide), after which heat treatment is carried out in a range of 600 to 900° C. for 0.5 to 5 hours under an inert gas atmosphere, and then the alkali metal compound is subjected to cleaning removal with an acid or water, and drying is performed.

In order to increase the micropore volume and not increase the mesopore volume, the amount of carbide may be increased during activation, and mixed with KOH. In order to increase both the micropore volume and mesopore volume, a large amount of KOH may be used. In order to increase mainly the mesopore volume, steam-activation is preferably carried out after alkaline activation treatment.

The mean particle diameter of activated carbon 2 is preferably 2 µm to 20 µm and more preferably 3 µm to 10 µm.

(Aspect Using Activated Carbon)

The activated carbon 1 and 2 may each be a single type of activated carbon, or a mixture of two or more different types of activated carbon, such that the mixture as a whole exhibits the characteristic values described above.

Either of activated carbon 1 or 2 may be selected for use, or both may be used in admixture.

The positive electrode active material may include materials other than activated carbons 1 and 2 (for example, activated carbon without the specified $V_1$ and/or $V_2$ values, or materials other than activated carbon (such as complex oxides of lithium and transition metals)). In the exemplary aspect, the content of activated carbon 1, or the content of activated carbon 2, or the total content of activated carbons 1 and 2, are preferably greater than 50 weight %, more preferably 70 weight % or greater, even more preferably 90 weight % or greater and most preferably 100 weight %, of the total positive electrode active material.

The content ratio of the positive electrode active material in the positive electrode active material layer is preferably 35 weight % to 95 weight % based on the total weight of the positive electrode active material layer in the positive electrode precursor. The lower limit for the content ratio of the positive electrode active material is more preferably 45 weight % or greater and even more preferably 55 weight % or greater. The upper limit for the content ratio of the positive electrode active material is more preferably no greater than 90 weight % and even more preferably no greater than 85 weight %. A suitable charge/discharge characteristic is exhibited within this range for the content ratio.

(Lithium Compound)

Throughout the present specification, a lithium compound is a substance containing lithium, and it excludes active materials that contribute to Faraday reaction or non-Faraday reaction in the electrode during charge/discharge of the power storage element.

Suitable lithium compounds to be used for this embodiment include one or more selected from among lithium carbonate, lithium oxide, lithium hydroxide, lithium fluoride, lithium chloride, lithium bromide, lithium iodide, lithium nitride, lithium oxalate and lithium acetate. Preferred among these are lithium carbonate, lithium oxide and lithium hydroxide, with lithium carbonate being more preferred from the viewpoint of being handleable in air and having low hygroscopicity. Such lithium compounds can decompose upon application of a voltage, to function as a dopant source for lithium doping in the negative electrode, while also forming pores in the positive electrode active material layer, having excellent electrolytic solution retentivity, and forming a positive electrode with excellent ionic conductivity. In addition to the aforementioned lithium compounds, one or more alkali metal carbonates such as sodium carbonate, potassium carbonate, rubidium carbonate and cesium carbonate may also be used. When an electrolytic solution predissolving a lithium salt such as $LiPF_6$, described below, is used as the nonaqueous electrolytic solution, such an alkali metal carbonate may be used alone. The lithium compound in the positive electrode precursor may be of a single type, or two or more different lithium compounds may be included, or a lithium compound may be used in admixture with another alkali metal carbonate.

For this embodiment, the positive electrode precursor may be any one that contains at least one lithium compound, and it may also contain, in addition to a lithium compound, one or more selected from the group consisting of the following formulas:

oxides such as $M_2O$,
hydroxides such as MOH,
halides such as MF or MCl,
oxalates such as $M_2(CO_2)_2$, and
carboxylates such as RCOOM (where R is H, an alkyl group or an aryl group, and M is one or more selected from among Na, K, Rb and Cs).

The positive electrode precursor may also contain one or more alkaline earth metal carbonates selected from among $BeCO_3$, $MgCO_3$, $CaCO_3$, $SrCO_3$ and $BaCO_3$, and one or more alkaline earth metal oxides, alkaline earth metal hydroxides, alkaline earth metal halides, alkaline earth metal oxalates and alkaline earth metal carboxylates.

Micronization of the lithium compound may be accomplished by various methods. For example, a pulverizer such as a ball mill, bead mill, ring mill, jet mill or rod mill may be used.

The positive electrode comprises a lithium compound other than the positive electrode active material. The expression $0.1 \mu m \leq G_1 \leq 10 \mu m$, and preferably $0.5 \mu m \leq G_1 \leq 5 \mu m$, is satisfied, where $G_1$ is the mean particle diameter of the lithium compound other than the positive electrode active material, in the positive electrode. If $G_1$ is 0.1 µm or greater, the high load charge/discharge cycle characteristic will be improved due to adsorption of fluorine ions generated by the high load charge/discharge cycling. If $G_1$ is no greater than 10 µm, the reaction area with the fluorine ions generated by the high load charge/discharge cycling will increase, thus allowing the fluorine ions to be adsorbed more efficiently.

The amount of lithium compound in the positive electrode is preferably 1 weight % to 50 weight % and more preferably 1.5 weight % to 20 weight %, based on the total weight of the positive electrode active material layer. If the amount of lithium compound is 1 weight % or greater, a sufficient amount of lithium carbonate will be present to adsorb fluorine ions formed in the high load charge/discharge cycling, and therefore the high load charge/discharge cycle characteristic will be improved. If the amount of lithium compound is no greater than 50 weight %, it will be possible to increase the energy density of the nonaqueous lithium power storage element.

The content ratio of the lithium compound in the positive electrode active material layer is preferably 10 weight % to 60 weight % and more preferably 20 weight % to 50 weight %, based on the total weight of the positive electrode active material layer of the positive electrode precursor. A content ratio within this range will allow suitable function to be exhibited as a dopant source into the negative electrode, while also allowing a suitable degree of porosity to be imparted to the positive electrode, which together will allow a power storage element with excellent charge/discharge efficiency under high load to be provided, and it is therefore preferred.

The lithium compound in the positive electrode gradually decomposes and gasifies as it is exposed to a high potential of about 4.0 V or greater, and the generated gas inhibits diffusion of ions in the electrolytic solution, thereby causing increased resistance. Consequently, preferably a coating film formed from the fluorine-containing compound is formed on the surface of the lithium compound, to inhibit reaction of the lithium compound.

The method of forming a coating film composed of the fluorine-containing compound is not particularly restricted, but it may be a method in which a fluorine-containing compound that decomposes at a high potential is added to the electrolytic solution and a high voltage above the decomposition potential of the fluorine-containing compound is applied to the nonaqueous lithium power storage element; or a method in which it is subjected to a temperature above the decomposition temperature.

The coverage factor of the fluorinated compound covering the lithium compound surface (the area overlap ratio $U_1$ of fluorine mapping relative to oxygen mapping in the SEM-EDX image of the positive electrode surface) is preferably 40% to 99%. If $U_1$ is 40% or higher it will be possible to suppress decomposition of the lithium compound. If $U_1$ is 99% or lower, it will be possible to maintain basicity near the positive electrode and the high load cycle characteristic will therefore be excellent.

As the method of measuring the coverage factor, it is determined by calculating the area overlap ratio of fluorine mapping relative to oxygen mapping that has been binarized based on the average value of brightness, in elemental mapping obtained by SEM-EDX of the positive electrode surface.

The measuring conditions for SEM-EDX element mapping are not particularly restricted, and are preferably a pixel count in the range of 128×128 pixels to 512×512 pixels, and adjustment of the luminance and contrast so that no pixel reaches the maximum luminance value in the mapping image, and the average value of brightness falls within the range of 40% to 60% of the maximum luminance value.

In the element mapping obtained by SEM-EDX of the positive electrode cross-section, the area overlap ratio $U_2$ of fluorine mapping relative to oxygen mapping, binarized based on the average value of brightness, is preferably 10% to 60%. If $U_2$ is 10% or higher it will be possible to suppress decomposition of the lithium compound. If $U_2$ is 60% or lower, there will be a non-fluorinated state up to the interior of the lithium compound, and it will therefore be possible to maintain basicity near the positive electrode, and the high load cycle characteristic will be excellent.

In an image obtained by microscopic Raman spectroscopy of a cross-section of the positive electrode, preferably the area ratio of carbonate ion mapping of the cross-sectional area of the positive electrode is 1% to 50%. If the area ratio of carbonate ion mapping is 1% or greater, high durability will be exhibited during high rate cycling. If the area ratio of carbonate ion mapping is no greater than 50%, it will be possible to increase the energy density of the nonaqueous lithium power storage element, while also exhibiting high durability during high temperature storage.

If the positive electrode active material layer contains no lithium compound, then oxidative decomposition of the nonaqueous electrolytic solution will proceed abruptly when the nonaqueous lithium power storage element is exposed to an overvoltage environment, causing abrupt gas generation and large heat of reaction, and often resulting in thermal runaway of the nonaqueous lithium power storage element.

If the positive electrode active material layer contains a lithium compound, however, the lithium compound gradually decomposes at a lower potential than the decomposition potential of the nonaqueous electrolytic solution, generating gas. That is, the effect of suppressing increase in potential of the positive electrode by decomposition reaction of the lithium compound, and the effect of gradually increasing the internal pressure of the nonaqueous lithium power storage element by moderate gas generation, allow the casing described below or the degassing valve provided on the casing to be opened under moderate conditions, and can thus suppress thermal runaway of the nonaqueous lithium power storage element.

However, since the lithium compound has virtually no electron conductivity, excessive lithium compound in the positive electrode active material can result in increased resistance. For the second embodiment, therefore, a positive electrode is provided on the outermost layer of the electrode laminated body, and lithium compound is added in a large amount to the positive electrode active material layer $C_x$ side of the outermost layer positive electrode that is not facing the negative electrode, thereby allowing the effects of increased output of the nonaqueous lithium power storage element and suppressed thermal runaway during overcharge to both be achieved.

If the amount of carbonate per area on the $C_x$ side is represented as $C_{x1}$ (g/m²), then $C_{x1}$ is 5.0 to 25.0, and if the positive electrode active material layer on the back side of the $C_x$ side is the $C_y$ side and the amount of carbonate per area on the $C_y$ side is represented as $C_{y1}$ (g/m²), then preferably $C_{y1}$ is 0.1 to 15.0 and $C_{x1} > C_{y1}$.

If $C_{x1}$ is 5.0 or greater, it will be possible to suppress thermal runaway during overcharge. If $C_{x1}$ is no greater than 25.0, excess lithium compound will not be present an d the energy density can therefore be increased. If $C_{y1}$ is 0.1 or greater, it will be possible to trap fluorine ions produced during high load charge/discharge cycling, thereby improving the cycle durability. If $C_{y1}$ is no greater than 15.0 and $C_{x1} > C_{y1}$, then it will be possible to increase electron conduction between the positive electrode active material on the $C_y$ side, thereby allowing higher output to be obtained.

For an effect of suppressing thermal runaway during overcharge it is sufficient if a positive electrode active material layer $C_x$ side that is not facing the negative electrode is on the outermost layer of the electrode laminated body, and therefore it is sufficient if a positive electrode having a $C_x$ side is present on all or a portion of the outermost layer of the electrode laminated body, and a portion of the outermost layer may be a negative electrode, or the electrode laminated body may be covered with a separator or the like.

The method of increasing the amount of lithium compound on the $C_x$ side is not particularly restricted, and it may be a method of providing a positive electrode precursor containing a lithium compound on the front and back sides of the positive electrode power collector, on the outermost layers of the electrode laminated body, and reacting the lithium compound on the positive electrode active material layer $C_y$ side facing the negative electrode during lithium doping, or a method of using the side coated with a coating solution containing lithium compound in a large amount on one side of the positive electrode power collector as the $C_x$ side, during fabrication of the positive electrode precursor.

Preferably, $C_{x2}/C_{y2}$ is 0.86 to 1.14, where $C_{x2}$ (g/m$^2$) is the amount of active material per area contained on the $C_x$ side, and $C_{y2}$ (g/m$^2$) is the amount of active material per area contained on the $C_y$ side. For the second embodiment, $C_{x2}/C_{y2}$ is the reciprocal of $C_{x1}/C_{y1}$. Consequently, if $C_{x2}/C_{y2}$ is 0.86 or greater, it is possible to increase electron conduction between the lithium compound and active material on the $C_x$ side, and to carry out efficient decomposition of lithium compound during overcharge, thereby suppressing thermal runaway. If $C_{x2}/C_{y2}$ is no greater than 1.14, it will be possible to increase the energy density.

The dispersed state of the lithium compound in the positive electrode active material layer can be evaluated by microscopic Raman spectroscopy. If the lithium compound is a carbonate, then in an image obtained by microscopic Raman spectroscopy of the $C_x$ side, $S_x$ is preferably 10 to 50, where $S_x$ % is the area ratio of carbonate ion mapping. If $S_x$ is 10 or greater, the lithium compound on the $C_x$ side will uniformly disperse, allowing the lithium compound during overcharge to efficiently undergo decomposition reaction. If $S_x$ is no greater than 50, it will be possible to ensure electron conduction between the lithium compound and positive electrode active material, thereby allowing the lithium compound to efficiently undergo decomposition reaction.

If the lithium compound is a carbonate, then in an image obtained by microscopic Raman spectroscopy of the $C_y$ side, $S_y$ is preferably 1 to 40 and $S_y < S_x$, where $S_y$ % is the area ratio of carbonate ion mapping. If $S_y$ is 1 or greater, it will be possible to trap fluorine ions produced during high load charge/discharge cycling, thereby improving the cycle durability. If $S_y$ is no greater than 40 and $S_y < S_x$, then it will be possible to increase electron conduction between the positive electrode active material on the $C_y$ side, thereby allowing higher output to be obtained.

The positive electrode active material layer $C_y$ side, according to the second embodiment, preferably contains one or more compounds represented by the following formulas (1) to (3):

$$LiX^1—OR^1O—X^2Li \qquad \text{formula (1)}$$

{where $R^1$ is an alkylene group of 1 to 4 carbon atoms or a halogenated alkylene group of 1 to 4 carbon atoms, and $X^1$ and $X^2$ respectively and independently represent —(COO)$_n$ (where n is 0 or 1)}, $$LiX^1—OR^1O-X^2R^2 \qquad \text{formula (2)}$$

{where $R^1$ is an alkylene group of 1 to 4 carbon atoms or a halogenated alkylene group of 1 to 4 carbon atoms, $R^2$ is hydrogen, an alkyl group of 1 to 10 carbon atoms, a mono- or polyhydroxyalkyl group of 1 to 10 carbon atoms, an alkenyl group of 2 to 10 carbon atoms, a mono- or polyhydroxyalkenyl group of 2 to 10 carbon atoms, a cycloalkyl group of 3 to 6 carbon atoms, or an aryl group, and $X^1$ and $X^2$ respectively and independently represent —(COO)$_n$ (where n is 0 or 1)}, and $$R^2X^1—OR^1O—X^2R^3 \qquad \text{formula (3)}$$

{where $R^1$ is an alkylene group of 1 to 4 carbon atoms or a halogenated alkylene group of 1 to 4 carbon atoms, $R^2$ and $R^3$ respectively and independently represent hydrogen, an alkyl group of 1 to 10 carbon atoms, a polyhydroxyalkyl group of 1 to 10 carbon atoms, an alkenyl group of 2 to 10 carbon atoms, a mono- or polyhydroxyalkenyl group of 2 to 10 carbon atoms, a cycloalkyl group of 3 to 6 carbon atoms or an aryl group, and $X^1$ and $X^2$ respectively and independently represent —(COO)$_n$ (where n is 0 or 1)}.

If $C_{y3}$ (mol/g) is the total content of compounds represented by formulas (1) to (3) per unit weight of the positive electrode material layer $C_y$ side, then $C_{y3}$ is $1.60 \times 10^{-4}$ to $300 \times 10^{-4}$, and more preferably $5.0 \times 10^{-4}$ mol/g to $150 \times 10^{-4}$.

Although it is possible to suppress resistance increase during high load charge/discharge cycling by including a lithium compound on the $C_y$ side, the lithium compound also gradually decomposes when exposed to a high-temperature, high-voltage environment, generating gas. Consequently, by including a compound represented by formulas (1) to (3) on the $C_y$ side, it is possible to suppress decomposition of lithium compound under high-temperature, high-voltage environment conditions. If $C_{y3}$ is $1.60 \times 10^{-4}$ or greater, the high-temperature durability will be excellent. If $C_{y3}$ is no greater than $300 \times 10^{-4}$, the output characteristic will be excellent.

Particularly preferred compounds of formula (1) are the compounds represented by LiOC$_2$H$_4$OLi, LiOC$_3$H$_6$OLi, LiOC$_2$H$_4$OCOOLi, LiOCOOC$_3$H$_6$OLi, LiOCOOC$_2$H$_4$OCOOLi and LiOCOOC$_3$H$_6$OCOOLi.

Particularly preferred compounds of formula (2) are the compounds represented by LiOC$_2$H$_4$OH, LiOC$_3$H$_6$OH, LiOC$_2$H$_4$OCOOH, LiOC$_3$H$_6$OCOOH, LiOCOOC$_2$H$_4$OCOOH, LiOCOOC$_3$H$_6$OCOOH, LiOC$_2$H$_4$OCH$_3$, LiOC$_3$H$_6$OCH$_3$, LiOC$_2$H$_4$OCOOCH$_3$, LiOC$_3$H$_6$OCOOCH$_3$, LiOCOOC$_2$H$_4$OCOOCH$_3$, LiOCOOC$_3$H$_6$OCOOCH$_3$, LiOC$_2$H$_4$OC$_2$H$_5$, LiOC$_3$H$_6$OC$_2$H$_5$, LiOC$_2$H$_4$OCOOC$_2$H$_5$, LiOC$_3$H$_6$OCOOC$_2$H$_5$, LiOCOOC$_2$H$_4$OCOOC$_2$H$_5$ and LiOCOOC$_3$H$_6$OCOOC$_2$H$_5$.

Particularly preferred compounds of formula (3) are the compounds represented by HOC$_2$H$_4$OH, HOC$_3$H$_6$OH, HOC$_2$H$_4$OCOOH, HOC$_3$H$_6$OCOOH, HOCOOC$_2$H$_4$OCOOH, HOCOOC$_3$H$_6$OCOOH, HOC$_2$H$_4$OCH$_3$, HOC$_3$H$_6$OCH$_3$, HOC$_2$H$_4$OCOOCH$_3$, HOC$_3$H$_6$OCOOCH$_3$, HOCOOC$_2$H$_4$OCOOCH$_3$, HOCOOC$_3$H$_6$OCOOCH$_3$, HOC$_2$H$_4$OC$_2$H$_5$, HOC$_3$H$_6$OC$_2$H$_5$, HOC$_2$H$_4$OCOOC$_2$H$_5$, HOC$_3$H$_6$OCOOC$_2$H$_5$, HOCOOC$_2$H$_4$OCOOC$_2$H$_5$, HOCOOC$_3$H$_6$OCOOC$_2$H$_5$, CH$_3$OC$_2$H$_4$OCH$_3$, CH$_3$OC$_3$H$_6$OCH$_3$, CH$_3$OC$_2$H$_4$OCOOCH$_3$, CH$_3$OC$_3$H$_6$OCOOCH$_3$, CH$_3$OCOOC$_2$H$_4$OCOOCH$_3$, CH$_3$OCOOC$_3$H$_6$OCOOCH$_3$, CH$_3$OC$_2$H$_4$OC$_2$H$_5$, CH$_3$OC$_3$H$_6$OC$_2$H$_5$, CH$_3$OC$_2$H$_4$OCOOC$_2$H$_5$, CH$_3$OC$_3$H$_6$OCOOC$_2$H$_5$, CH$_3$OCOOC$_2$H$_4$OCOOC$_2$H$_5$, CH$_3$OCOOC$_3$H$_6$OCOOC$_2$H$_5$, C$_2$H$_5$OC$_2$H$_4$OC$_2$H$_5$, C$_2$H$_5$OC$_3$H$_6$OC$_2$H$_5$, C$_2$H$_5$OC$_2$H$_4$OCOOC$_2$H$_5$, C$_2$H$_5$OC$_3$H$_6$OCOOC$_2$H$_5$, C$_2$H$_5$OCOOC$_2$H$_4$OCOOC$_2$H$_5$ and C$_2$H$_5$OCOOC$_3$H$_6$OCOOC$_2$H$_5$.

Examples of methods for adding a compound represented by formulas (1) to (3) into the positive electrode active material layer include a method of mixing the compound into the positive electrode active material layer, a method of adsorbing the compound onto the positive electrode active material layer, and a method of electrochemically depositing the compound in the positive electrode active material layer. Preferred among these is a method of adding precursors that can decompose in the nonaqueous electrolytic solution to produce the compounds, and utilizing decomposition reaction of the precursor during fabrication of the power storage element, to accumulate the compounds in the positive electrode active material layer.

As precursors that form compounds represented by formulas (1) to (3) it is preferred to use one or more organic solvents selected from the group consisting of ethylene carbonate, propylene carbonate, butylene carbonate, vinylene carbonate and fluoroethylene carbonate, with ethylene carbonate and propylene carbonate being more preferred for use.

When compounds represented by formulas (1) to (3) are added to the negative electrode active material layer $A_y$ side facing the $C_y$ side, preferably $C_{y3}/A_{y3}$ is 0.2 to 20, where $A_{y3}$ (mol/g) is the total content per unit weight on the negative electrode active material layer $A_y$ side of the compounds. If $C_{y3}/A_{y3}$ is 0.2 or greater, decomposition of the lithium compound on the $C_y$ side can be suppressed, and the high-temperature durability will be excellent. If $C_{y3}/A_{y3}$ is no greater than 20, the output characteristic will be excellent.

(Other Components of Positive Electrode Active Material Layer)

If necessary, the positive electrode active material layer may also contain optional components such as a conductive filler, binder and dispersion stabilizer, in addition to the positive electrode active material and lithium compound.

The conductive filler may be a conductive carbonaceous material with higher conductivity than the positive electrode active material. Preferred examples of such conductive fillers include Ketchen black, acetylene black, vapor grown carbon fibers, graphite and carbon nanotubes, as well as mixtures thereof.

The amount of conductive filler mixed in the positive electrode active material layer is preferably 0 to 20 parts by mass and more preferably in the range of 1 to 15 parts by weight, with respect to 100 parts by weight of the positive electrode active material. From the viewpoint of high input, the positive electrode active material layer preferably contains a conductive filler. If the amount of conductive filler mixed in the positive electrode active material layer is no greater than 20 parts by weight, the content ratio of the positive electrode active material in the positive electrode active material layer will be increased, allowing the energy density per volume of the positive electrode active material layer to be ensured.

The binder is not particularly restricted, and for example, PVdF (polyvinylidene fluoride), PTFE (polytetrafluoroethylene), polyimide, latex, styrene-butadiene copolymer, fluorine rubber or an acrylic copolymer may be used. The amount of binder used is preferably 1 part by weight to 30 parts by weight, more preferably 3 parts by weight to 27 parts by weight and even more preferably 5 parts by weight to 25 parts by weight, with respect to 100 parts by weight of the positive electrode active material. If the amount of binder is 1 weight % or greater, adequate electrode strength will be exhibited. If the amount of binder is no greater than 30 parts by weight, a high input/output characteristic will be exhibited without inhibiting movement or diffusion of ions in and from the positive electrode active material.

The dispersion stabilizer is not particularly restricted, and for example, PVP (polyvinylpyrrolidone), PVA (polyvinyl alcohol) or cellulose derivatives may be used. The amount of binder used is preferably 0 parts by weight to 10 parts by weight, with respect to 100 parts by weight of the positive electrode active material. If the amount of dispersion stabilizer is no greater than 10 parts by weight, on the other hand, a high input/output characteristic will be exhibited without inhibiting movement or diffusion of ions in and from the positive electrode active material.

[Positive Electrode Power Collector]

The material composing the positive electrode power collector is not particularly restricted so long as it is a material that has high electron conductivity and is resistant to degradation by elution into the electrolytic solution or reaction with the electrolytic or ion, but a metal foil is preferred. The positive electrode power collector in the nonaqueous lithium power storage element of this embodiment is most preferably an aluminum foil.

For the first embodiment, the metal foil may be a common metal foil without ruggedness or through-holes, or it may be a metal foil having ruggedness formed by embossing, chemical etching, electrolytic deposition or blasting, or it may be a metal foil having through-holes, such as an expanded metal, punching metal or etching foil.

For the second embodiment, the metal foil is a common metal foil having no ruggedness or through-holes, but it may also be a metal foil having ruggedness formed by embossing, chemical etching, electrolytic deposition or blasting, or a metal foil having through-holes such as expanded metal, punching metal or etching foil, so long as it is used as a "nonporous positive electrode power collector" as defined above.

The thickness of the positive electrode power collector is not particularly restricted so long as it allows the shape and strength of the positive electrode to be maintained, but 1 to 100 μm, for example, is preferred. Incidentally, when the positive electrode power collector has holes or ruggedness, the thickness of the positive electrode power collector is measured based on the sections where no holes or ruggedness are present.

[Production of Positive Electrode Precursor]

The positive electrode precursor that is to be the positive electrode of the nonaqueous lithium power storage element for this embodiment can be produced by a known production technique for electrodes for lithium ion batteries or electrical double layer capacitors. For example, the positive electrode active material and lithium compound, as well as the other optional components that are used as necessary, may be dispersed and dissolved in water or an organic solvent to prepare a slurry-like coating solution, and the coating solution coated onto one or both sides of a positive electrode power collector to form a coating film, which is dried to obtain a positive electrode precursor. The obtained positive electrode precursor may also be pressed to adjust the film thickness or bulk density of the positive electrode active material layer. An alternative method may also be used, in which the positive electrode active material and lithium compound, as well as the other optional components used as necessary, are mixed in a dry state without using a solvent, and the obtained mixture is subjected to press molding, after which a conductive adhesive is used for attachment to the positive electrode power collector.

The positive electrode precursor coating solution may also be prepared by dry blending all or a portion of each of the starting material powders containing the positive electrode active material, and then adding water or an organic solvent, and/or adding a liquid or slurry-like substance comprising a binder or dispersion stabilizer dissolved or dispersed in them. Alternatively, it may be prepared by adding various starting powders containing the positive electrode active material, to a liquid or slurry-like substance comprising a binder or dispersion stabilizer dissolved or dispersed in water or an organic solvent. The method of dry blending may be, for example, premixing in which a ball mill or the like is used to premix the positive electrode active material and lithium compound, and a conductive filler if necessary, and the low-conductivity lithium compound is coated with the conductive material. This will help the lithium compound to decompose by the positive electrode precursor during the lithium doping described below. When water is used as the solvent for the coating solution, the coating solution may be rendered alkaline by addition of the lithium compound, and therefore a pH modifier may be added as necessary.

The method of preparing the coating solution of the positive electrode precursor is not particularly restricted, and a dispersing machine such as a homodisperser or multiscrew disperser, planetary mixer, thin-film spinning high-speed mixer or the like, may be suitably used. In order to obtain a coating solution in a satisfactorily dispersed state, it is preferred for the dispersion to be at a circumferential speed of 1 m/s to 50 m/s. It is preferred if the circumferential speed is 1 m/s or greater, because this will allow each material to satisfactorily dissolve or disperse. It is also preferred if the circumferential speed is no greater than 50 m/s, because each material will be unlikely to be broken down by heat or shear force during dispersion, and reaggregation will be unlikely to take place.

The degree of dispersion of the coating solution is preferably to a granularity of 0.1 µm to 100 µm, as measured with a fineness gauge. The upper limit for the degree of dispersion is more preferably to a granularity of no greater than 80 µm, and more preferably to a granularity of no greater than 50 µm. It is preferred if the granularity is 0.1 µm or greater, because this indicates that the material has not been crushed very greatly during preparation of the coating solution. If the granularity is no greater than 100 µm, there will be less clogging during discharge of the coating solution and less formation of streaks in the coating film, allowing more stable coating.

The viscosity ($\eta b$) of the coating solution of the positive electrode precursor is preferably 1,000 mPa·s to 20,000 mPa·s, more preferably 1,500 mPa·s to 10,000 mPa·s and even more preferably 1,700 mPa·s to 5,000 mPa·s. If the viscosity ($\eta b$) is 1,000 mPa·s or higher, liquid dripping during formation of the coating film will be suppressed, and the coating film width and thickness can be satisfactorily controlled. If the viscosity ($\eta b$) is no higher than 20,000 mPa·s, there will be less pressure loss in the flow channel of the coating solution when a coating machine is used, allowing stable coating to be carried out, and allowing control to less than the prescribed coating film thickness.

The TI value (thixotropy index value) of the coating solution is preferably 1.1 or greater, more preferably 1.2 or greater and even more preferably 1.5 or greater. If the TI value is 1.1 or greater, the coating film width and thickness can be satisfactorily controlled.

The method of forming a coating film of the positive electrode precursor is not particularly restricted, and a coating machine such as a die coater, comma coater, knife coater or gravure coating machine may be suitably used. The coating film may be formed by monolayer coating or by multilayer coating. In the case of multilayer coating, the coating solution compositions may be adjusted so that the lithium compound content differs within each layer of the coating film. The coating speed is preferably 0.1 m/min to 100 m/min, more preferably 0.5 m/min to 70 m/min and even more preferably 1 m/min to 50 m/min. If the coating speed is 0.1 m/min or greater, stable coating will be possible. If the coating speed is 100 m/min or lower, the coating precision can be adequately ensured.

The method of drying the coating film of the positive electrode precursor is not particularly restricted, and a drying method such as hot air drying or infrared ray (IR) drying may be suitably employed. Drying of the coating film may be drying at a single temperature, or it may be drying while varying the temperature in different stages. Several drying methods may also be used in combination for drying. The drying temperature is preferably 25° C. to 200° C., more preferably 40° C. to 180° C. and even more preferably 50° C. to 160° C. If the drying temperature is 25° C. or higher, it will be possible to adequately volatilize off the solvent in the coating film. If the drying temperature is no higher than 200° C., it will be possible to reduce cracking of the coating film by rapid volatilization of the solvent or maldistribution of the binder by migration, and oxidation of the positive electrode power collector or positive electrode active material layer.

The method of pressing the positive electrode precursor is not particularly restricted, and a pressing machine such as a hydraulic press or vacuum pressing machine may be suitably used.

The film thickness, bulk density and electrode strength of the positive electrode active material layer can be adjusted by the pressing pressure, the gap, and the surface temperature of the pressed portion, as described below. The pressing pressure is preferably 0.5 kN/cm to 20 kN/cm, more preferably 1 kN/cm to 10 kN/cm and even more preferably 2 kN/cm to 7 kN/cm. If the pressing pressure is 0.5 kN/cm or greater, it will be possible to adequately increase the electrode strength. If the pressing pressure is no greater than 20 kN/cm, there will be less distortion or wrinkling in the positive electrode precursor, and adjustment can be made to the desired film thickness and bulk density for the positive electrode active material layer. The gap between the press rolls may be set to a desired value depending on the film thickness of the dried positive electrode precursor, so that the desired film thickness and bulk density of the positive electrode active material layer is obtained. The pressing speed may also be set to the desired speed, so as to minimize distortion and wrinkling in the positive electrode precursor. The surface temperature of the pressed portion may be room temperature, or it may be heated instead, if necessary. In the case of heating, the lower limit for the surface temperature of the pressed portion is at least the melting point of the binder used minus preferably 60° C., more preferably 45° C. and even more preferably 30° C. In the case of heating, the upper limit for the surface temperature of the pressed portion is no higher than the melting point of the binder used plus preferably 50° C., more preferably 30° C. and even more preferably 20° C. For example, when PVdF (polyvinylidene fluoride: melting point=150° C.) is used as the binder, heating is to preferably between 90° C. and 200° C., more preferably between 105° C. and 180° C. and even more preferably between 120° C. and 170° C. When a styrene-butadiene copolymer (melting point=100° C.) is used as the binder, heating is to preferably between 40° C. and 150° C., more preferably between 55° C. and 130° C. and even more preferably between 70° C. and 120° C.

The melting point of the binder can be determined by the endothermic peak position in DSC (Differential Scanning calorimetry). For example, using a "DSC7" differential scanning calorimeter by Perkin-Elmer, 10 mg of sample resin is set in the measuring cell and the temperature is increased from 30° C. to 250° C. at a temperature-elevating rate of 10° C./min, in a nitrogen gas atmosphere, the melting point being the endothermic peak temperature during the temperature elevation.

Pressing may also be carried out multiple times while varying the conditions including the pressing pressure, gap, speed, and pressed portion surface temperature.

The thickness of the positive electrode active material layer is preferably 20 μm to 200 μm, more preferably 25 μm to 100 μm and even more preferably 30 μm to 80 μm, for each side of the positive electrode power collector. If the thickness of the positive electrode active material layer is 20 μm or greater, sufficient charge/discharge capacity can be exhibited. If the thickness of the positive electrode active material layer is no greater than 200 μm, low ion diffusion resistance can be maintained in the electrode. It will thus be possible to obtain an adequate output characteristic and to reduce the cell volume, thereby increasing the energy density. The thickness of the positive electrode active material layer, when the power collector has through-holes or ruggedness, is the mean value of the thickness for each side at the sections of the power collector without through-holes or ruggedness.

The bulk density of the positive electrode active material layer at the positive electrode after the lithium doping described below is preferably 0.50 g/cm$^3$ or greater and more preferably in the range of 0.55 g/cm$^3$ to 1.3 g/cm$^3$. If the bulk density of the positive electrode active material layer is 0.50 g/cm$^3$ or greater, it will be possible to exhibit high energy density and to reduce the size of the power storage element. If the bulk density is no higher than 1.3 g/cm$^3$, diffusion of the electrolytic solution in the pores in the positive electrode active material layer will be adequate, and a high output characteristic will be obtained.

<Negative Electrode>

According to this embodiment, the negative electrode has a negative electrode power collector, and a negative electrode active material layer situated on one or both sides thereof.

According to the second embodiment, "nonporous negative electrode power collector" means a negative electrode power collector that, at least in the region where the negative electrode active material layer has been coated, lacks pores that would allow lithium ions to pass through the negative electrode power collector and result in uniformity of lithium ions on the front and back sides of the negative electrode. Therefore, it does not exclude negative electrode power collectors having very small or microlevel pores, or negative electrode power collectors having pores in regions of the negative electrode active material layer that are not coated, within a range in which the effect of the invention is exhibited. According to this embodiment, at least the region of the negative electrode power collector that is coated with the negative electrode active material layer is nonporous, and the remaining sections of the negative electrode power collector that are not coated with the negative electrode active material may either have or lack pores.

[Negative Electrode Active Material Layer]

The negative electrode active material layer contains a negative electrode active material that can intercalate and release lithium ions. It may also contain optional components such as a conductive filler, binder and dispersion stabilizer, as necessary.

[Negative Electrode Active Material]

The negative electrode active material used may be a substance capable of intercalating and releasing lithium ions. Examples include, specifically, carbon materials, titanates, silicon, silicon oxides, silicon alloys, silicon compounds, tin and tin compounds. Preferably, the content of the carbon material with respect to the total amount of the negative electrode active material is 50 weight % or greater, and more preferably 70 weight % or greater. The carbon material content may be 100 weight %, but from the viewpoint of obtaining a satisfactory effect by combined use with other materials, it is preferably, for example, no greater than 90 weight %, and may even be 80 weight % or lower.

The negative electrode active material is preferably doped with lithium ion. The lithium ion doped in the negative electrode active material, as described throughout the present specification, includes three major forms.

The first form is lithium ion that is intercalated in advance in the negative electrode active material, as a design value, before fabrication of the nonaqueous lithium power storage element.

The second form is lithium ion intercalated in the negative electrode active material during fabrication and shipping of the nonaqueous lithium power storage element.

The third form is lithium ion intercalated in the negative electrode active material after the nonaqueous lithium power storage element has been used as a device.

By doping the negative electrode active material with lithium ion it is possible to satisfactorily control the capacitance and operating voltage of the obtained nonaqueous lithium power storage element.

Examples of carbon materials include non-graphitizable carbon materials; easily graphitizable carbon materials; carbon black; carbon nanoparticles; activated carbon; artificial graphite; natural graphite; graphitized mesophase carbon microspheres; graphite whiskers; amorphous carbonaceous materials such as polyacene-based materials; carbonaceous materials obtained by heat treatment of carbon precursors such as petroleum-based pitch, coal-based pitch, mesocarbon microbeads, coke and synthetic resins (for example, phenol resins); thermal decomposition products of furfuryl alcohol resins or novolac resins; fullerenes; carbon nanohorns; and carbon materials that are composites of the foregoing.

The carbon material is not particularly restricted, but activated carbon, carbon black, molded porous carbon, high specific surface area graphite or carbon nanoparticles may be suitably used.

From the viewpoint of lowering resistance of the negative electrode, pitch composite carbon materials are preferred that are obtained by heat treatment of one or more carbon materials with petroleum-based pitch or coal-based pitch in admixture. Before the heat treatment, the carbon material and the pitch may be mixed at a temperature higher than the melting point of the pitch. The heat treatment temperature may be a temperature such that the components generated by volatilization or thermal decomposition of the pitch used are converted to a carbonaceous material. The atmosphere for the heat treatment is preferably a non-oxidizing atmosphere.

Preferred examples for the pitch composite carbon material are pitch composite carbon materials 1a and 2a mentioned below. Either of these may be selected for use, or both may be used in combination.

Pitch composite carbon material 1a can be obtained by heat treating one or more carbon materials with a BET specific surface area of 100 m$^2$/g to 3000 m$^2$/g in admixture with petroleum-based pitch or coal-based pitch.

The carbon material is not particularly restricted, but activated carbon, carbon black, molded porous carbon, high specific surface area graphite or carbon nanoparticles may be suitably used.

(Composite Carbon Material 1a)

Composite carbon material 1a is a composite carbon material using at least one type of carbon material with a BET specific surface area of 100 m$^2$/g to 3000 m$^2$/g as the base material. The base material is not particularly restricted, but activated carbon, carbon black, molded porous carbon, high specific surface area graphite or carbon nanoparticles may be suitably used.

The weight ratio of the carbonaceous material with respect to the base material in composite carbon material 1a is preferably 10% to 200%, more preferably 12% to 180%, even more preferably 15% to 160% and most preferably 18% to 150%. If the weight ratio of the carbonaceous material is 10% or greater, it will be possible to suitably fill the micropores of the base material with the carbonaceous material, and the lithium ion charge/discharge efficiency will be increased, therefore allowing satisfactory cycle durability to be exhibited. If the weight ratio of the carbonaceous material is no greater than 200%, it will be possible to suitably maintain the pores and the lithium ion diffusion will be satisfactory, and therefore a high input/output characteristic can be exhibited.

The lithium ion doping amount per unit weight of composite carbon material 1a is preferably 530 mAh/g to 2,500 mAh/g, more preferably 620 mAh/g to 2,100 mAh/g, even more preferably 760 mAh/g to 1,700 mAh/g and most preferably 840 mAh/g to 1,500 mAh/g.

Doping lithium ion lowers the potential of the negative electrode. Thus, when a negative electrode containing composite carbon material 1a doped with lithium ion is combined with a positive electrode, the voltage of the nonaqueous lithium power storage element is increased and the utilizable capacity of the positive electrode is increased. Therefore, the capacitance and energy density of the obtained nonaqueous lithium power storage element increases.

If the doping amount is 530 mAh/g or greater, lithium ion in the composite carbon material 1a will be satisfactorily doped even at irreversible sites where lithium ion cannot be desorbed after once being inserted, and it will also be possible to reduce the amount of composite carbon material 1a per amount of lithium. The film thickness of the negative electrode can therefore be reduced and high energy density can be obtained. As the doping amount increases, the negative electrode potential decreases and the input/output characteristic, energy density and durability increase.

If the doping amount is no greater than 2,500 mAh/g, there will be a lower risk of side-effects such as deposition of lithium metal.

Composite carbon material 1a using activated carbon as the base material will now be described as a preferred example of composite carbon material 1a.

Composite carbon material 1a preferably satisfies $0.010 \leq V_{m1} \leq 0.300$, $0.001 \leq V_{m2} \leq 0.650$, where $V_{m1}$ (cc/g) is the mesopore volume due to pores with diameters of 20 Å to 500 Å, as calculated by the BJH method, and $V_{m2}$ (cc/g) is the micropore volume due to pores with diameters of smaller than 20 Å as calculated by the MP method.

The mesopore volume $V_{m1}$ more preferably satisfies $0.010 \leq V_{m1} \leq 0.225$ and even more preferably $0.010 \leq V_{m1} \leq 0.200$. The micropore volume $V_{m2}$ more preferably satisfies $0.001 \leq V_{m2} \leq 0.200$, even more preferably $0.001 \leq V_{m2} \leq 0.150$ and most preferably $0.001 \leq V_{m2} \leq 0.100$.

If the mesopore volume $V_{m1}$ is no greater than 0.300 cc/g it will be possible to increase the BET specific surface area and increase the lithium ion doping amount, while also increasing the bulk density of the negative electrode. As a result, the negative electrode can be made into a thin-film. If the micropore volume $V_{m2}$ is no greater than 0.650 cc/g, it will be possible to maintain high charge/discharge efficiency for lithium ions. On the other hand, if the mesopore volume $V_{m1}$ and micropore volume $V_{m2}$ are equal to or greater than these lower limits ($0.010 \leq V_{m1}$, $0.001 \leq V_{m2}$), then a high input/output characteristic can be obtained.

The BET specific surface area of composite carbon material 1a is preferably 100 m$^2$/g to 1,500 m$^2$/g, more preferably 150 m$^2$/g to 1,100 m$^2$/g, and even more preferably 180 m$^2$/g to 550 m$^2$/g. If the BET specific surface area is 100 m$^2$/g or greater, it will be possible to suitably maintain the pores, and therefore the lithium ion diffusion will be satisfactory and thus a high input/output characteristic can be exhibited. Since this allows the lithium ion doping amount to be increased, the negative electrode can be made into a thin-film. If the BET specific surface area is no greater than 1,500 m$^2$/g, the lithium ion charge/discharge efficiency will be increased, and therefore the cycle durability will be less likely to be impaired.

The mean pore size of composite carbon material 1a is preferably 20 Å or larger, more preferably 25 Å or larger and even more preferably 30 Å or larger, from the viewpoint of obtaining a high input/output characteristic. The mean pore size is preferably no larger than 65 Å and more preferably no larger than 60 Å, from the viewpoint of obtaining high energy density.

The mean particle diameter of the composite carbon material 1a is preferably 1 μm to 10 μm. The lower limit is more preferably 2 μm and even more preferably 2.5 μm. The upper limit is more preferably no greater than 6 μm and even more preferably no greater than 4 μm. If the mean particle diameter is 1 μm to 10 μm, then satisfactory durability will be maintained.

For composite carbon material 1a, the atomic ratio of hydrogen/carbon atom (H/C) is preferably 0.05 to 0.35 and more preferably 0.05 to 0.15. If H/C is 0.35 or smaller, the structure of the carbonaceous material adhering to the activated carbon surface (typically a polycyclic aromatic conjugated structure) will satisfactorily develop and the capacitance (energy density) and charge/discharge efficiency will increase. If H/C is 0.05 or larger, excessive carbonization will be suppressed, and therefore satisfactory energy density will be obtained. The H/C ratio is measured with an elemental analyzer.

Composite carbon material 1a has an amorphous structure derived from the activated carbon of the base material, but it simultaneously also has a crystal structure derived mainly from the coated carbonaceous material. Based on wide-angle X-ray diffraction, in the composite carbon material A, preferably the plane spacing d002 of the (002) plane is 3.60 Å to 4.00 Å and the crystallite size Lc in the c-axis direction obtained from the half-power band width of the peak is 8.0 Å to 20.0 Å, and more preferably d002 is 3.60 Å to 3.75 Å and the crystallite size Lc in the c-axis direction obtained from the half width of the peak is 11.0 Å to 16.0 Å.

The activated carbon used as the base material for composite carbon material 1a is not particularly restricted so long as the obtained composite carbon material 1a exhibits the desired properties. For example, it is possible to use a commercially available product obtained from a petroleum-based, coal-based, plant-based or polymer-based starting material. It is particularly preferred to use activated carbon powder having a mean particle diameter of 1 μm to 15 μm. The mean particle diameter is more preferably 2 μm to 10 μm.

In order to obtain composite carbon material 1a having the pore distribution range specified for this embodiment, the pore distribution of the activated carbon used as the base material is important.

For the activated carbon, preferably $0.050 \leq V_1 \leq 0.500$, $0.005 \leq V_2 \leq 1.000$ and $0.2 \leq V_1/V_2 \leq 20.0$, where $V_1$ (cc/g) is the mesopore volume due to pores with diameters of 20 Å to 500 Å, as calculated by the BJH method, and $V_2$ (cc/g) is the micropore volume due to pores with diameters of smaller than 20 Å as calculated by the MP method.

The mesopore volume $V_1$ satisfies more preferably $0.050 \leq V_1 \leq 0.350$, and even more preferably $0.100 \leq V_1 \leq 0.300$. The micropore volume $V_2$ satisfies more preferably $0.005 \leq V_2 \leq 0.850$ and even more preferably $0.100 \leq V_2 \leq 0.800$. The mesopore volume/micropore volume ratio preferably satisfies $0.22 \leq V_1/V_2 \leq 15.0$, and more preferably $0.25 \leq V_1/V_2 \leq 10.0$. When the mesopore volume $V_1$ of the activated carbon is 0.500 or smaller and the micropore volume $V_2$ is 1.000 or smaller, coating a suitable amount of carbonaceous material will be sufficient for obtaining a pore structure for the composite carbon material 1a according to this embodiment, and it will therefore tend to be easier to control the pore structure. When the mesopore volume $V_1$ of the activated carbon is 0.050 or greater and the micropore volume $V_2$ is 0.005 or greater, a structure can be easily obtained if $V_1/V_2$ is 0.2 or greater and $V_1/V_2$ is no greater than 20.0.

A carbonaceous material precursor to be used as a starting material for composite carbon material 1a is a solid, liquid or solvent-soluble organic material that can be coated as a carbonaceous material onto activated carbon by heat treatment. The carbonaceous material precursor may be, for example, pitch, mesocarbon microbeads, coke or a synthetic resin (for example, a phenol resin). Among such carbonaceous material precursors, the use of inexpensive pitch is preferred in terms of production cost. Pitch is largely classified as petroleum-based pitch or coal-based pitch. Examples of petroleum-based pitch include crude oil distillation residue, fluid catalytic cracking residue (decant oil and the like), bottom oil from thermal crackers, and ethylene tar obtained during naphtha cracking.

When pitch is used, composite carbon material 1a can be obtained by heat treatment of the pitch in the co-presence of activated carbon, causing thermal reaction of the volatile components and thermal decomposition components of the pitch on the surface of the activated carbon to coat the carbonaceous material onto the activated carbon. In this case, coating of the volatile components or thermal decomposition components of the pitch inside the pores of the activated carbon proceeds at a temperature of about 200 to 500° C., and the coated components undergo reaction to form a carbonaceous material at 400° C. or higher. The peak temperature during heat treatment (maximum ultimate temperature) may be appropriately set depending on the properties of the composite carbon material 1a to be obtained, the thermal reaction pattern and the thermal reaction atmosphere, but it is preferably 400° C. or higher, more preferably 450° C. to 1,000° C. and even more preferably about 500 to 800° C. The time for which the peak temperature is maintained during heat treatment is preferably 30 minutes to 10 hours, more preferably 1 hour to 7 hours and even more preferably 2 hours to 5 hours. For example, with heat treatment at a peak temperature of about 500 to 800° C. over a period of 2 hours to 5 hours, the carbonaceous material adhering to the activated carbon surface is thought to be converted to polycyclic aromatic hydrocarbons.

The softening point of the pitch used is preferably 30° C. to 250° C. and more preferably 60° C. to 130° C. Pitch with a softening point of 30° C. or higher will allow precise charging to be carried out without impairing the handleability. Pitch with a softening point of no higher than 250° C. comprises a relatively large number of low molecular compounds, and therefore using such pitch will allow coating even to the relatively fine pores in the activated carbon.

The specific method for producing composite carbon material 1a may be, for example, a method in which activated carbon is heat treated in an inert atmosphere containing a hydrocarbon gas volatilized from the carbonaceous material precursor, and coated with the carbonaceous material in a gas phase. It may also be a method in which the activated carbon and carbonaceous material precursor are pre-mixed and then heat treated, or the carbonaceous material precursor dissolved in a solvent is coated onto the activated carbon and dried, and then heat treated.

The weight ratio of the carbonaceous material with respect to the activated carbon in composite carbon material 1a is preferably 10% to 100% and more preferably 15% to 80%. If the weight ratio of the carbonaceous material is 10% or greater, it will be possible to suitably fill the micropores of the activated carbon with the carbonaceous material, and the charge/discharge efficiency of lithium ions will be increased, thus minimizing loss of cycle durability. If the weight ratio of the carbonaceous material is no greater than 100%, the pores in the composite carbon material 1a will be suitably conserved and a high specific surface area will be maintained. The lithium ion doping amount can therefore be increased, consequently allowing high output density and high durability to be maintained even if the negative electrode is a thin-film.

(Composite Carbon Material 2a)

Composite carbon material 2a is a composite carbon material using at least one type of carbon material with a BET specific surface area of 0.5 m²/g to 80 m²/g as the base material. The base material is not particularly restricted, and natural graphite, artificial graphite, low crystalline graphite, hard carbon, soft carbon, carbon black or the like may be suitably used.

The BET specific surface area of composite carbon material 2a is preferably 1 m²/g to 50 m²/g, more preferably 1.5 m²/g to 40 m²/g and even more preferably 2 m²/g to 25 m²/g. If the BET specific surface area is 1 m²/g or greater, it will be possible to adequately ensure reaction sites with the lithium ions, and to thus exhibit a high input/output characteristic. If the BET specific surface area is no greater than 50 m²/g, the lithium ion charge/discharge efficiency will be increased and decomposition reaction of the nonaqueous electrolytic solution during charge/discharge will be inhibited, thus allowing high cycle durability to be exhibited.

The mean particle diameter of composite carbon material 2a is preferably 1 μm to 10 μm, more preferably 2 μm to 8 μm and even more preferably 3 μm to 6 μm. If the mean particle diameter is 1 μm or larger it will be possible to increase the lithium ion charge/discharge efficiency, and to thus exhibit high cycle durability. If the mean particle diameter is no larger than 10 μm, the reaction area between composite carbon material 2a and the nonaqueous electrolytic solution will increase, allowing a high input/output characteristic to be exhibited.

The weight ratio of the carbonaceous material with respect to the base material in composite carbon material 2a is preferably 1% to 30%, more preferably 1.2% to 25% and even more preferably 1.5% to 20%. If the weight ratio of the carbonaceous material is 1% or greater, the number of reaction sites with lithium ion can be adequately increased by the carbonaceous material, and desolvation of the lithium ion will be facilitated, thus allowing a high input/output characteristic to be exhibited. If the weight ratio of the carbonaceous material is no greater than 20%, on the other hand, it will be possible to satisfactorily maintain solid diffusion of lithium ions between the carbonaceous material and base material, and therefore a high input/output characteristic can be exhibited. In addition, the lithium ion charge/discharge efficiency can be increased, and therefore high cycle durability can be exhibited.

The lithium ion doping amount per unit weight of composite carbon material 2a is preferably 50 mAh/g to 700 mAh/g, more preferably 70 mAh/g to 650 mAh/g, even more preferably 90 mAh/g to 600 mAh/g and most preferably 100 mAh/g to 550 mAh/g.

Doping lithium ion lowers the potential of the negative electrode. Thus, when a negative electrode containing composite carbon material 2a doped with lithium ion is combined with a positive electrode, the voltage of the nonaqueous lithium power storage element is increased and the utilizable capacity of the positive electrode is increased. Therefore, the capacitance and energy density of the obtained nonaqueous lithium power storage element increases.

If the doping amount is 50 mAh/g or greater, lithium ion will be satisfactorily doped even at irreversible sites where lithium ion in the composite carbon material 2a cannot be desorbed after once being inserted, and therefore high energy density can be obtained. As the doping amount increases, the negative electrode potential decreases and the input/output characteristic, energy density and durability increase.

If the doping amount is no greater than 700 mAh/g, there will be a lower risk of side-effects such as deposition of lithium metal.

The doping amount of lithium ion in the negative electrode active material (mAh/g) of the nonaqueous lithium power storage element, during shipping and after use, according to this embodiment, can be determined in the following manner, for example.

First, after washing the negative electrode active material layer with ethylmethyl carbonate or dimethyl carbonate and air-drying it, it is extracted with a mixed solvent composed of methanol and isopropanol, to obtain the extract and the extracted negative electrode active material layer. The extraction will typically be carried out in an Ar box at an environmental temperature of 23° C.

The lithium amounts in the extract obtained in this manner and the extracted negative electrode active material layer are each quantified using ICP-MS (Inductively Coupled Plasma-Mass Spectrometry), for example, and the total is calculated to determine the lithium ion doping amount in the negative electrode active material. The obtained value may be divided by the amount of negative electrode active material used for extraction, to calculate the lithium ion doping amount (mAh/g).

Composite carbon material 2a using a graphite material as the base material will now be explained as a preferred example of composite carbon material 2a.

The mean particle diameter of composite carbon material 2a is preferably 1 µm to 10 µm, more preferably 2 µm to 8 µm and even more preferably 3 µm to 6 µm. If the mean particle diameter is 1 µm or larger it will be possible to increase the lithium ion charge/discharge efficiency, and to thus exhibit high cycle durability. If the mean particle diameter is no larger than 10 µm, the reaction area between composite carbon material 2a and the nonaqueous electrolytic solution will increase, allowing a high input/output characteristic to be exhibited.

The BET specific surface area of composite carbon material 2a is preferably 1 $m^2/g$ to 20 $m^2/g$ and more preferably 1 $m^2/g$ to 15 $m^2/g$. If the BET specific surface area is 1 $m^2/g$ or greater, it will be possible to adequately ensure reaction sites with the lithium ions, and to thus exhibit a high input/output characteristic. If the BET specific surface area is no greater than 20 $m^2/g$, the lithium ion charge/discharge efficiency will be increased and decomposition reaction of the nonaqueous electrolytic solution during charge/discharge will be inhibited, thus allowing high cycle durability to be exhibited.

The graphite material to be used as the base material is not particularly restricted, so long as the obtained composite carbon material 2a exhibits the desired properties. Examples that may be used include artificial graphite, natural graphite, graphitized mesophase carbon microspheres and graphite whiskers. The mean particle diameter of the graphite material is preferably 1 µm to 10 µm and more preferably 2 µm to 8 µm.

A carbonaceous material precursor to be used as a starting material for composite carbon material 2a is a solid, liquid or solvent-soluble organic material that allows the carbonaceous material to be composited with a graphite material by heat treatment. The carbonaceous material precursor may be, for example, pitch, mesocarbon microbeads, coke or a synthetic resin (for example, a phenol resin). Among such carbonaceous material precursors, the use of inexpensive pitch is preferred in terms of production cost. Pitch is largely classified as petroleum-based pitch or coal-based pitch. Examples of petroleum pitch include crude oil distillation residue, fluid catalytic cracking residue (decant oil and the like), bottom oil from thermal crackers, and ethylene tar obtained during naphtha cracking.

The weight ratio of the graphite material of the carbonaceous material with respect to composite carbon material 2a is preferably 1% to 10%, more preferably 1.2% to 8%, even more preferably 1.5% to 6% and most preferably 2% to 5%. If the weight ratio of the carbonaceous material is 1% or greater, the number of reaction sites with lithium ion can be adequately increased by the carbonaceous material, and desolvation of the lithium ion will be facilitated, thus allowing a high input/output characteristic to be exhibited. If the weight ratio of the carbonaceous material is no greater than 20%, it will be possible to satisfactorily maintain solid diffusion of lithium ions between the carbonaceous material and graphite material, and therefore a high input/output characteristic can be exhibited. In addition, the lithium ion charge/discharge efficiency can be increased, and consequently high cycle durability can be exhibited.

(Other Components of Negative Electrode Active Material Layer)

The negative electrode active material layer may also contain optional components such as a conductive filler, binder and dispersion stabilizer, as necessary, in addition to the negative electrode active material.

The type of conductive filler is not particularly restricted, and examples include acetylene black, Ketchen black and vapor grown carbon fibers. The amount of conductive filler used is preferably 0 parts by weight to 30 parts by weight, more preferably 0 parts by weight to 20 parts by weight and even more preferably 0 parts by weight to 15 parts by weight, with respect to 100 parts by weight of the negative electrode active material.

The binder is not particularly restricted, and for example, PVdF (polyvinylidene fluoride), PTFE (polytetrafluoroethylene), polyimide, latex, styrene-butadiene copolymer, fluorine rubber or an acrylic copolymer may be used. The amount of binder used is preferably 1 part by weight to 30 parts by weight, more preferably 2 parts by weight to 27 parts by weight and even more preferably 3 parts by weight to 25 parts by weight, with respect to 100 parts by weight of the negative electrode active material. If the amount of binder is 1 weight % or greater, adequate electrode strength will be exhibited. If the amount of binder is no greater than 30 parts by weight, a high input/output characteristic will be exhibited without inhibiting movement of lithium ions into the negative electrode active material.

The dispersion stabilizer is not particularly restricted, and for example, PVP (polyvinylpyrrolidone), PVA (polyvinyl alcohol) or cellulose derivatives may be used. The amount of binder used is preferably 0 parts by weight to 10 parts by weight, with respect to 100 parts by weight of the negative electrode active material. If the amount of dispersion stabilizer is no greater than 10 parts by weight, a high input/output characteristic will be exhibited without inhibiting movement of lithium ions into the negative electrode active material.

[Negative Electrode Power Collector]

The material composing the negative electrode power collector is preferably a metal foil with high electron conductivity and resistance to degradation by elution into the electrolytic solution or reaction with the electrolyte or ion. There are no particular restrictions on such metal foils, and examples include aluminum foils, copper foils, nickel foils and stainless steel foils. The negative electrode power collector in the nonaqueous lithium power storage element of this embodiment is preferably a copper foil.

The metal foil of the first embodiment may be a common metal foil without ruggedness or through-holes, or it may be a metal foil having ruggedness formed by embossing, chemical etching, electrolytic deposition or blasting, or it may be a metal foil having through-holes, such as an expanded metal, punching metal or etching foil.

The metal foil of the second embodiment is a common metal foil having no rugedness or through-holes, but it may also be a metal foil having ruggedness formed by embossing, chemical etching, electrolytic deposition or blasting, or a metal foil having through-holes such as expanded metal, punching metal or etching foil, so long as it is used as a "nonporous negative electrode power collector" as defined above.

The thickness of the negative electrode power collector is not particularly restricted so long as it allows the shape and strength of the negative electrode to be maintained, but 1 to 100 µm, for example, is preferred.

[Production of Negative Electrode]

The negative electrode can be produced by forming a negative electrode active material layer on one or both sides of the negative electrode power collector. According to a typical aspect, the negative electrode active material layer is anchored to the negative electrode power collector.

The negative electrode can be produced by a known electrode production technique for lithium ion batteries or electrical double layer capacitors. For example, different materials containing a negative electrode active material may be dispersed and dissolved in water or an organic solvent to prepare a slurry-like coating solution, and the coating solution coated onto one or both sides of a negative electrode power collector to form a coating film, which is dried to obtain a negative electrode. The obtained negative electrode may also be pressed to adjust the film thickness or bulk density of the negative electrode active material layer. As an alternative method, various materials containing negative electrode active materials may also be dry-mixed without using a solvent, and the obtained mixture press-molded and then attached to a negative electrode power collector using a conductive adhesive.

The coating solution may also be prepared by dry blending all or a portion of each of the starting material powders containing the negative electrode active material, and then adding water or an organic solvent, and/or adding a liquid or slurry-like substance comprising a binder or dispersion stabilizer dissolved or dispersed in them. It may also be prepared by adding various starting powders containing the negative electrode active material, to a liquid or slurry-like substance comprising a binder or dispersion stabilizer dissolved or dispersed in water or an organic solvent. Preparation of the coating solution is not particularly restricted, and a disperser such as a homodisperser or multiscrew disperser, planetary mixer, thin-film spinning high-speed mixer or the like, may be suitably used. In order to obtain a coating solution in a satisfactorily dispersed state, it is preferred for the dispersion to be at a circumferential speed of 1 m/s to 50 m/s. It is preferred if the circumferential speed is 1 m/s or greater, because this will allow each material to satisfactorily dissolve or disperse. It is also preferred if the circumferential speed is no greater than 50 m/s, because each material will be unlikely to be broken down by heat or shear force during dispersion, and less reaggregation will take place.

The viscosity ($\eta$b) of the coating solution is preferably 1,000 mPa·s to 20,000 mPa·s, more preferably 1,500 mPa·s to 10,000 mPa·s and even more preferably 1,700 mPa·s to 5,000 mPa·s. If the viscosity ($\eta$b) is 1,000 mPa·s or higher, liquid dripping during formation of the coating film will be suppressed, and the coating film width and thickness can be satisfactorily controlled. If the viscosity ($\eta$b) is no higher than 20,000 mPa·s, there will be less pressure loss in the flow channel of the coating solution when a coating machine is used, allowing stable coating to be carried out, and allowing control to less than the prescribed coating film thickness.

The TI value (thixotropy index value) of the coating solution is preferably 1.1 or greater, more preferably 1.2 or greater and even more preferably 1.5 or greater. If the TI value is 1.1 or greater, the coating film width and thickness can be satisfactorily controlled.

The method of forming a coating film is not particularly restricted, and a coating machine such as a die coater, comma coater, knife coater or gravure coating machine may be suitably used. The coating film may be formed by monolayer coating or by multilayer coating. The coating speed is preferably 0.1 m/min to 100 m/min, more preferably 0.5 m/min to 70 m/min and even more preferably 1 m/min to 50 m/min. If the coating speed is 0.1 m/min or greater, stable coating will be possible. If the coating speed is 100 m/min or lower, the coating precision can be adequately ensured.

The method of drying the coating film is not particularly restricted, and a drying method such as hot air drying or infrared ray (IR) drying may be suitably employed. Drying of the coating film may be drying at a single temperature, or it may be drying while varying the temperature in different stages. Several drying methods may also be used in combination for drying. The drying temperature is preferably 25°

C. to 200° C., more preferably 40° C. to 180° C. and even more preferably 50° C. to 160° C. If the drying temperature is 25° C. or higher, it will be possible to adequately volatilize off the solvent in the coating film. If the drying temperature is no higher than 200° C., it will be possible to reduce cracking of the coating film by rapid volatilization of the solvent or maldistribution of the binder by migration, and oxidation of the negative electrode power collector or negative electrode active material layer.

The method of pressing the negative electrode is not particularly restricted, and a pressing machine such as a hydraulic press or vacuum pressing machine may be suitably used. The film thickness, bulk density and electrode strength of the negative electrode active material layer can be adjusted by the pressing pressure, the gap, and the surface temperature of the pressed portion, as described below. The pressing pressure is preferably 0.5 kN/cm to 20 kN/cm, more preferably 1 kN/cm to 10 kN/cm and even more preferably 2 kN/cm to 7 kN/cm. If the pressing pressure is 0.5 kN/cm or greater, it will be possible to adequately increase the electrode strength. If the pressing pressure is no greater than 20 kN/cm, there will be less distortion or wrinkling in the negative electrode, and adjustment can be made to the desired film thickness and bulk density for the negative electrode active material layer. The gap between the press rolls may be set to a desired value depending on the film thickness of the dried negative electrode, so that the desired film thickness and bulk density of the negative electrode active material layer is obtained. The pressing speed may also be set to the desired speed, so as to minimize distortion and wrinkling in the negative electrode. The surface temperature of the pressed portion may be room temperature, or it may be heated instead, if necessary. In the case of heating, the lower limit for the surface temperature of the pressed portion is at least the melting point of the binder used minus preferably 60° C., more preferably 45° C. and even more preferably 30° C. In the case of heating, the upper limit for the surface temperature of the pressed portion is no higher than the melting point of the binder used plus preferably 50° C., more preferably 30° C. and even more preferably 20° C. For example, when PVdF (polyvinylidene fluoride: melting point=150° C.) is used as the binder, heating is to preferably between 90° C. and 200° C., more preferably between 105° C. and 180° C. and even more preferably between 120° C. and 170° C. When a styrene-butadiene copolymer (melting point=100° C.) is used as the binder, heating is to preferably between 40° C. and 150° C., more preferably between 55° C. and 130° C. and even more preferably between 70° C. and 120° C.

The melting point of the binder can be determined by the endothermic peak position in DSC (Differential Scanning calorimetry). For example, using a "DSC7" differential scanning calorimeter by Perkin-Elmer, 10 mg of sample resin is set in the measuring cell and the temperature is increased from 30° C. to 250° C. at a temperature-elevating rate of 10° C./min, in a nitrogen gas atmosphere, the melting point being the endothermic peak temperature during the temperature elevation.

Pressing may also be carried out multiple times while varying the conditions including the pressing pressure, gap, speed, and pressed portion surface temperature.

The thickness of the negative electrode active material layer is preferably 5 µm to 100 µm, for each side. The lower limit for the thickness of the negative electrode active material layer is more preferably 7 µm or greater and even more preferably 10 µm or greater. The upper limit for the thickness of the negative electrode active material layer is more preferably no greater than 80 µm and even more preferably no greater than 60 µm. If the thickness of the negative electrode active material layer is 5 µm or greater, the coatability will be excellent without streaking during coating of the negative electrode active material layer. If the thickness of the negative electrode active material layer is 100 µm or lower, high energy density can be exhibited by reduction of the cell volume. The thickness of the negative electrode active material layer, when the power collector has through-holes or ruggedness, is the mean value of the thickness for each side at the sections of the power collector without through-holes or ruggedness.

The bulk density of the negative electrode active material layer is preferably 0.30 $g/cm^3$ to 1.8 $g/cm^3$, more preferably 0.40 $g/cm^3$ to 1.5 $g/cm^3$ and even more preferably 0.45 $g/cm^3$ to 1.3 $g/cm^3$. If the bulk density is 0.30 $g/cm^3$ or greater, sufficient strength can be obtained and sufficient conductivity can be exhibited between the negative electrode active materials. If the bulk density is 1.8 $g/cm^3$ or lower, it will be possible to ensure pores through which the ions can be sufficiently diffused in the negative electrode active material layer.

The BET specific surface area, mesopore volume and micropore volume are the values determined by the following respective methods. A sample is vacuum dried at 200° C. for a day and a night, and the adsorption/desorption isotherm is measured using nitrogen as the adsorbate. Using the obtained isotherm on the adsorption side, the BET specific surface area is calculated by the multipoint BET method or single point BET method, the mesopore volume by the BJH method, and the micropore volume by the MP method.

The BJH method is a method of calculation commonly used for analysis of mesopores, and it was advocated by Barrett, Joyner, Halenda et al. (NPL 1).

The MP method is a method in which the "t-plot method" (NPL 2) is utilized to determine micropore volume, micropore area and micropore distribution, and it is the method proposed by M. Mikhail, Brunauer and Bodor (NPL 3).

<Separator>

The positive electrode precursor and negative electrode may be laminated or wound via a separator, to form an electrode laminated body or wound electrode comprising a positive electrode precursor, negative electrode and separator.

The separator used may be a polyethylene microporous film or polypropylene microporous film used in lithium ion secondary batteries, or a cellulose nonwoven sheet used in electrical double layer capacitors. A film containing organic or inorganic microparticles may also be laminated on one or both sides of these separators. Organic or inorganic microparticles may also be included inside a separator.

The thickness of the separator is preferably 5 µm to 35 µm. The thickness is preferably 5 µm or greater, as this will tend to reduce self-discharge due to internal microshorts. The thickness is also preferably no greater than 35 µm, as this will tend to result in a higher output characteristic of the power storage element.

The thickness of a film containing organic or inorganic microparticles is preferably 1 µm to 10 µm. The thickness is preferably 1 µm or greater, as this will tend to reduce self-discharge due to internal microshorts. The thickness is also preferably no greater than 10 µm, as this will tend to result in a higher output characteristic of the power storage element.

<Casing>

For this embodiment, the casing used may be a metal can or laminate film.

The laminate film is preferably a laminated film of a metal foil and a resin film, an example of which is a three-layer structure composed of the structure: outer layer resin film/metal foil/inner layer resin film. The outer layer resin film serves to prevent damage to the metal foil by contact, and a resin such as nylon or polyester may be suitably used. The metal foil serves to prevent penetration of moisture and gas, and a foil such as copper, aluminum or stainless steel may be suitably used. The inner layer resin film serves to protect the metal foil from the electrolytic solution housed inside while also providing a melt seal during heat sealing of the casing, and a polyolefin or acid-modified polyolefin may be suitably used.

The casing of the third embodiment has at least one valve capable of controlling the pressure in the casing to a low pressure. The casing used for the nonaqueous lithium power storage element of the third embodiment is a metal casing. Using a metal casing is advantageous from the viewpoint of high impact resistance, vibration resistance and heat dissipation. There are no particular restrictions on the metal composing the casing, and a metal material such as iron or aluminum, for example, may be used, with aluminum being preferred from the viewpoint of reducing the weight of the nonaqueous lithium power storage element. From the viewpoint of minimizing excess volume, the shape of the casing is preferably rectilinear when the electrode body is a laminated body or flat-shaped wound body, and is preferably cylindrical in the case of a cylindrical wound body.

<Degassing Valve>

There are no particular restrictions on the valve capable of controlling the pressure inside the casing to a low pressure, i.e. the degassing valve, to be used in the nonaqueous lithium power storage element of the third embodiment, and it may be a valve having a mechanism such that the valve is closed by spring force and begins to open under a specified pressure; a valve wherein a valve membrane is pressed with a ring member to laser-weld the ring member to a metal cap of the metal casing; or a safety valve wherein a solvent-resistant elastic solid is used as the valve element. Attachment of the degassing-valved metal cap onto the nonaqueous lithium power storage element may be attachment during vacuum sealing after filling and impregnation of the nonaqueous electrolytic solution, or attachment after lithium doping.

The working pressure of the degassing valve is such that the internal pressure of the casing is 0.01 MPa to 0.15 MPa and more preferably 0.05 MPa to 0.1 MPa. If it is 0.01 MPa or greater, it will not operate by external force such as vibration but will operate by increase in internal pressure due to gas generated in the casing, thereby allowing the gas component alone to be selectively released to the outside. If it is no greater than 0.15 MPa, the casing will not deform by internal pressure, and it will be possible to reduce physical impacts on the periphery during unsealing.

<Nonaqueous Electrolytic Solution>

The electrolytic solution for this embodiment is a nonaqueous electrolytic solution.

Specifically, the electrolytic solution includes a nonaqueous solvent as described below. The nonaqueous electrolytic solution comprises a lithium salt dissolved at a concentration of 0.5 mol/L or greater based on the total amount of the nonaqueous electrolytic solution. That is, the nonaqueous electrolytic solution contains lithium ion as an electrolyte.

The nonaqueous electrolytic solution of this embodiment may use a lithium salt such as $(LiN(SO_2F)_2)$, $LiN(SO_2CF_3)_2$, $LiN(SO_2C_2F_5)_2$, $LiN(SO_2CF_3)(SO_2C_2F_5)$, $LiN(SO_2CF_3)(SO_2C_2F_4H)$, $LiC(SO_2F)_3$, $LiC(SO_2CF_3)_3$, $LiC(SO_2C_2F_5)_3$, $LiCF_3SO_3$, $LiC_4F_9SO_3$, $LiPF_6$ or $LiBF_4$, either alone or in mixtures of two more. It also preferably contains $LiPF_6$ and/or $LiN(SO_2F)_2$, since these will allow high conductivity to be exhibited.

It is sufficient if the nonaqueous electrolytic solution of this embodiment comprises at least one type of lithium salt, and it may comprise, in addition to the lithium salt, an alkali metal salt selected from the group consisting of sodium salts, potassium salts, rubidium salts and cesium salts; and/or an alkaline earth metal salt selected from the group consisting of beryllium salts, magnesium salts, calcium salts, strontium salts and barium salts.

When the nonaqueous electrolytic solution comprises such an alkali metal salt in addition to lithium, since sodium ion, potassium ion, rubidium ion and cesium ion, which have smaller Stokes radii than lithium ion, have high ionic conductance, they allow a low-resistance nonaqueous lithium power storage element to be obtained. When the nonaqueous electrolytic solution comprises such an alkaline earth metal salt in addition to lithium, since beryllium ion, magnesium ion, calcium ion, strontium ion and barium ion are divalent cations, they allow a nonaqueous lithium power storage element with high capacitance to be obtained.

There are no particular restrictions on the method of adding an alkali metal salt and/or an alkaline earth metal salt to the nonaqueous electrolytic solution in addition to the lithium salt, but it may be, for example, a method of predissolving the lithium salt and an alkali metal salt and/or an alkaline earth metal salt in addition to the lithium salt to the nonaqueous electrolytic solution;

a method of adding one or more selected from the group consisting of the following formulas:

oxides such as $M_2O$, hydroxides such as MOH, halides such as MF or MCl, oxalates such as $M_2(CO_2)_2$, and carboxylates such as RCOOM (where R is H, an alkyl group or an aryl group, and M is one or more selected from among Na, K, Rb and Cs), to the positive electrode precursor, and decomposing them during the lithium doping step; or a method of adding one or more selected from the group consisting of alkaline earth metal carbonates selected from among $BeCO_3$, $MgCO_3$, $CaCO_3$, $SrCO_3$ and $BaCO_3$, and alkaline earth metal oxides, alkaline earth metal hydroxides, alkaline earth metal halides, alkaline earth metal oxalates and alkaline earth metal carboxylates, to the positive electrode precursor, and decomposing them during the lithium doping step.

The lithium salt concentration in the nonaqueous electrolytic solution is preferably 0.5 mol/L or greater and more preferably 0.5 to 2.0 mol/L. If the lithium salt concentration is 0.5 mol/L or greater, anions will be sufficiently present to allow sufficiently high power storage element capacitance. The lithium salt concentration is preferably 2.0 mol/L or lower, because this can prevent precipitation of the undissolved lithium salt in the nonaqueous electrolytic solution and prevent the viscosity of the electrolytic solution from becoming too high, and will minimize reduction in the conductivity or the output characteristic as well.

When an alkali metal salt and/or alkaline earth metal salt is added to the nonaqueous electrolytic solution in addition to the lithium salt, the total concentration of the salts is preferably 0.5 mol/L or greater and more preferably 0.5 to 2.0 mol/L.

The nonaqueous electrolytic solution of this embodiment preferably comprises a cyclic carbonate and linear carbonate as nonaqueous solvents. If the nonaqueous electrolytic solution comprises a cyclic carbonate and a linear carbonate, this will be advantageous from the viewpoint of dissolving the lithium salt to the desired concentration and exhibiting high lithium ion conductivity. Examples of cyclic carbonates include alkylene carbonate compounds, representative of which are ethylene carbonate, propylene carbonate and butylene carbonate. An alkylene carbonate compound will typically be unsubstituted. Linear carbonates include dialkyl carbonate compounds, representative of which are dimethyl carbonate, diethyl carbonate, ethylmethyl carbonate, dipropyl carbonate and dibutyl carbonate. A dialkyl carbonate compound will typically be unsubstituted.

The total content of the cyclic carbonate and linear carbonate is preferably 50 weight % or greater and more preferably 65 weight % or greater, and preferably no greater than 95 weight % and more preferably no greater than 90 weight %, based on the total amount of the nonaqueous electrolytic solution. If the total content of the cyclic carbonate and linear carbonate is 50 weight % or greater it will be possible to dissolve the desired concentration of lithium salt, allowing high lithium ion conductivity to be exhibited. If the total content of the cyclic carbonate and linear carbonate is no greater than 95 weight %, the electrolytic solution will be able to further comprise the additives mentioned below.

The nonaqueous electrolytic solution of this embodiment may also further comprise additives. The additives are not particularly restricted, and for example, they include sultone compounds, cyclic phosphazenes, acyclic fluoroethers, fluorinated cyclic carbonates, cyclic carbonates, cyclic carboxylates, and cyclic acid anhydrides, which may be used alone or in mixtures of two or more.

For this embodiment, the additives are preferably saturated cyclic sultone compounds, from the viewpoint of minimizing adverse effects on the resistance, and the viewpoint of suppressing decomposition of the nonaqueous electrolytic solution at high temperature to minimize gas generation. Preferred saturated cyclic sultone compounds include 1,3-propanesultone, 2,4-butanesultone, 1,4-butanesultone, 1,3-butanesultone and 2,4-pentanesultone, preferred unsaturated cyclic sultone compounds include 1,3-propenesultone and 1,4-butenesultone, and other sultone compounds include methylenebis(benzenesulfonic acid), methylenebis(phenylmethanesulfonic acid), methylenebis(ethanesulfonic acid), methylenebis(2,4,6,trimethylbenzenesulfonic acid) and methylenebis(2-trifluoromethylbenzenesulfonic acid). One or more saturated cyclic sultone compounds are preferably selected from among these.

The total content of sultone compounds in the nonaqueous electrolytic solution of the nonaqueous lithium power storage element of this embodiment is preferably 0.1 weight % to 15 weight %, based on the total amount of the nonaqueous electrolytic solution. If the total content of sultone compounds in the nonaqueous electrolytic solution is 0.1 weight % or greater, it will be possible to suppress decomposition of the electrolytic solution at high temperature and to reduce gas generation. If the total content is no greater than 15 weight %, on the other hand, it will be possible to lower the ionic conductance of the electrolytic solution, and to maintain a high input/output characteristic. The content of sultone compounds in the nonaqueous electrolytic solution of the nonaqueous lithium power storage element is preferably 0.5 weight % to 10 weight % and more preferably 1 weight % to 5 weight %, from the viewpoint of obtaining both a high input/output characteristic and high durability.

Examples of cyclic phosphazenes include ethoxypentafluorocyclotriphosphazene, diethoxytetrafluorocyclotriphosphazene and phenoxypentafluorocyclotriphosphazene, and preferably one or more selected from these is used.

The content of the cyclic phosphazene in the nonaqueous electrolytic solution is preferably 0.5 weight % to 20 weight % based on the total amount of the nonaqueous electrolytic solution. If the cyclic phosphazene content is 0.5 weight % or greater, it will be possible to minimize decomposition of the electrolytic solution at high temperature and to reduce gas generation. If the cyclic phosphazene content is no greater than 20 weight %, it will be possible to lower the ionic conductance of the electrolytic solution, and to maintain a high input/output characteristic. For these reasons, the cyclic phosphazene content is preferably 2 weight % to 15 weight % and more preferably 4 weight % to 12 weight %.

These cyclic phosphazenes may be used alone, or two or more may be used in admixture.

Examples of acyclic fluoroethers include $HCF_2CF_2OCH_2CF_2CF_2H$, $CF_3CFHCF_2OCH_2CF_2CF_2H$, $HCF_2CF_2CH_2OCH_2CF_2CF_2H$ and $CF_3CFHCF_2OCH_2CF_2CFHCF_3$, among which $HCF_2CF_2OCH_2CF_2CF_2H$ is preferred from the viewpoint of electrochemical stability.

The content of the acyclic fluoroether is preferably 0.5 weight % to 15 weight %, and more preferably 1 weight % to 10 weight %, based on the total amount of the nonaqueous electrolytic solution. If the acyclic fluoroether content is 0.5 weight % or higher, the stability of the nonaqueous electrolytic solution against oxidative decomposition will be increased and a power storage element with high durability during high temperature will be obtained. If the acyclic fluoroether content is 15 weight % or lower, on the other hand, the electrolyte salt solubility will be kept satisfactory and high ionic conductance of the nonaqueous electrolytic solution will be maintained, thus allowing a high input/output characteristic to be exhibited.

The acyclic fluoroether used may be a single type or a mixture of two or more types.

The fluorinated cyclic carbonate used is preferably one selected from among fluoroethylene carbonate (FEC) and difluoroethylene carbonate (dFEC), from the viewpoint of compatibility with other nonaqueous solvents.

The content of the fluorine-containing cyclic carbonate is preferably 0.5 weight % to 10 weight %, and more preferably 1 weight % to 5 weight %, with respect to the total amount of the nonaqueous electrolytic solution. If the fluorine-containing cyclic carbonate content is 0.5 weight % or higher, it will be possible to form a satisfactory coating film on the negative electrode, and reductive decomposition of the electrolytic solution on the negative electrode will be suppressed, to obtain a power storage element with high durability at high temperature. If the fluorine-containing cyclic carbonate content is 10 weight % or lower, the electrolyte salt solubility will be kept satisfactory and high ionic conductance of the nonaqueous electrolytic solution will be maintained, thus allowing a high input/output characteristic to be exhibited.

The fluorine-containing cyclic carbonate may be used as a single type or as a mixture of two or more types.

The cyclic carbonate is preferably vinylene carbonate.

The cyclic carbonate content is preferably 0.5 weight % to 10 weight % and more preferably 1 weight % to 5 weight %, with respect to the total amount of the nonaqueous electrolytic solution. If the cyclic carbonate content is 0.5 weight % or higher, it will be possible to form a satisfactory coating film on the negative electrode, and reductive decomposition of the electrolytic solution on the negative electrode will be suppressed, to obtain a power storage element with high durability at high temperature. If the cyclic carbonate content is 10 weight % or lower, on the other hand, the electrolyte salt solubility will be kept satisfactory and high ionic conductance of the nonaqueous electrolytic solution will be maintained, thus allowing a high input/output characteristic to be exhibited.

Examples of cyclic carboxylates include γ-butyrolactone, γ-valerolactone, γ-caprolactone and ε-caprolactone, and preferably at least one selected from these is used. Particularly preferred among these is γ-butyrolactone, from the viewpoint of improving the cell characteristic due to improved lithium ion dissociation.

The content of the cyclic carboxylate is preferably 0.5 weight % to 15 weight % and more preferably 1 weight % to 5 weight %, with respect to the total amount of the nonaqueous electrolytic solution. If the cyclic acid anhydride content is 0.5 weight % or higher, it will be possible to form a satisfactory coating film on the negative electrode, and reductive decomposition of the electrolytic solution on the negative electrode will be suppressed, to obtain a power storage element with high durability during periods of high temperature. If the cyclic carboxylate content is 5 weight % or lower, the electrolyte salt solubility will be kept satisfactory and high ionic conductance of the nonaqueous electrolytic solution will be maintained, thus allowing a high input/output characteristic to be exhibited.

A cyclic carboxylate may be used alone, or two or more may be used in admixture.

The cyclic acid anhydride is preferably one or more selected from among succinic anhydride, maleic anhydride, citraconic anhydride and itaconic anhydride. Selection is most preferably made from succinic anhydride and maleic anhydride, from the viewpoint of ready industrial availability to reduce production cost of the electrolytic solution, and from the viewpoint of easier dissolution in the nonaqueous electrolytic solution.

The content of the cyclic acid anhydride is preferably 0.5 weight % to 15 weight %, and more preferably 1 weight % to 10 weight %, with respect to the total amount of the nonaqueous electrolytic solution. If the cyclic acid anhydride content is 0.5 weight % or higher, it will be possible to form a satisfactory coating film on the negative electrode, and reductive decomposition of the electrolytic solution on the negative electrode will be suppressed, to obtain a power storage element with high durability during periods of high temperature. If the cyclic acid anhydride content is 10 weight % or lower, the electrolyte salt solubility will be kept satisfactory and high ionic conductance of the nonaqueous electrolytic solution will be maintained, thus allowing a high input/output characteristic to be exhibited.

These cyclic acid anhydrides may be used alone, or two or more may be used in admixture.

<Method for Producing Nonaqueous Lithium Power Storage Element>

[Assembly]

An electrode laminated body obtained by assembly can be produced by laminating a positive electrode precursor and negative electrode cut into the shape of a sheet, via a separator, to obtain a laminated body, and connecting a positive electrode terminal and negative electrode terminal to the obtained laminated body. A wound electrode can be produced by laminating and winding a positive electrode precursor and negative electrode via a separator to obtain a wound body, and connecting a positive electrode terminal and negative electrode terminal are to the obtained wound body. The shape of the wound electrode may be cylindrical or flat.

The method of connecting the positive electrode terminal and negative electrode terminal is not particularly restricted, and a method such as resistance welding or ultrasonic welding may be employed.

The terminal-connected electrode laminated body or wound electrode is preferably dried to remove the residual solvent. The drying method is not restricted, and drying may be carried out by vacuum drying or the like. The residual solvent is preferably no greater than 1.5% per weight of the positive electrode active material layer or negative electrode active material layer. It is preferred if the residual solvent is no greater than 1.5%, because the solvent remaining in the system will be minimal and the self-discharge property will be improved.

The dried electrode laminated body or wound electrode is preferably stored in an casing, which is typically a metal can or laminate film, in a dry environment with a dew point of no higher than −40° C., and is preferably sealed, leaving only one of the openings. It is preferred if the dew point is no higher than −40° C., because moisture will be less likely to adhere to the electrode laminated body or wound electrode, resulting in less residue of water in the system and improving the self-discharge property. The method of sealing the casing is not particularly restricted, and a method such as heat sealing or impulse sealing may be employed.

[Filling, Impregnation and Sealing]

After assembly, the electrode laminated body housed in the casing is filled with the nonaqueous electrolytic solution. After filling, impregnation is again carried out and the positive electrode, negative electrode and separator are preferably thoroughly wetted with the nonaqueous electrolytic solution. If the electrolytic solution has not wetted at least a portion of the positive electrode, negative electrode and separator, then in the lithium doping procedure described below, doping will proceed in a non-uniform manner, resulting in increased resistance or lower durability of the obtained nonaqueous lithium power storage element. The method of impregnation is not particularly restricted, and for example, the method used may be setting the filled nonaqueous lithium power storage element in a pressure reduction chamber with the casing in an opened state, using a vacuum pump to bring the interior of the chamber to a reduced pressure state, and then restoring it to atmospheric pressure. After impregnation, the nonaqueous lithium power storage element with the casing in an opened state is sealed under reduced pressure, to hermetically seal it.

[Lithium Doping]

As a preferred procedure for lithium doping, a voltage is applied between the positive electrode precursor and the negative electrode to decompose the lithium compound, thereby decomposing the lithium compound in the positive electrode precursor and releasing lithium ions, and reducing the lithium ions at the negative electrode so that the negative electrode active material layer is predoped with lithium ions.

During the lithium doping, gas such as $CO_2$ is generated with oxidative decomposition of the lithium compound in the positive electrode precursor. It is therefore preferable to provide means for releasing the generated gas out of the casing during application of the voltage. Examples of such means include a method of applying a voltage with a portion of the casing in an open state; and a method of applying voltage with appropriate outgassing means such as a degassing valve or gas permeable film set beforehand on a portion of the casing.

[Aging]

After the lithium doping, the nonaqueous lithium power storage element is preferably subjected to aging. Aging causes the solvent in the electrolytic solution to decompose at the negative electrode, forming a lithium ion-permeable solid polymer coating film on the negative electrode surface.

The method of aging is not particularly restricted, and for example, a method of reacting the solvent in the electrolytic solution in a high-temperature environment may be used.

[Degassing]

After aging is complete, preferably degassing is further carried out to reliably remove the gas remaining in the electrolytic solution, the positive electrode and the negative electrode. Any gas remaining in at least portions of the electrolytic solution, positive electrode and negative electrode will interfere with ion conduction, thus increasing the resistance of the obtained nonaqueous lithium power storage element.

The method of degassing is not particularly restricted, and for example, the method used may be setting the nonaqueous lithium power storage element in a pressure reduction chamber with the casing in an opened state, and using a vacuum pump to bring the interior of the chamber to a reduced pressure state.

[Evaluation of Power Storage Element Properties]

(Electrostatic Capacitance)

Throughout the present specification, the electrostatic capacitance Fa (F) is the value obtained by the following method:

First, in a thermostatic bath set to 25° C., a cell corresponding to the nonaqueous lithium power storage element is subjected to constant-current charge at the 2 C current value until 3.8 V is reached, and then constant voltage charge is carried out for 30 minutes with application of a constant voltage of 3.8 V. Next, the capacitance after constant-current discharge to 2.2 V at the 2 C current value is recorded as Q (C). The obtained values of Q and voltage change $\Delta E_x$ (V) are used to calculate the electrostatic capacitance value $Fa=Q/\Delta E_x=Q/(3.8-2.2)$.

The current discharge rate (also referred to as "C rate") is the relative proportion of the current during discharge with respect to the service capacity, and generally the current value at which discharge is completed at 1 hour, with constant-current discharge from the maximum voltage to the minimum voltage, is defined as 1 C. Throughout the present specification, 1 C is the current value such that discharge is complete at 1 hour, upon constant-current discharge from a maximum voltage of 3.8 V to a minimum voltage of 2.2 V.

(Internal Resistance)

Throughout the present specification, the internal resistance Ra ($\Omega$) is the value obtained by the following method:

First, in a thermostatic bath set to 25° C., the nonaqueous lithium power storage element is subjected to constant-current charge at the 20 C current value until 3.8 V is reached, and then constant-voltage charge is carried out for 30 minutes in total with application of a constant voltage of 3.8 V. Next, constant-current discharge is carried out to 2.2 V with a sampling interval of 0.1 second and the 20 C current value, to obtain a discharge curve (time-voltage). From the discharge curve, internal resistance is the value calculated from the equations consisting of voltage drop $\Delta E=3.8-Eo$, with $Ra=\Delta E/(20$ C current value) when the voltage of Eo at discharge time=0 seconds, obtained by extrapolating by linear approximation from the voltage values at discharge times of 2 seconds and 4 seconds in the discharging curve.

[High Load Charge/Discharge Cycle Test]

For the present specification, the change in resistance and capacity retention after high load charge/discharge cycling testing are measured by the following methods.

(Change in Resistance After High Load Charge/Discharge Cycling)

First, a cell corresponding to the nonaqueous lithium power storage element is subjected to constant-current charge in a thermostatic bath set to 25° C., until reaching 3.8 V at the 200 C or 300 C current value, and then constant-current discharge is carried out until reaching 2.2 V at the 200 C or 300 C current value. The high load charge/discharge cycling is repeated 60,000 times, and the internal resistance Rb after high load charge/discharge cycling is measured by the internal resistance measurement method described above. Rb/Ra is recorded as the change in resistance after high load charge/discharge cycling. The change in resistance Rb/Ra after the high load charge/discharge cycle test is preferably no greater than 2.0, more preferably no greater than 1.5 and even more preferably no greater than 1.2. If the change in resistance after the high load charge/discharge cycle test is no greater than this upper limit, the device properties will be maintained even with repeated charge/discharge. Consequently, it will be possible to stably obtain an excellent output characteristic for long periods, thus helping to prolong the usable life of the device.

(Capacity Retention After High Load Charge/Discharge Cycling)

After repeating the high load charge/discharge cycling 60,000 times, Fb is determined by measuring the electrostatic capacitance by the method described above, and is compared with the electrostatic capacitance Fa before start of the test, to determine the capacity retention after charge/discharge cycle testing under high load, with respect to before start of the test. It is preferred if Fb/Fa is 1.01 or greater, because it will be possible to extract a sufficient capacity of energy even with a power storage element that has undergone prolonged charge/discharge, for example, and the power storage element replacement cycle can be extended.

(Gas Generation Volume After High-Temperature Storage Test)

For the purpose of the present specification, the gas generation volume in the high-temperature storage test is measured by the following method:

First, in a thermostatic bath set to 25° C., a cell corresponding to the nonaqueous lithium power storage element is subjected to constant-current charge at the 100 C current value until 4.0 V is reached, and then constant-voltage charge is carried out for 10 minutes with application of a constant voltage of 4.0 V. The cell is then stored in a 60° C. environment, and every 2 weeks it is removed out from the 60° C. environment, the cell voltage is charged to 4.0 V by the charging procedure described above, and the cell is again stored in a 60° C. environment. This procedure is repeated, and the cell volume Va before the start of storage and the cell volume Vb after two months of the storage test are measured by Archimedes' method. The solvent used for measurement of the volume by Archimedes' method is not particularly restricted, but preferably a solvent is used which has an electric conductivity of no greater than 10 µS/cm, and is resistant to electrolysis when used to immerse the nonaqueous lithium power storage element. Purified water and fluorine-based inert liquids, for example, are suitable for use. In particular, fluorine-based inert liquids such as FLUO-RINERT (registered trademark of 3M Co. Japan) FC-40 and FC-43 are preferably used because they have high specific gravity and excellent electrical insulating properties. Vb–Va is the gas quantity generated during storage for 2 months at a cell voltage of 4.0 V and an environmental temperature of 60° C. The value of B=(Vb–Va)/Fa, normalized with respect to the electrostatic capacitance Fa, is recorded as the normalized gas quantity generated in the high-temperature storage test.

The resistance value obtained for the cell after the high-temperature storage test, using the same measuring method as for the internal resistance at ordinary temperature, is recorded as the internal resistance Rc after the high-temperature storage test.

Regarding condition (a), Rc/Ra is preferably no greater than 3.0, more preferably no greater than 1.5 and even more preferably no greater than 1.2, from the viewpoint of exhibiting sufficient charge capacity and service capacity for high current, even upon exposure to high-temperature environmental conditions for a prolonged period. If Rc/Ra is below this upper limit it will be possible to stably obtain an excellent output characteristic for long periods, thus helping to prolong the usable life of the device.

For condition (b), the gas quantity generated upon storage for 2 months with a cell voltage of 4.0 V and an environmental temperature of 60° C. is preferably no greater than $30 \times 10^{-3}$ cc/F, more preferably no greater than $15 \times 10^{-3}$ cc/F and even more preferably no greater than $5 \times 10^{-3}$ cc/F, as the value measured at 25° C., from the viewpoint of minimizing reduction in the properties of the element by the generated gas. If the generated gas quantity under these conditions is less than this upper limit, there will be low risk of expansion of the cell by gas generation when the device is exposed to high temperature for prolonged periods. It will thus be possible to obtain a power storage element having sufficient safety and durability.

[Overcharge Test]

For the purpose of the present specification, the overcharge test is conducted by the following method:

First, a thermocouple is attached to the negative electrode terminal, the positive electrode terminal and the center section of the casing of a cell corresponding to the nonaqueous lithium power storage element, and in an explosion-proof thermostatic bath set to 25° C., constant-current charge is conducted at the 20 C current value until reaching 4.0 V, after which constant-voltage charge is carried out for 10 minutes with application of a constant voltage of 4.0 V. Next, charging is continued at the 20 C current value, either until the cell voltage reaches 8.0 V or until the charge capacity reaches 2 times the service capacity (2×Fa/3600 (Ah)) from 4.0 V to 2.0 V. The sampling time for voltage and temperature during the overcharge test is preferably no longer than a 1 second interval. After charging is complete, the maximum ultimate temperature of the negative electrode terminal and the state of the nonaqueous lithium power storage element are observed.

Evaluation is conducted based on the following criteria.

Ignition: Burned state of the nonaqueous lithium power storage element

Rupture: A state with all or a portion of the casing of the nonaqueous lithium power storage element damaged, and all or a portion of the electrode laminated body protruding from the casing.

Splitting: A state with a portion of the casing of the nonaqueous lithium power storage element damaged and the electrode laminated body stopped inside the casing, or a state with the nonaqueous electrolytic solution exuding out from the damaged section of the casing.

No change: A state with no damage in the casing or a state with the casing expanded due to gas generation.

[Confirming Fluid Leakage and Corrosion]

Fluid leakage from the casing or degassing valve was confirmed by the following method.

First, a cell corresponding to the nonaqueous lithium power storage element is stored for 1 year in a thermostatic bath set to 80° C., after which the casing and degassing valve are visually examined and the presence of any leakage of the electrolytic solution is confirmed. The casing is disassembled, the inner side of the casing is observed, and the presence of any corrosion is visually confirmed.

<Method of Identifying Lithium Compound in Electrode>

The method of identifying a lithium compound in the positive electrode is not particularly restricted, and it may be identification by the following methods, for example. For identification of a lithium compound, it is preferred to carry out the identification by combining the different analysis methods described below.

For measurement by SEM-EDX, Raman or XPS described below, preferably the nonaqueous lithium power storage element is disassembled in an argon box, the positive electrode is removed, and measurement is performed after washing the electrolyte adhering to the positive electrode surface. Since the solvent used for washing of the positive electrode only needs to wash off the electrolyte adhering to the positive electrode surface, a carbonate solvent such as dimethyl carbonate, ethylmethyl carbonate or diethyl carbonate may be suitably used. The washing method may be, for example, a method of immersing the positive electrode in a diethyl carbonate solvent in an amount of 50 to 100 times the weight of the positive electrode, for 10 minutes or longer, and then exchanging the solvent and reimmersing the positive electrode, removing the positive electrode from the diethyl carbonate and vacuum drying it, and subsequently analyzing it by SEM-EDX, Raman and XPS. The vacuum drying conditions used may be conditions such that the diethyl carbonate residue in the positive electrode is no greater than 1 weight % with a temperature of 0 to 200° C., a pressure of 0 to 20 kPa and a time of 1 to 40 hours. The diethyl carbonate residue can be quantified by GC/MS measurement of water after distilled water washing and liquid volume adjustment, based on a predrawn calibration curve.

In the ion chromatography described below, the water obtained after washing of the positive electrode with distilled water is analyzed to allow identification of the anion.

When the lithium compound cannot be identified by this analysis method, $^7$Li-solid NMR, XRD (X-ray diffraction), TOF-SIMS (Time-Of-Flight Secondary Ion Mass Spectrometry), AES (Auger Electron Spectroscopy), TPD/MS (Temperature Programmed Desorption/Mass Spectrometry), DSC (Differential Scanning calorimetry) or the like may be used as an alternative analysis method to identify the lithium compound.

[Scanning Electron Microscope-Energy Dispersive X-Ray Analysis (SEM-EDX)]

The oxygen-containing lithium compound and positive electrode active material can be discriminated by oxygen mapping based on an SEM-EDX image of the positive electrode surface measured at an observational magnification of 1000-4000×. As an example of measurement of an SEM-EDX image, it can be measured with an acceleration voltage of 10 kV, an emission current of 1 μA and a measuring pixel count of 256×256 pixels, and a number of scans of 50. In order to prevent electrification of the sample, surface treatment with gold, platinum, osmium or the like may be carried out by a method such as vacuum vapor deposition or sputtering. The method of measuring the SEM-EDX image is preferably with adjustment of the luminance and contrast so that no pixel reaches the maximum luminance value in the mapping image, and the average value of brightness is in the range of 40% to 60% of the maximum luminance value. In the obtained oxygen mapping, particles containing a bright portion equal to 50% or more of the area thereof when binarized based on the average value of brightness with respect to the resulting oxygen mapping were considered to be the lithium compound.

[Microscopic Raman Spectroscopy]

The lithium compound comprising carbonate ion, and the positive electrode active material can be discriminated by Raman imaging of the positive electrode surface measured at an observational magnification of 1000-4000×. As an example for the measuring conditions, measurement may be performed with an excitation light of 532 nm, an excitation light intensity of 1%, 50× long working of objective lens, a diffraction grating of 1800 gr/mm, point scanning as the mapping system (slit: 65 mm, binning: 5 pix), a 1 mm step, an exposure time per point of 3 seconds, a number of scans of 1, and a noise filter. For the measured Raman spectrum, a straight baseline is set in the range of 1071 to 1104 cm$^{-1}$, a value positive from the baseline is considered a carbonate ion peak, and the area is calculated and the frequency is integrated, but the frequency with respect to the carbonate ion peak area with the noise component approximated by a Gaussian function is subtracted from the carbonate ion frequency distribution.

[X-Ray Photoelectron Spectroscopy (XPS)]

The electronic state of lithium can be analyzed by XPS to discriminate the bonded state of the lithium. As an example for the measuring conditions, measurement may be performed with monochromatized AlKα as the X-ray source, an X-ray beam diameter of 100 μmφ (25 W, 15 kV), narrow scan for path energy (58.70 eV), with charge neutralization, narrow scan for sweeping: 10 times (carbon, oxygen), 20 times (fluorine), 30 times (phosphorus), 40 times (lithium), 50 times (silicon), narrow scan for energy step: 0.25 eV. The surface of the positive electrode is preferably cleaned by sputtering before XPS measurement. As the sputtering conditions, cleaning of the positive electrode surface may be carried out, for example, with an acceleration voltage of 1.0 kV, and 1 minute in a range of 2 mm×2 mm (1.25 nm/min as $SiO_2$). In the obtained XPS spectrum, the following assignments may be made: a peak having Li1s bonding energy of 50 to 54 eV as a $LiO_2$ or Li—C bond, a peak of 55 to 60 eV as LiF, $Li_2CO_3$, $Li_xPO_yF_z$ (x, y and z are integers of 1 to 6), a peak having C1s bonding energy of 285 eV as a C—C bond, a peak of 286 eV as a C—O bond, a peak of 288 eV as COO, a peak of 290 to 292 eV as $CO_3^{2-}$ and C—F bonds, a peak having O1s bonding energy of 527 to 530 eV as $O^{2-}$ ($Li_2O$), a peak of 531 to 532 eV as CO, $CO_3$, OH, $PO_x$ (x is an integer of 1 to 4), $SiO_x$ (x is an integer of 1 to 4), a peak of 533 eV as C—O, $SiO_x$ (x is an integer of 1 to 4), a peak having F1s bonding energy of 685 eV as LiF, a peak of 687 eV as a C—F bond, $Li_xPO_yF_z$ (x, y and z are integers of 1 to 6), $PF_6^-$, and for P2p bonding energy, a peak of 133 eV as $PO_x$ (x is an integer of 1 to 4), a peak of 134 to 136 eV as $PF_x$ (x is an integer of 1 to 6), a peak having Si2p bonding energy of 99 eV as Si or silicide, a peak of 101 to 107 eV as $Si_xO_y$ (x and y are any integers). When peaks overlap in the obtained spectrum, the spectrum is preferably assigned upon separating the peaks with the assumption of a Gaussian function or Lorentz function. The lithium compound that is present can be identified based on the obtained results of measuring the electronic state, and the existing element ratio.

[Ion Chromatography]

Anion species eluted in water can be identified by analyzing the distilled water washing fluid from the positive electrode, by ion chromatography. The columns used may be an ion-exchange type, ion exclusion type and reversed-phase ion pair type. The detector used may be an electric conductivity detector, ultraviolet-visible absorption intensity detector or electrochemical detector, and a suppressor system with a suppressor installed before the detector, or a non-suppressor system without installation of a suppressor, using a solution with low electric conductivity as the eluent, may be used. Since measurement can also be carried out by combining a mass spectrometer or charged particle detection with the detector, it is preferred to combine an appropriate column and detector, depending on the lithium compound identified from the results of analysis by SEM-EDX, Raman or XPS.

The sample holding time will depend on the conditions such as the column and eluent used and is the same for each ion species component, while the size of the peak response differs for each ion species but is proportional to the concentration. By premeasuring a standard solution of known concentration with ensured traceability, it is possible to qualitatively and quantitatively analyze the ion species components.

<Alkali Metal Element Quantitation Method: ICP-MS>

The acid in the positive electrode is decomposed using a strong acid such as concentrated nitric acid, concentrated hydrochloric acid or aqua regalis, and the obtained solution is diluted with purified water to an acid concentration of 2% to 3%. The acid decomposition may be decomposition with appropriate heating and pressure. The obtained diluted solution is analyzed by ICP-MS, during which time it is preferred to add an element of known amount as an internal standard. When the alkali metal element to be measured is at a concentration above the measurable limit, it is preferably further diluted while maintaining the acid concentration of the diluted solution. Each element can be quantified from the obtained measurement results, based on a calibration curve predrawn using a standard solution for chemical analysis.

<Method of Quantifying Lithium Compound>

The method of quantifying the lithium compound in the positive electrode for this embodiment is described below. The positive electrode may be washed with an organic solvent and subsequently washed with distilled water, and the lithium compound quantified from the change in positive electrode weight before and after the washing with distilled water. The area of the positive electrode to be measured is not particularly restricted, but from the viewpoint of reducing measurement variation it is preferably 5 $cm^2$ to 200 $cm^2$ and more preferably 25 $cm^2$ to 150 $cm^2$. Measurement reproducibility can be ensured if the area is at least 5 $cm^2$. The handleability of the sample will be excellent if the area is no greater than 200 $cm^2$. Washing with an organic solvent is sufficient if it can remove electrolytic solution decomposition products that have accumulated on the positive electrode surface, and therefore while the organic solvent is not particularly restricted, it is preferred to use an organic solvent with a solubility of no greater than 2% for the lithium compound, as this will allow elution of the lithium compound to be suppressed. For example, a polar solvent such as methanol or acetone may be used.

The method of washing the positive electrode is thorough immersion of the positive electrode for 3 days or longer in a methanol solution at a 50- to 100-fold amount with respect to the weight of the positive electrode. During the procedure, certain measures are preferred such as capping the vessel so that the methanol does not volatilize off. The positive electrode is then removed from the methanol and subjected to vacuum drying (under conditions such that the methanol residue in the positive electrode is no greater than 1 weight % with a temperature of 100 to 200° C., a pressure of 0 to 10 kPa and a time of 5 to 20 hours. The methanol residue can be quantified by GC/MS measurement of water after distilled water washing, based on a predrawn calibration curve, as described below.), and the weight of the positive electrode at that time is recorded as $M_0$ (g). The positive electrode is thoroughly immersed for 3 days or longer in distilled water at a 100-fold amount (100 $M_0$ (g)) with respect to the weight of the positive electrode. During the procedure, certain measures are preferred such as capping the vessel so that the distilled water does not volatilize off. After immersion for 3 days or longer, the positive electrode is removed from the distilled water (for ion chromatography measurement, the liquid volume is adjusted so that the amount of distilled water is 100 $M_0$ (g)), and vacuum drying is performed in the same manner as for the methanol washing described above. The weight of the positive electrode at this time is recorded as $M_1$ (g), and then the positive electrode active material layer is removed from the power collector using a spatula, brush, bristles or the like, for measurement of the weight of the obtained positive electrode power collector. If the weight of the obtained positive electrode power collector is represented as $M_2$ (g), the weight % Z of the lithium compound in the positive electrode can be calculated by formula (4).

$$Z=100\times[1-(M_1-M_2)/(M_0-M_2)] \qquad \text{[Mathematical Formula 1]}$$

<Method of Measuring Lithium Compound and Amount of Active Material: Calculation of $C_{x1}$, $C_{y1}$ and $C_{x2}$, $C_{y2}$>

The method of measuring the lithium compound and amount of active material in the positive electrode active material layer for the second embodiment are described below.

The nonaqueous lithium power storage element is disassembled in an argon box, and the electrode laminated body is removed out. The positive electrode situated on the outermost layer of the electrode laminated body is cut out, and the positive electrode is washed with an organic solvent. During this time, in the case of an electrode laminated body having stacked sheet electrodes, it is sufficient to remove out the positive electrode on the outermost layer, or if the electrode laminated body is a wound body, a positive electrode containing a positive electrode active material layer that is not facing the negative electrode may be cut out. The organic solvent is not particularly restricted so long as it can remove electrolytic solution decomposition products that have accumulated on the positive electrode surface, and but using an organic solvent with a solubility of no greater than 2% for the lithium compound will suppress elution of the lithium compound. Suitable examples of such organic solvents include polar solvents such as methanol, ethanol, acetone and methyl acetate. The area of the positive electrode to be measured is not particularly restricted, but from the viewpoint of reducing measurement variation it is preferably 5 cm² to 200 cm² and more preferably 25 cm² to 150 cm². Measurement reproducibility can be ensured if the area is at least 5 cm². The handleability of the sample will be excellent if the area is no greater than 200 cm².

The method of washing the positive electrode is thorough immersion of the positive electrode for 3 days or longer in an ethanol solution at a 50- to 100-fold amount with respect to the weight of the positive electrode. During the immersion, the vessel is preferably capped, for example, so that the ethanol does not volatilize off. After immersion for 3 days or longer, the positive electrode is removed from the ethanol and vacuum dried. The vacuum drying conditions employed may be conditions such that the ethanol residue in the positive electrode is no greater than 1 weight % with a temperature of 100 to 200° C., a pressure of 0 to 10 kPa and a time of 5 to 20 hours. The ethanol residue can be quantified by GC/MS measurement of water after distilled water washing, based on a predrawn calibration curve.

The positive electrode that has been obtained after drying is cut in half, one half being used as positive electrode $C_{x0}$ and the other as positive electrode $C_{y0}$, with areas designated as X (m²) and Y (m²), respectively. After removing off the positive electrode active material layer on the $C_y$ side of the positive electrode $C_{x0}$ and the positive electrode active material layer on the $C_x$ side of the positive electrode $C_{y0}$ using a spatula, brush, bristles or the like, the weight of the positive electrode $C_{x0}$ is recorded as $M_{0x}$ (g) and the weight of the positive electrode $C_{y0}$ as $M_{0y}$ (g). Next, the positive electrode $C_{x0}$ and positive electrode $C_{y0}$ are thoroughly immersed in distilled water for 3 days or longer, in an amount of 100- to 150-fold of their respective weights. During the immersion, it is preferred to cap the vessel so that the distilled water does not volatilize off. After immersion for 3 days or longer, the positive electrode $C_{x0}$ and positive electrode $C_{y0}$ are removed from the distilled water and vacuum dried in the same manner as for the ethanol washing described above.

After vacuum drying, the weights of the positive electrode $C_{x0}$ and positive electrode $C_{y0}$ are recorded as $M_{1x}$ (g) and $M_{1y}$ (g), respectively. Next, in order to measure the weights of the power collectors of the obtained positive electrode $C_{x0}$ and positive electrode $C_{y0}$, the positive electrode active material layers remaining on the positive electrode $C_{x0}$ and positive electrode $C_{y0}$ are removed using a spatula, brush, bristles or the like. Using $M_{2x}$ (g) and $M_{2y}$ (g) as the weights of the positive electrode power collectors of the positive electrode $C_{x0}$ and positive electrode $C_{y0}$, respectively, the amount of lithium compound $C_{x1}$ (g/m²) of the positive electrode $C_{x0}$ and the amount of lithium compound $C_{y1}$ (g/m²) of the positive electrode $C_{y0}$ can be calculated by formula (5) below.

$$C_{x1}=(M_{0x}-M_{1x})/X, \text{ and}$$

$$C_{y1}=(M_{0y}-M_{1y})/Y \qquad (5)$$

The amount of active material per area $C_{x2}$ (g/m²) on the $C_x$ side of the positive electrode active material layer and the amount of active material per area $C_{y2}$ (g/m²) on the $C_y$ side of the positive electrode active material layer can be calculated by the following formula (6).

$$C_{x2}=(M_{1x}-M_{2x})/X, \text{ and}$$

$$C_{y2}=(M_{1y}-M_{2y})/Y \qquad (6)$$

Incidentally, when multiple lithium compounds are present in the positive electrode active material layer;

when it contains an oxide such as $M_2O$, a hydroxide such as MOH, a halide such as MF or MCl, an oxalate such as $M_2(CO_2)_2$ or a carboxylate such as RCOOM (where R is H, an alkyl group or an aryl group, and M is one or more selected from among Na, K, Rb and Cs), in addition to the lithium compound; and when the positive electrode active material layer includes an alkaline earth metal carbonate selected from among $BeCO_3$, $MgCO_3$, $CaCO_3$, $SrCO_3$ and $BaCO_3$, or an alkaline earth metal oxide, alkaline earth metal hydroxide, alkaline earth metal halide, alkaline earth metal oxalate or alkaline earth metal carboxylate, their total amounts are calculated as the amount of lithium compound.

EXAMPLES

The invention will now be further explained through examples and comparative examples. However, it is to be understood that the invention is not limited in any way by these examples.

The examples and comparative examples of the first embodiment will now be described in detail.

Example 1

<Preparation of Positive Electrode Active Material>
[Preparation Example of Activated Carbon $1_{A1}$]

Crushed coconut shell carbide was subjected to carbonization in a small carbonizing furnace, at 500° C. for 3 hours in nitrogen, to obtain a carbide. The obtained carbide was placed in an activating furnace, water vapor was introduced into the activating furnace at 1 kg/h in a heated state using a preheating furnace, and the temperature was increased to 900° C. over 8 hours for activation. The activated carbide was cooled under a nitrogen atmosphere to obtain activated carbon. The obtained activated carbon was flow-rinsed for 12 hours and then drained. After then drying for 10 hours in an electrodesiccator kept at 125° C., it was pulverized for 1 hour with a ball mill to obtain activated carbon $1_{a1}$.

A laser diffraction particle size distribution analyzer (SALD-2000J) by Shimadzu Corp. was used to measure the mean particle diameter of the activated carbon $1_{a1}$, which was found to be 12.7 μm. A pore distribution measuring apparatus (AUTOSORB-1 AS-1-MP) by Yuasa-Ionics Co., Ltd. was also used to measure the pore distribution. As a result, the BET specific surface area was 2330 m²/g, the mesopore volume ($V_1$) was 0.52 cc/g, the micropore volume ($V_2$) was 0.88 cc/g, and $V_1/V_2$=0.59.

[Preparation Example of Activated Carbon $2_{a1}$]

For the phenol resin, after carbonization for 2 hours in a firing furnace at 600° C. under a nitrogen atmosphere, it was pulverized with a ball mill and sorted, to obtain a carbide having a mean particle diameter of 7 μm. The carbide and KOH were mixed at a weight ratio of 1:5, and heated for 1 hour in a firing furnace at 800° C. under a nitrogen atmosphere, for activation. The mixture was subsequently stirred and rinsed for 1 hour in dilute hydrochloric acid adjusted to a concentration of 2 mol/L, and then boiled and rinsed with distilled water until the pH stabilized to between 5 and 6, after which it was dried to produce activated carbon $2_{a1}$.

A laser diffraction particle size distribution analyzer (SALD-2000J) by Shimadzu Corp. was used to measure the mean particle diameter of the activated carbon $2_{a1}$, which was found to be 7.0 μm. A pore distribution measuring apparatus (AUTOSORB-1 AS-1-MP) by Yuasa-Ionics Co., Ltd. was also used to measure the pore distribution. As a result, the BET specific surface area was 3627 m²/g, the mesopore volume ($V_1$) was 1.50 cc/g, the micropore volume ($V_2$) was 2.28 cc/g, and $V_1/V_2$=0.66.

<Pulverization of Lithium Carbonate>

A 200 g portion of lithium carbonate having a mean particle diameter of 53 μm was allowed to stand for 5 hours in a high-temperature, high-humidity chamber (SML-2, product of Espec Corp.), at a humidity of 80% and a temperature of 60° C. Next, using a pulverizer (LNM liquid nitrogen bead mill) by Aimex Corp., it was cooled to −196° C. with liquid nitrogen and pulverized for 20 minutes at a circumferential speed of 10.0 m/s, using dry ice beads. The mean particle diameter of lithium carbonate 1, which was obtained by brittle fracture while preventing heat denaturation at −196° C., was measured to be 2.5 μm.

<Production of Positive Electrode Precursor>

The activated carbon $2_{a1}$ was used as a positive electrode active material to produce a positive electrode precursor, with lithium carbonate 1 as the lithium compound.

After mixing 55.5 parts by weight of activated carbon $2_{a1}$, 32.0 parts by weight of lithium carbonate 1, 3.0 parts by weight of Ketchen black, 1.5 parts by weight of PVP (polyvinylpyrrolidone), 8.0 parts by weight of PVdF (polyvinylidene fluoride) and NMP (N-methylpyrrolidone), the mixture was dispersed using a FILMIX® thin-film spinning high-speed mixer by Primix Corp., under conditions with a circumferential speed of 17 m/s, to obtain a coating solution. The viscosity (ηb) and TI value of the obtained coating solution were measured using a TVE-35H E-type viscometer by Toki Sangyo Co., Ltd. As a result, the viscosity (ηb) was 2,300 mPa·s and the TI value was 3.2. The degree of dispersion of the obtained coating solution was measured using a fineness gauge by Yoshimitsu Seiki Co. As a result, the granularity was 32 μm. The coating solution was coated onto one or both sides of an aluminum foil with a thickness of 15 μm using a die coater by Toray Engineering Co., Ltd. under conditions with a coating speed of 1 m/s, and dried at a drying temperature of 120° C. to obtain positive electrode precursor 1 (one side) and positive electrode precursor 1 (both sides). The obtained positive electrode precursor 1 (one side) and positive electrode precursor 1 (both sides) were pressed using a roll press under conditions with a pressure of 6 kN/cm and a pressed portion surface temperature of 25° C. The film thickness of the positive electrode active material layer of the obtained positive electrode precursor 1 (one side) and positive electrode precursor 1 (both sides) were determined by subtracting the thickness of the aluminum foil from the average thickness measured at 10 arbitrary locations of the positive electrode precursor 1 using a Linear Gauge Sensor GS-551 by Ono Sokki Co., Ltd. As a result, the thickness per side of the positive electrode active material layers was 62 μm.

<Preparation of Negative Electrode Active Material>

The BET specific surface area and pore distribution of commercially available artificial graphite was measured by the method described above, using a pore distribution measuring apparatus (AUTOSORB-1 AS-1-MP) by Yuasa-Ionics Co., Ltd. As a result, the BET specific surface area was 3.1 m²/g and the mean particle diameter was 4.8 μm.

A 300 g portion of the artificial graphite was placed into a stainless steel mesh basket and placed on a stainless steel vat containing 30 g of coal-based pitch (softening point: 50° C.), and both were set in an electric furnace (furnace inner usable dimension: 300 mm×300 mm×300 mm), for thermal reaction to obtain composite porous carbon material 2a. The heat treatment was carried out under a nitrogen atmosphere, with temperature increase to 1000° C. over a period of 12 hours, and 5 hours of holding at the same temperature. This was followed by natural cooling to 60° C., after which the composite carbon material 2a was removed out of the furnace.

The BET specific surface area and pore distribution of the obtained composite carbon material 2a were measured by the same methods as described above. As a result, the BET specific surface area was 6.1 m$^2$/g and the mean particle diameter was 4.9 μm. Also, for composite carbon material 2a, the weight ratio of coal-based pitch-derived carbonaceous material with respect to activated carbon was 2.0%.

<Production of Negative Electrode>

Composite carbon material 2a was then used as a negative electrode active material to produce a negative electrode.

After mixing 84 parts by weight of composite carbon material 2a, 10 parts by weight of acetylene black, 6 parts by weight of PVdF (polyvinylidene fluoride) and NMP (N-methylpyrrolidone), the mixture was dispersed using a FILMIX® thin-film spinning high-speed mixer by Primix Corp., under conditions with a circumferential speed of 17 m/s, to obtain a coating solution. The viscosity (ηb) and TI value of the obtained coating solution were measured using a TVE-35H E-type viscometer by Toki Sangyo Co., Ltd. As a result, the viscosity (ηb) was 2,326 mPa·s and the TI value was 2.7. The coating solution was coated onto both sides of an electrolytic copper foil with a thickness of 10 μm using a die coater by Toray Engineering Co., Ltd. under conditions with a coating speed of 2 m/s, and dried at a drying temperature of 120° C. to obtain negative electrode 1. The obtained negative electrode 1 was pressed using a roll press under conditions with a pressure of 5 kN/cm and a pressed portion surface temperature of 25° C. The film thickness of the negative electrode active material layer of the obtained negative electrode 1 was determined by subtracting the thickness of the copper foil from the average thickness measured at 10 arbitrary locations of negative electrode 1 using a Linear Gauge Sensor GS-551 by Ono Sokki Co., Ltd. As a result, the thickness per side of the negative electrode active material layers was 30 μm.

[Measurement of Capacitance Per Unit Weight of Negative Electrode]

The obtained negative electrode 1 was cut out to a single size of 1.4 cm×2.0 cm (2.8 cm$^2$), and of the negative electrode active material layers that were coated onto both sides of the copper foil, the layer on one side was removed using a spatula, brush or bristles to produce a working electrode, and metal lithium was used as the counter electrode and reference electrode, to fabricate an electrochemical cell in an argon box, using a nonaqueous solution of LiPF$_6$ dissolved to a concentration of 1.0 mol/L in a mixed solvent of ethylene carbonate (EC) and ethylmethyl carbonate (EMC) at a volume ratio of 1:1, as the electrolytic solution.

The initial charging capacitance of the obtained electrochemical cell was measured by the following procedure using a charge/discharge apparatus (TOSCAT-3100U) by Toyo System Co., Ltd.

The electrochemical cell was subjected to constant-current charge at a temperature of 25° C., with a current value of 0.5 mA/cm$^2$ until reaching a voltage value of 0.01 V, and then to constant-voltage charge until the current value reached 0.01 mA/cm$^2$. When the charge capacity during constant-current charge and constant-voltage charge was evaluated as the initial charge capacity, it was found to be 0.74 mAh, and the capacitance per unit weight of negative electrode 1 (lithium ion doping amount) was 545 mAh/g.

<Preparation of Electrolytic Solution>

As an organic solvent there was used a mixed solvent of ethylene carbonate (EC):ethyl methyl carbonate (EMC)=33:67 (volume ratio), and each electrolyte salt was dissolved so that the concentration ratio of LiN(SO$_2$F)$_2$ and LiPF$_6$ was 75:25 (molar ratio) with respect to the total electrolytic solution and the total concentration of LiN(SO$_2$F)$_2$ and LiPF$_6$ was 1.2 mol/L, to obtain nonaqueous electrolytic solution 1. The concentrations of LiN(SO$_2$F)$_2$ and LiPF$_6$ in electrolytic solution 1 were 0.9 mol/L and 0.3 mol/L, respectively.

<Fabrication of Nonaqueous Lithium Power Storage Element>

The obtained positive electrode precursor was cut into two positive electrode precursors 1 (one side) and 19 positive electrode precursors 1 (both sides), with the positive electrode active material layers at sizes of 10.0 cm×10.0 cm (100 cm$^2$). Next, 20 negative electrodes 1 were cut out with the negative electrode active material layers at sizes of 10.1 cm×10.1 cm (102 cm$^2$), and 40 10.3 cm×10.3 cm (106 cm$^2$) polyethylene separators (thickness: 10 μm, product of Asahi Kasei Corp.) were prepared. These were laminated in the order: positive electrode precursor, separator, negative electrode, with the positive electrode active material layers and negative electrode active material layers facing each other across the separators, and positive electrode precursors 1 (one side) as the outermost layers, to obtain an electrode laminated body. The positive electrode terminal and negative electrode terminal were ultrasonically welded to the obtained electrode laminated body and placed in a vessel formed of an aluminum laminate package material, and 3 sides including the electrode terminal section were sealed by heat sealing. Approximately 80 g of the nonaqueous electrolytic solution was injected into the electrode laminated body housed in the aluminum laminate package material under atmospheric pressure, in a dry air environment with a temperature of 25° C. and a dew point of no higher than −40° C., to fabricate a total of two nonaqueous lithium power storage elements. Next, the nonaqueous lithium power storage element was placed in a pressure reduction chamber and the pressure was reduced from atmospheric pressure to −87 kPa, after which it was restored to atmospheric pressure and allowed to stand for 5 minutes. The procedure of reducing the pressure from atmospheric pressure to −87 kPa and then restoring to atmospheric pressure was subsequently repeated 4 times, and it was then allowed to stand for 15 minutes. The pressure was again reduced from atmospheric pressure to −91 kPa, and then restored to atmospheric pressure. A procedure of pressure reduction and restoration to atmospheric pressure in the same manner was repeated 7 times. (Pressure reduction from atmospheric pressure to −95 kPa, −96 kPa, −97 kPa, −81 kPa, −97 kPa, −97 kPa and −97 kPa, respectively). The electrode laminated body was impregnated with the nonaqueous electrolytic solution by this procedure.

Next, the nonaqueous lithium power storage element was placed in a pressure-reducing sealing machine, and with the pressure reduced to −95 kPa, it was sealed at 180° C. for 10 seconds at a pressure of 0.1 MPa to seal the aluminum laminate package material.

[Lithium Doping]

The obtained nonaqueous lithium power storage element was placed in an argon box at a temperature of 25° C., a dew point of −60° C. and an oxygen concentration of 1 ppm. The excess portion of the aluminum laminate package material of the nonaqueous lithium power storage element was cut to unseal it, and it was subjected to initial charging by a method of constant-current charge using a power source by Matsusada Precision, Inc. (P4LT18-0.2), with a current value of 50 mA until reaching a voltage of 4.5 V, followed by constant-voltage charge at 4.5 V continued for 72 hours, for lithium doping of the negative electrode. Upon completion of the lithium doping, a heat sealer by Fuji Impulse Co., Ltd. (FA-300) was used to seal the aluminum laminate.

[Aging]

The lithium-doped nonaqueous lithium power storage element was removed from the argon box and subjected to constant-current discharge in an environment of 25° C. at 50 mA until reaching a voltage of 3.0 V, and then constant-current discharge at 3.0 V for 1 hour, to adjust the voltage to 3.0 V. The nonaqueous lithium power storage element was then stored for 48 hours in a thermostatic bath at 60° C.

[Degassing]

A portion of the aluminum laminate package material of the aged nonaqueous lithium power storage element was unsealed in a dry air environment with a temperature of 25° C. and a dew point of −40° C. Next, the nonaqueous lithium power storage element was placed in a pressure reduction chamber, and a procedure of using a diaphragm pump (product of KNF Co., N816.3KT.45.18) for pressure reduction over a period of 3 minutes from atmospheric pressure to −80 kPa, followed by restoration to atmospheric pressure over a period of 3 minutes, was repeated 3 times. Next, the nonaqueous lithium power storage element was placed in a pressure-reducing sealing machine, and after pressure reduction to −90 kPa, it was sealed at 200° C. for 10 seconds at a pressure of 0.1 MPa to seal the aluminum laminate package material.

<Evaluation of Nonaqueous Lithium Power Storage Elements>

[Measurement of Electrostatic Capacitance Fa]

One of the obtained nonaqueous lithium power storage elements was subjected to constant-current charge using a charge/discharge apparatus (5 V, 360 A) by Fujitsu Telecom Networks, Fukushima, Inc. in a thermostatic bath set to 25° C., with a 2 C current value (1.5 A) until reaching 3.8 V, and then constant-voltage charge was carried out with application of a constant voltage of 3.8 V for a total of 30 minutes. Next, with the capacitance after constant-current discharge to 2.2 V at the 2 C current value (1.5 A) as Q [C], F=Q/(3.8−2.2) was calculated as the electrostatic capacitance Fa, to be 1767 F.

[Calculation of Internal Resistance Ra]

The nonaqueous lithium power storage element was subjected to constant-current charge using a charge/discharge apparatus (5 V, 360 A) by Fujitsu Telecom Networks, Fukushima in a thermostatic bath set to 25° C., with the 20 C current value (10 A) until reaching 3.8 V, and then constant-voltage charge was carried out with application of a constant voltage of 3.8 V for a total of 30 minutes. Next, constant-current discharge was carried out to 2.2 V with a sampling time of 0.1 second and the 20 C current value (10 A), to obtain a discharge curve (time-voltage). From the discharge curve, internal resistance is calculated from equations consisting of the voltage drop $\Delta E=3.8-Eo$ and $R=\Delta E/(20\ C\ \text{current value})$ when the voltage of Eo at discharge time=0 seconds, obtained by extrapolating by linear approximation from the voltage values at discharge times of 2 seconds and 4 seconds in the discharge curve, to be 0.54 mΩ.

[High-Temperature Storage Test]

The nonaqueous lithium power storage element was subjected to constant-current charge using a charge/discharge apparatus (5 V, 360 A) by Fujitsu Telecom Networks, Ltd. in a thermostatic bath set to 25° C., with a 100 C current value until reaching 4.0 V, and then constant-voltage charge was carried out with application of a constant voltage of 4.0 V for a total of 10 minutes. The cell was then stored in a 60° C. environment, and every 2 weeks it was removed out from the 60° C. environment, the cell voltage was charged to 4.0 V by the same charging procedure, and the cell was again stored in a 60° C. environment. This procedure was repeated for a period of 2 months, and the cell volume Va before start of the storage test and the volume Vb of the cell after two months of the storage test were measured by Archimedes' method in a 25° C. environment, using FLUORINERT (registered trademark of 3M Co. Japan) FC-40 as the measuring solvent. The value of B, as the gas generation volume determined by Vb−Va normalized by the electrostatic capacitance Fa, was $1.22 \times 10^{-3}$ cc/F.

The internal resistance Rb calculated with respect to the nonaqueous lithium power storage element after the high-temperature storage test was 0.58 mΩ, and the Rb/Ra value was 1.07.

[High Load Charge/Discharge Cycle Test]

The nonaqueous lithium power storage element was subjected to constant-current charge using a charge/discharge apparatus (5 V, 360 A) by Fujitsu Telecom Networks, Fukushima, Inc. in a thermostatic bath set to 25° C., with a 200 C current value (150 A) until reaching 3.8 V, followed by constant-current discharge at the 300 C current value until reaching 2.2 V, as a charge/discharge procedure that was repeated 60,000 times without pause. Upon completion of the cycle, charging was carried out at the 20 C current value (15 A) to 4.5 V, and constant-voltage charge was carried out continuously for 1 hour afterwards. The electrostatic capacitance Fb was then measured to be 185 F, and Fb/Fa=1.05.

<Calculation of $U_1$ and $U_2$>

[Preparation of Positive Electrode Sample]

The other nonaqueous lithium power storage element obtained above was disassembled in an argon box with a dew point temperature of −72° C., and the positive electrode coated on both sides with the positive electrode active material layer was cut out to a size of 10 cm×5 cm and immersed in 30 g of a diethyl carbonate solvent, occasionally moving the positive electrode with a pincette, and was washed for 10 minutes. The positive electrode was then removed out and air-dried for 5 minutes in an argon box, and the positive electrode was immersed in 30 g of freshly prepared diethyl carbonate solvent and washed for 10 minutes by the same method as described above. The positive electrode was removed from the argon box, and a vacuum dryer (DP33 by Yamato Scientific Co., Ltd.) was used for drying for 20 hours at a temperature of 25° C. and a pressure of 1 kPa, to obtain positive electrode sample 1.

[SEM and EDX Measurement of Positive Electrode Surface]

A small 1 cm×1 cm piece was cut out from positive electrode sample 1, and the surface was coated by sputtering of gold in a vacuum of 10 Pa. Next, the positive electrode surface was measured by SEM and EDX under atmospheric exposure, under the conditions described below.

(SEM-EDX Measuring Conditions)

Measuring apparatus: FE-SEM S-4700 Electrolytic emission scanning electron microscope by Hitachi High-Technologies Corp.

Acceleration voltage: 10 kV

Emission current: 1 µA

Measurement magnification: 2000×

Electron beam incident angle: 90°

X-ray take-off angle: 30°

Dead time: 15%

Mapping elements: C, O, F
Measurement pixel count 256×256 pixels
Measuring time: 60 sec
Number of scans: 50
Adjustment of the luminance and contrast so that no pixel reached the maximum luminance in the mapping image, and the average value of brightness was in the range of 40% to 60% of the maximum luminance value.
(SEM-EDX Analysis)
Image analysis software (ImageJ) was used for binarization based on the average value of brightness, for the obtained oxygen mapping and fluorine mapping. The oxygen mapping area during this time was 15.5% of the total image, and the fluorine mapping area was 31.5%. The area of overlap between oxygen mapping and fluorine mapping obtained by binarization was 14.0% of the total image, and by using $U_1$ (%) as the area overlap ratio of fluorine mapping relative to oxygen mapping it was possible to calculate:
$U_1$ as 90.3%, calculated from $U_1 = 100 \times 14.0/15.1$

[SEM and EDX Measurement of Positive Electrode Cross-Section]

A small 1 cm×1 cm piece was cut out from positive electrode sample 1, and an SM-09020CP by JEOL Ltd. was used to create a cross-section perpendicular to the in-plane direction of positive electrode sample 1 using argon gas, under conditions with an acceleration voltage of 4 kV and a beam diameter of 500 µm. Next, SEM and EDX measurement of the positive electrode cross-section were carried out by the methods described above.

The oxygen mapping and fluorine mapping were binarized in the same manner as above, for the SEM-EDX of the obtained positive electrode cross-section, and the area overlap ratio $U_2$ of fluorine mapping relative to oxygen mapping was calculated to be 40.1%.

[Microscopic Raman Spectroscopy of Positive Electrode Cross-Section]

The BIB (broad ion beam)-processed positive electrode sample 1 was used for microscopic Raman measurement under the following conditions.
Measuring apparatus: inVia Reflex by Renishaw
Observation magnification: 2000×
Excitation light: 532 nm
Power: Focusing to 0.7 mW at the sample position
Excitation light intensity: 1%
Objective lens: Long-working-distance 50×
Diffraction grating: 1800 gr/mm
Exposure time per point: 3 seconds
Number of scans: 1
Noise filter on Point scanning was performed at 1 µm intervals in a range of 90 µm in the thickness direction of the positive electrode cross-section and 30 µm in the direction perpendicular to the thickness direction, and a Raman spectrum was obtained for each measurement point. For the peaks due to carbonate ion observed at 1086 cm$^{-1}$ in the obtained Raman spectrum, a straight baseline was drawn for 1071 cm$^{-1}$ to 1104 cm$^{-1}$, and the area appearing in the positive region from the baseline and the area appearing on the negative side of the baseline were each calculated as peak areas. The negative sign was assigned to the area appearing on the negative side of the baseline. This was traced as the space distribution for the carbonate ion peak area, and an imaging representation for carbonate ion was obtained.

The area ratio of carbonate ion mapping was calculated in the following manner. A straight line baseline was set at positions of 1071 and 1104 cm$^{-1}$ in the Raman spectra for 2700 points obtained at each measurement position, setting the area at the portions higher than the baseline as positive and the areas of the lower portions as negative, for area (a). The mapping data for area (a) were considered. Also, the region from the maximum value to the minimum value of the area (a) was divided into 100 zones to construct histogram 1. Next, for histogram 1, the portion on the negative side from the area value giving the maximum frequency was fitted by the least square method using a Gaussian function, thereby approximating the noise component by a Gaussian function. The difference obtained by subtracting the fitted Gaussian function from the original histogram 1 is histogram 2 for the peak area of $CO_3^2$. In histogram 2, the cumulative frequency greater than the area (b) giving the maximum frequency was determined to be 272, as the mapping frequency for $CO_3^{2-}$ ion. When this was divided by the overall frequency 2700 to calculate the area ratio of carbonate ion mapping S, a value of 10.1% was determined.

<Quantitation of Lithium Compound>

The obtained positive electrode sample 1 was cut out to a size of 5 cm×5 cm (weight: 0.259 g) and immersed in 20 g of methanol, and the vessel was capped and allowed to stand for 3 days in an environment at 25° C. The positive electrode was then removed out and vacuum dried for 10 hours under conditions of 120° C., 5 kPa. The positive electrode weight $M_0$ during this time was 0.252 g, and the methanol solution after washing was measured by GC/MS under conditions with a predrawn calibration curve, confirming a diethyl carbonate abundance of less than 1%. Next, the positive electrode was impregnated with 25.20 g of distilled water, and the vessel was capped and allowed to stand for 3 days in an environment at 45° C. Since the weight of the distilled water after standing for 3 days was 24.87 g, 0.33 g of distilled water had been added. The positive electrode was then removed out and vacuum dried for 12 hours under conditions of 150° C., 3 kPa. The positive electrode weight $M_1$ during this time was 0.237 g, and the distilled water after washing was measured by GC/MS under conditions with a predrawn calibration curve, confirming a methanol abundance of less than 1%. Next, a spatula, brush or bristles were used to remove off the active material layer from the positive electrode power collector, and the weight $M_2$ of the positive electrode power collector was measured to be 0.099 g. The lithium carbonate amount Z in the positive electrode was quantified by formula (4) to be 9.8 weight %.

Example 2

A nonaqueous lithium power storage element was fabricated by the same method as Example 1, except that charging of the nonaqueous lithium power storage element was initial charging by a method of constant-current charge at a current value of 100 mA until reaching a voltage of 4.6 V, followed by constant-voltage charge at 4.6 V continued for 40 hours, for lithium doping at the negative electrode.

Example 3

A nonaqueous lithium power storage element was fabricated by the same method as Example 1, except that charging of the nonaqueous lithium power storage element was initial charging by a method of constant-current charge at a current value of 200 mA until reaching a voltage of 4.3 V, followed by constant-voltage charge at 4.3 V continued for 10 hours, for lithium doping at the negative electrode.

Example 4

A nonaqueous lithium power storage element was fabricated by the same method as Example 1, except that pulverization of the lithium carbonate was carried out by cooling to −196° C. with liquid nitrogen, and then using φ1.0 mm zirconia beads for pulverization for 10 minutes at a circumferential speed of 10.0 m/s.

Example 5

A nonaqueous lithium power storage element was fabricated by the same method as Example 1, except that pulverization of the lithium carbonate was carried out by cooling to −196° C. with liquid nitrogen, and then using φ1.0 mm zirconia beads for pulverization for 5 minutes at a circumferential speed of 10.0 m/s.

Example 6

A nonaqueous lithium power storage element was fabricated by the same method as Example 1, except that pulverization of the lithium carbonate was carried out by cooling to −196° C. with liquid nitrogen, and then using (φ1.0 mm zirconia beads for pulverization for 3 minutes at a circumferential speed of 10.0 m/s.

Example 7

A nonaqueous lithium power storage element was fabricated by the same method as Example 1, except that pulverization of the lithium carbonate was carried out by cooling to −196° C. with liquid nitrogen and then using (φ1.0 mm zirconia beads for pulverization for 20 minutes at a circumferential speed of 10.0 m/s, and charging of the nonaqueous lithium power storage element was initial charging by a method of constant-current charge at a current value of 200 mA until reaching a voltage of 4.5 V, followed by constant-voltage charge at 4.5 V continued for 20 hours, in an environment at 45° C., for lithium doping at the negative electrode.

Example 8

A nonaqueous lithium power storage element was fabricated by the same method as Example 7, except that charging of the nonaqueous lithium power storage element was initial charging by a method of constant-current charge at a current value of 200 mA until reaching a voltage of 4.3 V, followed by constant-voltage charge at 4.3 V continued for 10 hours, for lithium doping at the negative electrode.

Example 9

A nonaqueous lithium power storage element was fabricated by the same method as Example 7, except that charging of the nonaqueous lithium power storage element was initial charging by a method of constant-current charge at a current value of 200 mA until reaching a voltage of 4.3 V, followed by constant-voltage charge at 4.5 V continued for 5 hours, for lithium doping at the negative electrode.

Example 10

A nonaqueous lithium power storage element was fabricated by the same method as Example 7, except that pulverization of the lithium carbonate was carried out by cooling to −196° C. with liquid nitrogen, and then using φ1.0 mm zirconia beads for pulverization for 5 minutes at a circumferential speed of 10.0 m/s.

Example 11

A nonaqueous lithium power storage element was fabricated by the same method as Example 10, except that charging of the nonaqueous lithium power storage element was initial charging by a method of constant-current charge at a current value of 200 mA until reaching a voltage of 4.3 V, followed by constant-voltage charge at 4.3 V continued for 2 hours, for lithium doping at the negative electrode.

Example 12

A nonaqueous lithium power storage element was fabricated by the same method as Example 10, except that charging of the nonaqueous lithium power storage element was initial charging by a method of constant-current charge at a current value of 200 mA until reaching a voltage of 4.5 V, followed by constant-voltage charge at 4.5 V continued for 6 hours, for lithium doping at the negative electrode.

Example 13

A nonaqueous lithium power storage element was fabricated by the same method as Example 10, except that charging of the nonaqueous lithium power storage element was initial charging by a method of constant-current charge at a current value of 200 mA until reaching a voltage of 4.5 V, followed by constant-voltage charge at 4.5 V continued for 1 hour, for lithium doping at the negative electrode.

Example 14

A nonaqueous lithium power storage element was fabricated by the same method as Example 10, except that charging of the nonaqueous lithium power storage element was initial charging by a method of constant-current charge at a current value of 100 mA until reaching a voltage of 4.2 V, followed by constant-voltage charge at 4.2 V continued for 1 hour, for lithium doping at the negative electrode.

Comparative Example 1

A nonaqueous lithium power storage element was fabricated by the same method as Example 1, except that pulverization of the lithium carbonate was carried out in an environment at 25° C., using φ1.0 mm zirconia beads for pulverization for 5 minutes at a circumferential speed of 10.0 m/s.

Comparative Example 2

A nonaqueous lithium power storage element was fabricated by the same method as Comparative Example 1, except that charging of the nonaqueous lithium power storage element was initial charging by a method of constant-current charge at a current value of 100 mA until reaching a voltage of 4.6 V, followed by constant-voltage charge at 4.6 V continued for 40 hours, for lithium doping at the negative electrode.

Comparative Example 3

A nonaqueous lithium power storage element was fabricated by the same method as Comparative Example 1, except that charging of the nonaqueous lithium power storage element was initial charging by a method of constant-current charge at a current value of 200 mA until reaching a voltage of 4.3 V, followed by constant-voltage charge at 4.3 V continued for 10 hours, for lithium doping at the negative electrode.

Comparative Example 4

A nonaqueous lithium power storage element was fabricated by the same method as Example 1, except that pulverization of the lithium carbonate was carried out in an environment at 25° C., using φ1.0 mm zirconia beads for pulverization for 2 minutes at a circumferential speed of 10.0 m/s.

Comparative Example 5

A nonaqueous lithium power storage element was fabricated by the same method as Comparative Example 4, except that charging of the nonaqueous lithium power storage element was initial charging by a method of constant-current charge at a current value of 200 mA until reaching a voltage of 4.3 V, followed by constant-voltage charge at 4.3 V continued for 10 hours, for lithium doping at the negative electrode.

Comparative Example 6

A nonaqueous lithium power storage element was fabricated by the same method as Comparative Example 4, except that charging of the nonaqueous lithium power storage element was initial charging by a method of constant-current charge at a current value of 200 mA until reaching a voltage of 4.3 V, followed by constant-voltage charge at 4.3 V continued for 10 hours, for lithium doping at the negative electrode.

Comparative Example 7

A nonaqueous lithium power storage element was fabricated by the same method as Comparative Example 1, except that charging of the nonaqueous lithium power storage element was initial charging by a method of constant-current charge at a current value of 200 mA until reaching a voltage of 4.5 V, followed by constant-voltage charge at 4.5 V continued for 20 hours, in an environment at 45° C., for lithium doping at the negative electrode.

Comparative Example 8

A nonaqueous lithium power storage element was fabricated by the same method as Comparative Example 7, except that charging of the nonaqueous lithium power storage element was initial charging by a method of constant-current charge at a current value of 100 mA until reaching a voltage of 4.6 V, followed by constant-voltage charge at 4.6 V continued for 40 hours, for lithium doping at the negative electrode.

Comparative Example 9

A nonaqueous lithium power storage element was fabricated by the same method as Comparative Example 7, except that charging of the nonaqueous lithium power storage element was initial charging by a method of constant-current charge at a current value of 200 mA until reaching a voltage of 4.3 V, followed by constant-voltage charge at 4.3 V continued for 10 hours, for lithium doping at the negative electrode.

Comparative Example 10

A nonaqueous lithium power storage element was fabricated by the same method as Comparative Example 1, except that charging of the nonaqueous lithium power storage element was initial charging by a method of constant-current charge at a current value of 200 mA until reaching a voltage of 4.5 V, followed by constant-voltage charge at 4.5 V continued for 20 hours, in an environment at 0° C., for lithium doping at the negative electrode.

Comparative Example 11

A nonaqueous lithium power storage element was fabricated by the same method as Comparative Example 10, except that charging of the nonaqueous lithium power storage element was initial charging by a method of constant-current charge at a current value of 100 mA until reaching a voltage of 4.6 V, followed by constant-voltage charge at 4.6 V continued for 40 hours, for lithium doping at the negative electrode.

Comparative Example 12

A nonaqueous lithium power storage element was fabricated by the same method as Comparative Example 10, except that charging of the nonaqueous lithium power storage element was initial charging by a method of constant-current charge at a current value of 200 mA until reaching a voltage of 4.3 V, followed by constant-voltage charge at 4.3 V continued for 10 hours, for lithium doping at the negative electrode.

The evaluation results for the nonaqueous lithium power storage elements of Examples 1 to 14 and Comparative Examples 1 to 12 are shown in Table 1.

TABLE 1

|  | Fa [F] | Ra [mΩ] | Fb [F] | Rb [mΩ] | B × $10^{-3}$ [cc/F] | Fb/Fa | Rb/Ra | Z [%] | $U_1$ [%] | $U_2$ [%] | S [%] |
|---|---|---|---|---|---|---|---|---|---|---|---|
| Example 1 | 1767 | 0.54 | 1851 | 0.58 | 1.22 | 1.05 | 1.07 | 9.8 | 90.3 | 40.1 | 10.1 |
| Example 2 | 1793 | 0.55 | 1867 | 0.62 | 1.34 | 1.04 | 1.13 | 13.1 | 78.5 | 31.8 | 13.9 |
| Example 3 | 1671 | 0.62 | 1741 | 0.71 | 1.45 | 1.04 | 1.15 | 19.1 | 56.3 | 19.2 | 19.1 |
| Example 4 | 1682 | 0.58 | 1697 | 0.60 | 1.21 | 1.01 | 1.03 | 10.2 | 94.5 | 58.0 | 10.1 |
| Example 5 | 1793 | 0.61 | 1823 | 0.64 | 1.39 | 1.02 | 1.05 | 14.7 | 94.0 | 50.5 | 15.6 |
| Example 6 | 1787 | 0.66 | 1817 | 0.71 | 1.54 | 1.02 | 1.08 | 18.7 | 84.6 | 35.4 | 19.9 |
| Example 7 | 1771 | 0.45 | 1828 | 0.48 | 1.00 | 1.03 | 1.07 | 3.7 | 97.9 | 60.6 | 3.8 |
| Example 8 | 1690 | 0.52 | 1760 | 0.55 | 1.10 | 1.04 | 1.06 | 7.3 | 85.3 | 43.5 | 7.1 |
| Example 9 | 1872 | 0.52 | 1925 | 0.57 | 1.25 | 1.03 | 1.10 | 10.6 | 79.3 | 36.3 | 11.4 |
| Example 10 | 1852 | 0.57 | 1927 | 0.63 | 1.39 | 1.04 | 1.11 | 13.5 | 79.9 | 30.9 | 14.6 |
| Example 11 | 1733 | 0.60 | 1811 | 0.71 | 1.48 | 1.05 | 1.18 | 19.9 | 45.2 | 13.0 | 22.5 |
| Example 12 | 1836 | 0.52 | 1874 | 0.59 | 1.25 | 1.02 | 1.13 | 10.7 | 68.9 | 28.3 | 11.1 |
| Example 13 | 1733 | 0.43 | 1826 | 0.51 | 1.05 | 1.05 | 1.19 | 16.1 | 50.7 | 16.4 | 16.3 |
| Example 14 | 1776 | 0.45 | 1858 | 0.53 | 1.15 | 1.05 | 1.18 | 18.9 | 48.0 | 14.4 | 22.1 |

TABLE 1-continued

| | Fa [F] | Ra [mΩ] | Fb [F] | Rb [mΩ] | B × 10$^{-3}$ [cc/F] | Fb/Fa | Rb/Ra | Z [%] | U$_1$ [%] | U$_2$ [%] | S [%] |
|---|---|---|---|---|---|---|---|---|---|---|---|
| Comp. Example 1 | 1348 | 1.50 | 1289 | 1.97 | 4.35 | 0.96 | 1.31 | 23.3 | 37.4 | 8.3 | 25.2 |
| Comp. Example 2 | 1140 | 1.86 | 1074 | 2.56 | 5.44 | 0.94 | 1.38 | 24.6 | 29.5 | 5.9 | 25.6 |
| Comp. Example 3 | 925 | 2.04 | 849 | 3.24 | 8.68 | 0.92 | 1.59 | 23.9 | 15.4 | 3.9 | 24.1 |
| Comp. Example 4 | 1097 | 1.51 | 1018 | 2.13 | 4.39 | 0.93 | 1.41 | 25.5 | 33.8 | 5.9 | 25.8 |
| Comp. Example 5 | 828 | 2.29 | 695 | 3.32 | 6.77 | 0.84 | 1.45 | 26.4 | 23.8 | 4.5 | 26.4 |
| Comp. Example 6 | 590 | 3.10 | 362 | 5.65 | 12.00 | 0.61 | 1.82 | 29.1 | 16.3 | 5.5 | 30.3 |
| Comp. Example 7 | 1373 | 1.44 | 1305 | 2.04 | 4.21 | 0.95 | 1.42 | 21.9 | 36.6 | 8.6 | 23.3 |
| Comp. Example 8 | 1311 | 1.64 | 1229 | 2.33 | 5.00 | 0.94 | 1.42 | 24.9 | 34.6 | 6.2 | 26.2 |
| Comp. Example 9 | 1235 | 1.85 | 1082 | 2.77 | 5.88 | 0.88 | 1.50 | 26.3 | 27.5 | 5.5 | 27.4 |
| Comp. Example 10 | 925 | 2.55 | 716 | 3.91 | 8.06 | 0.77 | 1.53 | 24.2 | 25.1 | 4.4 | 24.4 |
| Comp. Example 11 | 733 | 2.89 | 580 | 4.73 | 9.85 | 0.79 | 1.64 | 26.4 | 20.3 | 3.8 | 26.9 |
| Comp. Example 12 | 549 | 3.26 | 333 | 6.03 | 12.94 | 0.61 | 1.85 | 27.8 | 12.0 | 1.6 | 29.2 |

Example 15

<Pulverization of Lithium Carbonate>

A 200 g portion of lithium carbonate having a mean particle diameter of 53 μm was allowed to stand for 5 hours in a high-temperature, high-humidity chamber (SML-2, product of Espec Corp.), at a humidity of 70% and a temperature of 45° C. A pulverizer (LNM liquid nitrogen bead mill) by Aimex Corp. was then used for cooling to −196° C. with liquid nitrogen and φ1.0 mm zirconia beads were used for pulverization for 30 minutes at a circumferential speed of 10.0 m/s. The mean particle diameter of lithium carbonate 2, which was obtained by brittle fracture while preventing heat denaturation at −196° C., was measured to be 4.5 μm.

<Production of Positive Electrode Precursor>

The activated carbon $1_{a1}$ was used as a positive electrode active material to produce a positive electrode precursor, with lithium carbonate 2 as the lithium compound.

After mixing 50.5 parts by weight of activated carbon $1_{a1}$, 40.0 parts by weight of lithium carbonate 2, 3.0 parts by weight of Ketchen black, 1.5 parts by weight of PVP (polyvinylpyrrolidone), 5.0 parts by weight of PVdF (polyvinylidene fluoride) and NMP (N-methylpyrrolidone), the mixture was dispersed using a FILMIX® thin-film spinning high-speed mixer by Primix Corp., under conditions with a circumferential speed of 17 m/s, to obtain a coating solution. The viscosity (ηb) and TI value of the obtained coating solution were measured using a TVE-35H E-type viscometer by Toki Sangyo Co., Ltd. As a result, the viscosity (ηb) was 2,230 mPa·s and the TI value was 3.8. The degree of dispersion of the obtained coating solution was measured using a fineness gauge by Yoshimitsu Seiki Co. As a result, the granularity was 42 μm. The coating solution was coated onto one or both sides of an aluminum foil with a thickness of 15 μm using a die coater by Toray Engineering Co., Ltd. under conditions with a coating speed of 1 m/s, and dried at a drying temperature of 120° C. to obtain positive electrode precursor 2 (one side) and positive electrode precursor 2 (both sides). The obtained positive electrode precursor 2 (one side) and positive electrode precursor 2 (both sides) were pressed using a roll press under conditions with a pressure of 6 kN/cm and a pressed portion surface temperature of 25° C. The film thickness of the positive electrode active material layers of the obtained positive electrode precursor 2 (one side) and positive electrode precursor 2 (both sides) was determined by subtracting the thickness of the aluminum foil from the average thickness measured at 10 arbitrary locations of the positive electrode precursor 2 using a Linear Gauge Sensor GS-551 by Ono Sokki Co., Ltd. As a result, the thickness per side of the positive electrode active material layers was 62 μm.

<Preparation of Negative Electrode Active Material>

The BET specific surface area and pore distribution of commercially available coconut shell activated carbon were measured by the method described above, using a pore distribution measuring apparatus (AUTOSORB-1 AS-1-MP) by Yuasa-Ionics Co., Ltd. As a result, the BET specific surface area was 1,790 m$^2$/g, the mesopore volume (V$_1$) was 0.199 cc/g, the micropore volume (V$_2$) was 0.698 cc/g, V$_1$/V$_2$=0.29, and the mean pore size was 20.1 Å.

A 300 g portion of the coconut shell activated carbon was placed into a stainless steel mesh basket and placed on a stainless steel vat containing 540 g of coal-based pitch (softening point: 50° C.), and both were set in an electric furnace (furnace inner usable dimension: 300 mm×300 mm×300 mm), for thermal reaction to obtain composite porous carbon material 1a. The heat treatment was carried out under a nitrogen atmosphere, with temperature increase to 600° C. over a period of 8 hours, and 4 hours of holding at the same temperature. This was followed by natural cooling to 60° C., after which the composite carbon material 1a was removed out of the furnace.

The BET specific surface area and pore distribution of the obtained composite carbon material 1a were measured by the same methods as described above. As a result, the BET specific surface area was 262 m$^2$/g, the mesopore volume (V$_{m1}$) was 0.186 cc/g, the micropore volume (V$_{m2}$) was 0.082 cc/g and V$_{m1}$/V$_{m2}$=2.27. Also, for composite carbon material 1a, the weight ratio of coal-based pitch-derived carbonaceous material with respect to activated carbon was 78%.

<Production of Negative Electrode>

Composite carbon material 1a was then used as a negative electrode active material to produce a negative electrode.

After mixing 84 parts by weight of composite carbon material 1a, 10 parts by weight of acetylene black, 6 parts by weight of PVdF (polyvinylidene fluoride) and NMP (N-methylpyrrolidone), the mixture was dispersed using a FILMIX thin-film spinning high-speed mixer by Primix Corp., under conditions with a circumferential speed of 17 m/s, to obtain a coating solution. The viscosity (ηb) and TI value of the obtained coating solution were measured using a TVE-35H E-type viscometer by Toki Sangyo Co., Ltd. As a result, the viscosity (ηb) was 2,789 mPa·s and the TI value was 4.3. The coating solution was coated onto both sides of an electrolytic copper foil with a thickness of 10 μm using a die coater by Toray Engineering Co., Ltd. under conditions with a coating speed of 2 m/s, and dried at a drying temperature of 120° C. to obtain negative electrode 2. The obtained negative electrode 2 was pressed using a roll press under conditions with a pressure of 5 kN/cm and a pressed portion surface temperature of 25° C. The film thickness of the negative electrode active material layer of the obtained negative electrode 2 was determined by subtracting the thickness of the copper foil from the average thickness measured at 10 arbitrary locations of negative electrode 2 using a Linear Gauge Sensor GS-551 by Ono Sokki Co., Ltd. As a result, the thickness per side of the negative electrode active material layers was 40 μm.

[Measurement of Capacitance Per Unit Weight of Negative Electrode]

The obtained negative electrode 2 was cut out to a single size of 1.4 cm×2.0 cm (2.8 cm$^2$), and of the negative electrode active material layers that were coated onto both sides of the copper foil, the layer on one side was removed using a spatula, brush or bristles to produce a working electrode, and metal lithium was used as the counter electrode and reference electrode, to fabricate an electrochemical cell in an argon box, using a nonaqueous solution of LiPF$_6$ dissolved to a concentration of 1.0 mol/L in a mixed solvent of ethylene carbonate (EC) and ethylmethyl carbonate (EMC) at a volume ratio of 1:1, as the electrolytic solution.

The initial charging capacitance of the obtained electrochemical cell was measured by the following procedure using a charge/discharge apparatus (TOSCAT-3100U) by Toyo System Co., Ltd.

The electrochemical cell was subjected to constant-current charge at a temperature of 25° C., with a current value of 0.5 mA/cm$^2$ until reaching a voltage value of 0.01 V, and then to constant-voltage charge until the current value reached 0.01 mA/cm$^2$. When the charge capacity during constant-current charge and constant-voltage charge was evaluated as the initial charge capacity, it was found to be 1.6 mAh, and the capacitance per unit weight of negative electrode 2 (lithium ion doping amount) was 1460 mAh/g.

<Fabrication of Nonaqueous Lithium Power Storage Element>

A nonaqueous lithium power storage element was fabricated by the same method as Example 1, except for using the positive electrode precursor 2 (one side), positive electrode precursor 2 (both sides) and negative electrode 2.

Example 16

A nonaqueous lithium power storage element was fabricated by the same method as Example 15, except that charging of the nonaqueous lithium power storage element was initial charging by a method of constant-current charge at a current value of 100 mA until reaching a voltage of 4.6 V, followed by constant-voltage charge at 4.6 V continued for 40 hours, for lithium doping at the negative electrode.

Example 17

A nonaqueous lithium power storage element was fabricated by the same method as Example 15, except that charging of the nonaqueous lithium power storage element was initial charging by a method of constant-current charge at a current value of 200 mA until reaching a voltage of 4.3 V, followed by constant-voltage charge at 4.3 V continued for 10 hours, for lithium doping at the negative electrode.

Example 18

A nonaqueous lithium power storage element was fabricated by the same method as Example 15, except that pulverization of the lithium carbonate was carried out by cooling to −196° C. with liquid nitrogen, and then using φ1.0 mm zirconia beads for pulverization for 10 minutes at a circumferential speed of 10.0 m/s.

Example 19

A nonaqueous lithium power storage element was fabricated by the same method as Example 15, except that pulverization of the lithium carbonate was carried out by cooling to −196° C. with liquid nitrogen, and then using φ1.0 mm zirconia beads for pulverization for 5 minutes at a circumferential speed of 10.0 m/s.

Example 20

A nonaqueous lithium power storage element was fabricated by the same method as Example 15, except that pulverization of the lithium carbonate was carried out by cooling to −196° C. with liquid nitrogen, and then using φ1.0 mm zirconia beads for pulverization for 3 minutes at a circumferential speed of 10.0 m/s.

Example 21

A nonaqueous lithium power storage element was fabricated by the same method as Example 15, except that pulverization of the lithium carbonate was carried out by cooling to −196° C. with liquid nitrogen and then using φ1.0 mm zirconia beads for pulverization for 20 minutes at a circumferential speed of 10.0 m/s, and charging of the nonaqueous lithium power storage element was initial charging by a method of constant-current charge at a current value of 200 mA until reaching a voltage of 4.5 V, followed by constant-voltage charge at 4.5 V continued for 20 hours, in an environment at 45° C., for lithium doping at the negative electrode.

Example 22

A nonaqueous lithium power storage element was fabricated by the same method as Example 21, except that charging of the nonaqueous lithium power storage element was initial charging by a method of constant-current charge at a current value of 200 mA until reaching a voltage of 4.3 V, followed by constant-voltage charge at 4.3 V continued for 10 hours, for lithium doping at the negative electrode.

Example 23

A nonaqueous lithium power storage element was fabricated by the same method as Example 21, except that charging of the nonaqueous lithium power storage element was initial charging by a method of constant-current charge at a current value of 200 mA until reaching a voltage of 4.3 V, followed by constant-voltage charge at 4.5 V continued for 5 hours, for lithium doping at the negative electrode.

Example 24

A nonaqueous lithium power storage element was fabricated by the same method as Example 21, except that pulverization of the lithium carbonate was carried out by cooling to −196° C. with liquid nitrogen, and then using φ1.0 mm zirconia beads for pulverization for 5 minutes at a circumferential speed of 10.0 m/s.

Example 25

A nonaqueous lithium power storage element was fabricated by the same method as Example 24, except that charging of the nonaqueous lithium power storage element was initial charging by a method of constant-current charge at a current value of 200 mA until reaching a voltage of 4.3 V, followed by constant-voltage charge at 4.3 V continued for 2 hours, for lithium doping at the negative electrode.

Example 26

A nonaqueous lithium power storage element was fabricated by the same method as Example 24, except that charging of the nonaqueous lithium power storage element was initial charging by a method of constant-current charge at a current value of 200 mA until reaching a voltage of 4.5 V, followed by constant-voltage charge at 4.5 V continued for 6 hours, for lithium doping at the negative electrode.

Example 27

A nonaqueous lithium power storage element was fabricated by the same method as Example 24, except that charging of the nonaqueous lithium power storage element was initial charging by a method of constant-current charge at a current value of 200 mA until reaching a voltage of 4.5 V, followed by constant-voltage charge at 4.5 V continued for 1 hour, for lithium doping at the negative electrode.

Example 28

A nonaqueous lithium power storage element was fabricated by the same method as Example 24, except that charging of the nonaqueous lithium power storage element was initial charging by a method of constant-current charge at a current value of 100 mA until reaching a voltage of 4.2 V, followed by constant-voltage charge at 4.2 V continued for 1 hour, for lithium doping at the negative electrode.

Comparative Example 13

A nonaqueous lithium power storage element was fabricated by the same method as Example 15, except that pulverization of the lithium carbonate was carried out in an environment at 25° C., using φ1.0 mm zirconia beads for pulverization for 5 minutes at a circumferential speed of 10.0 m/s.

Comparative Example 14

A nonaqueous lithium power storage element was fabricated by the same method as Comparative Example 13, except that charging of the nonaqueous lithium power storage element was initial charging by a method of constant-current charge at a current value of 100 mA until reaching a voltage of 4.6 V, followed by constant-voltage charge at 4.6 V continued for 40 hours, for lithium doping at the negative electrode.

Comparative Example 15

A nonaqueous lithium power storage element was fabricated by the same method as Comparative Example 13, except that charging of the nonaqueous lithium power storage element was initial charging by a method of constant-current charge at a current value of 200 mA until reaching a voltage of 4.3 V, followed by constant-voltage charge at 4.3 V continued for 10 hours, for lithium doping at the negative electrode.

Comparative Example 16

A nonaqueous lithium power storage element was fabricated by the same method as Example 13, except that pulverization of the lithium carbonate was carried out in an environment at 25° C., using φ1.0 mm zirconia beads for pulverization for 2 minutes at a circumferential speed of 10.0 m/s.

Comparative Example 17

A nonaqueous lithium power storage element was fabricated by the same method as Comparative Example 16, except that charging of the nonaqueous lithium power storage element was initial charging by a method of constant-current charge at a current value of 200 mA until reaching a voltage of 4.3 V, followed by constant-voltage charge at 4.3 V continued for 10 hours, for lithium doping at the negative electrode.

Comparative Example 18

A nonaqueous lithium power storage element was fabricated by the same method as Comparative Example 16, except that charging of the nonaqueous lithium power storage element was initial charging by a method of constant-current charge at a current value of 200 mA until reaching a voltage of 4.3 V, followed by constant-voltage charge at 4.3 V continued for 10 hours, for lithium doping at the negative electrode.

Comparative Example 19

A nonaqueous lithium power storage element was fabricated by the same method as Comparative Example 13, except that charging of the nonaqueous lithium power storage element was initial charging by a method of constant-current charge at a current value of 200 mA until reaching a voltage of 4.5 V, followed by constant-voltage charge at 4.5 V continued for 20 hours, in an environment at 45° C., for lithium doping at the negative electrode.

Comparative Example 20

A nonaqueous lithium power storage element was fabricated by the same method as Comparative Example 19, except that charging of the nonaqueous lithium power storage element was initial charging by a method of constant-current charge at a current value of 100 mA until reaching a voltage of 4.6 V, followed by constant-voltage charge at 4.6 V continued for 40 hours, for lithium doping at the negative electrode.

Comparative Example 21

A nonaqueous lithium power storage element was fabricated by the same method as Comparative Example 19, except that charging of the nonaqueous lithium power storage element was initial charging by a method of constant-current charge at a current value of 200 mA until reaching a voltage of 4.3 V, followed by constant-voltage charge at 4.3 V continued for 10 hours, for lithium doping at the negative electrode.

Comparative Example 22

A nonaqueous lithium power storage element was fabricated by the same method as Comparative Example 13, except that charging of the nonaqueous lithium power storage element was initial charging by a method of constant-current charge at a current value of 200 mA until reaching a voltage of 4.5 V, followed by constant-voltage charge at 4.5 V continued for 20 hours, in an environment at 0° C., for lithium doping at the negative electrode.

Comparative Example 23

A nonaqueous lithium power storage element was fabricated by the same method as Comparative Example 22, except that charging of the nonaqueous lithium power storage element was initial charging by a method of constant-current charge at a current value of 100 mA until reaching a voltage of 4.6 V, followed by constant-voltage charge at 4.6 V continued for 40 hours, for lithium doping at the negative electrode.

Comparative Example 24

A nonaqueous lithium power storage element was fabricated by the same method as Comparative Example 22, except that charging of the nonaqueous lithium power storage element was initial charging by a method of constant-current charge at a current value of 200 mA until reaching a voltage of 4.3 V, followed by constant-voltage charge at 4.3 V continued for 10 hours, for lithium doping at the negative electrode.

The evaluation results for the nonaqueous lithium power storage elements of Examples 15 to 28 and Comparative Examples 13 to 24 are shown in Table 2.

it was not affected by temperature increase during pulverization, and formation of defects in the lithium carbonate particle surfaces could be suppressed. Presumably, as a result, it was possible to suppress reaggregation of lithium carbonate particles. Furthermore, it is believed that pretreatment of the lithium carbonate in an environment with a high dew point allowed activation of the lithium carbonate surfaces, and efficient decomposition of the $LiPF_6$ electrolyte on the lithium carbonate particle surfaces, resulting in uniform accumulation of generated fluorine compounds and an improved high-temperature storage characteristic and high load charge/discharge characteristic.

Example 29

A 200 g portion of lithium hydroxide having a mean particle diameter of 73 μm was allowed to stand for 30 minutes in a high-temperature, high-humidity chamber (SML-2, product of Espec Corp.), at a humidity of 50% and a temperature of 45° C. Next, using a pulverizer (LNM liquid nitrogen bead mill) by Aimex Corp., it was cooled to −196° C. with liquid nitrogen and pulverized for 60 minutes at a circumferential speed of 10.0 m/s, using dry ice beads. The mean particle diameter of lithium hydroxide 1, which was obtained by brittle fracture while preventing heat denaturation at −196° C., was measured to be 3.5 μm.

A nonaqueous lithium power storage element was fabricated by the same method as Example 1, except for using the obtained lithium hydroxide 1. When the obtained nonaqueous lithium power storage element was evaluated in the same manner as Example 1, Fa was 1704 F, Ra was 0.63 mΩ, Fb was 1763 F, Rb was 0.69 mΩ, Fb/Fa was 1.03, Rb/Ra was 1.10, Z was 10.8%, $U_1$ was 88.7%, $U_2$ was 34.8% and E was 12.1%.

TABLE 2

|  | Fa [F] | Ra [mΩ] | Fb [F] | Rb [mΩ] | B × 10⁻³ [cc/F] | Fb/Fa | Rb/Ra | Z [%] | $U_1$ [%] | $U_2$ [%] | S [%] |
|---|---|---|---|---|---|---|---|---|---|---|---|
| Example 15 | 1612 | 0.47 | 1671 | 0.53 | 1.68 | 1.04 | 1.13 | 8.7 | 91.9 | 40.5 | 9.4 |
| Example 16 | 1620 | 0.48 | 1654 | 0.56 | 1.89 | 1.02 | 1.17 | 14.1 | 79.2 | 32.4 | 15.1 |
| Example 17 | 1408 | 0.54 | 1452 | 0.60 | 2.00 | 1.03 | 1.11 | 19.3 | 54.6 | 19.4 | 19.9 |
| Example 18 | 1416 | 0.51 | 1456 | 0.51 | 1.71 | 1.03 | 1.00 | 8.9 | 92.5 | 59.2 | 9.3 |
| Example 19 | 1556 | 0.51 | 1615 | 0.56 | 1.80 | 1.04 | 1.10 | 15.8 | 92.9 | 49.5 | 16.6 |
| Example 20 | 1551 | 0.56 | 1609 | 0.62 | 1.99 | 1.04 | 1.11 | 20.1 | 83.7 | 34.7 | 21.1 |
| Example 21 | 1553 | 0.40 | 1569 | 0.42 | 1.44 | 1.01 | 1.05 | 2.5 | 96.8 | 62.4 | 2.6 |
| Example 22 | 1367 | 0.44 | 1438 | 0.44 | 1.46 | 1.05 | 1.00 | 5.9 | 81.1 | 43.1 | 6.0 |
| Example 23 | 1658 | 0.44 | 1722 | 0.50 | 1.66 | 1.04 | 1.14 | 11.5 | 79.2 | 35.9 | 12.2 |
| Example 24 | 1689 | 0.50 | 1740 | 0.57 | 1.91 | 1.03 | 1.14 | 14.8 | 81.3 | 31.2 | 16.0 |
| Example 25 | 1549 | 0.54 | 1572 | 0.63 | 2.21 | 1.01 | 1.17 | 20.5 | 45.6 | 13.7 | 22.0 |
| Example 26 | 1643 | 0.46 | 1688 | 0.53 | 1.80 | 1.03 | 1.15 | 9.3 | 68.8 | 29.1 | 9.9 |
| Example 27 | 1490 | 0.38 | 1539 | 0.44 | 1.48 | 1.03 | 1.16 | 16.4 | 49.6 | 16.7 | 17.1 |
| Example 28 | 1495 | 0.37 | 1576 | 0.45 | 1.40 | 1.05 | 1.22 | 20.3 | 47.5 | 12.1 | 21.3 |
| Comp. Example 13 | 1156 | 1.23 | 1164 | 1.69 | 5.31 | 1.01 | 1.37 | 25.5 | 37.7 | 7.9 | 27.3 |
| Comp. Example 14 | 1020 | 1.65 | 933 | 2.29 | 7.81 | 0.91 | 1.39 | 25.9 | 29.5 | 6.1 | 27.5 |
| Comp. Example 15 | 764 | 1.72 | 716 | 2.68 | 11.27 | 0.94 | 1.56 | 24.4 | 14.5 | 3.8 | 24.4 |
| Comp. Example 16 | 897 | 1.26 | 858 | 1.74 | 5.58 | 0.96 | 1.38 | 26.0 | 31.8 | 5.7 | 26.0 |
| Comp. Example 17 | 705 | 2.01 | 580 | 2.82 | 9.52 | 0.82 | 1.40 | 26.7 | 23.3 | 4.6 | 27.8 |
| Comp. Example 18 | 497 | 2.59 | 314 | 4.76 | 15.26 | 0.63 | 1.84 | 30.6 | 15.8 | 5.3 | 31.5 |
| Comp. Example 19 | 1169 | 1.25 | 1100 | 1.74 | 5.80 | 0.94 | 1.39 | 22.4 | 35.5 | 8.7 | 23.1 |
| Comp. Example 20 | 1116 | 1.37 | 1078 | 1.98 | 6.36 | 0.97 | 1.45 | 26.5 | 33.9 | 6.0 | 27.6 |
| Comp. Example 21 | 1051 | 1.56 | 940 | 2.36 | 7.63 | 0.89 | 1.51 | 27.7 | 26.7 | 5.4 | 28.5 |
| Comp. Example 22 | 795 | 2.24 | 603 | 3.36 | 11.34 | 0.76 | 1.50 | 24.7 | 24.6 | 4.5 | 25.7 |
| Comp. Example 23 | 643 | 2.56 | 494 | 4.15 | 14.13 | 0.77 | 1.62 | 27.2 | 20.1 | 3.9 | 28.6 |
| Comp. Example 24 | 486 | 2.83 | 292 | 5.34 | 17.85 | 0.60 | 1.89 | 29.5 | 11.9 | 1.6 | 31.0 |

Evaluation of Examples 1 to 28 and Comparative Examples 1 to 24

It is believed that by pulverizing the lithium carbonate under conditions with a cryogenic temperature of −196° C.,

Comparative Example 25

A nonaqueous lithium power storage element was fabricated by the same method as Example 29, except that pulverization of the lithium hydroxide was carried out in an environment at 25° C., using 0.0 mm zirconia beads for pulverization for 5 minutes at a circumferential speed of 10.0 m/s, for use as the lithium compound. When the obtained nonaqueous lithium power storage element was evaluated in the same manner as Example 1, Fa was 824 F, Ra was 2.43 mΩ, Fb was 747 F, Rb was 3.37 mΩ, Fb/Fa was 0.91, Rb/Ra was 1.39, Z was 23.4%, $U_1$ was 32.7%, $U_2$ was 6.2% and E was 25.2%.

Example 30

A 200 g portion of lithium oxide having a mean particle diameter of 83 μm was allowed to stand for 30 minutes in a high-temperature, high-humidity chamber (SML-2, product of Espec Corp.), at a humidity of 50% and a temperature of 45° C. Next, using a pulverizer (LNM liquid nitrogen bead mill) by Aimex Corp., it was cooled to −196° C. with liquid nitrogen and pulverized for 120 minutes at a circumferential speed of 10.0 m/s, using dry ice beads. The mean particle diameter of lithium oxide 1, which was obtained by brittle fracture while preventing heat denaturation at −196° C., was measured to be 5.2 μm.

A nonaqueous lithium power storage element was fabricated by the same method as Example 1, except for using the obtained lithium oxide 1. When the obtained nonaqueous lithium power storage element was evaluated in the same manner as Example 1, Fa was 172 F, Ra was 0.59 mΩ, Fb was 1772 F, Rb was 0.66 mΩ, Fb/Fa was 1.03, Rb/Ra was 1.12, Z was 11.3%, $U_1$ was 90.7%, $U_2$ was 39.8% and E was 12.5%.

Comparative Example 26

A nonaqueous lithium power storage element was fabricated by the same method as Example 30, except that pulverization of the lithium oxide was carried out in an environment at 25° C., using φ1.0 mm zirconia beads for pulverization for 5 minutes at a circumferential speed of 10.0 m/s, for use as the lithium compound. When the obtained nonaqueous lithium power storage element was evaluated in the same manner as Example 1, Fa was 872 F, Ra was 2.78 mΩ, Fb was 787 F, Rb was 4.11 mΩ, Fb/Fa was 0.90, Rb/Ra was 1.48, Z was 24.1%, $U_1$ was 28.7%, $U_2$ was 4.5% and E was 30.5%.

The examples and comparative examples of the second embodiment will now be described in detail.

Example 31

<Preparation of Positive Electrode Active Material>
[Preparation Example of Activated Carbon $1_{a2}$]

Crushed coconut shell carbide was placed in a small carbonizing furnace and subjected to carbonization at 500° C. for 3 hours under a nitrogen atmosphere, to obtain a carbide. The obtained carbide was placed in an activating furnace, water vapor in a heated state using a preheating furnace was introduced into the activating furnace at 1 kg/h, and the temperature was increased to 900° C. over 8 hours for activation. The activated carbide was cooled under a nitrogen atmosphere to obtain activated carbon. The obtained activated carbon was flow-rinsed for 10 hours, drained, and dried for 10 hours in an electrodesiccator held at 115° C., and then it was pulverized for 1 hour with a ball mill to obtain activated carbon $1_{a2}$.

A laser diffraction particle size distribution analyzer (SALD-2000J) by Shimadzu Corp. was used to measure the mean particle diameter of activated carbon $1_{a2}$, which was found to be 4.2 μm. Also, a pore distribution measuring apparatus (AUTOSORB-1 AS-1-MP) by Yuasa-Ionics Co., Ltd. was used to measure the pore distribution of the activated carbon 1. As a result, the BET specific surface area was 2360 m$^2$/g, the mesopore volume ($V_1$) was 0.52 cc/g, the micropore volume ($V_2$) was 0.88 cc/g, and $V_1/V_2$=0.59.

[Preparation Example of Activated Carbon $2_{a2}$]

A phenol resin was placed in a firing furnace and subjected to carbonization at 600° C. for 2 hours under a nitrogen atmosphere, and was then pulverized with a ball mill and sorted, to obtain a carbide having a mean particle diameter of 7 μm. The obtained carbide was mixed with KOH at a weight ratio of 1:5, and the mixture was placed in a firing furnace and heated at 800° C. for 1 hour under a nitrogen atmosphere and activated. The activated carbide was removed out and stirred and rinsed for 1 hour in dilute hydrochloric acid adjusted to a concentration of 2 mol/L, and then boiled and rinsed with distilled water until the pH stabilized to between 5 and 6, after which it was dried to produce activated carbon $2_{a2}$.

A laser diffraction particle size distribution analyzer (SALD-2000J) by Shimadzu Corp. was used to measure the mean particle diameter of activated carbon $2_{a2}$, which was found to be 7.0 μm. Also, a pore distribution measuring apparatus (AUTOSORB-1 AS-1-MP) by Yuasa-Ionics Co., Ltd. was used to measure the pore distribution of the activated carbon $2_{a2}$. As a result, the BET specific surface area was 3627 m$^2$/g, the mesopore volume ($V_1$) was 1.50 cc/g, the micropore volume ($V_2$) was 2.28 cc/g, and $V_1/V_2$=0.66.

<Production of Positive Electrode Precursor>

Activated carbon $2_{a2}$ was used as a positive electrode active material to produce a positive electrode precursor.

After mixing 55.5 parts by weight of activated carbon $2_{a2}$, 32.0 parts by weight of lithium carbonate having a mean particle diameter of 2.5 μm, 3.0 parts by weight of Ketchen black, 1.5 parts by weight of PVP (polyvinylpyrrolidone), 8.0 parts by weight of PVdF (polyvinylidene fluoride) and NMP (N-methylpyrrolidone), the mixture was dispersed using a FILMIX® thin-film spinning high-speed mixer by Primix Corp., under conditions with a circumferential speed of 17 m/s, to obtain coating solution 1.

Coating solution 2 was obtained by the same method as above, except for using 50.5 parts by weight of activated carbon $2_{a2}$, 38.0 parts by weight of lithium carbonate having a mean particle diameter of 2.5 μm, 2.7 parts by weight of Ketchen black, 1.4 parts by weight of PVP (polyvinylpyrrolidone) and 7.4 parts by weight of PVdF (polyvinylidene fluoride).

The viscosity (ηb) and TI value of coating solution 1 and coating solution 2 were measured using a TVE-35H E-type viscometer by Toki Sangyo Co., Ltd., and as a result the viscosity (ηb) of coating solution 1 was 2,820 mPa·s and the TI value was 4.3, and the viscosity (ηb) of coating solution 2 was 2,690 mPa·s and the TI value was 3.9.

Also, the degree of dispersion of the obtained coating solution was measured using a fineness gauge by Yoshimitsu Seiki Co., and as a result the granularity of coating solution 1 was 30 μm and the granularity of coating solution 2 was 31 μm.

Coating solution 1 was coated onto one side of an aluminum foil with a thickness of 15 μm and coating solution 2 was coated onto the other side, using a die coater by Toray Engineering Co., Ltd. under conditions with a coating speed of 1 m/s, and they were dried at a drying temperature of 120° C. to obtain positive electrode precursor 3.

Next, coating solution 1 was coated onto both sides of an aluminum foil with a thickness of 15 µm by the same method as above, to obtain positive electrode precursor 4.

The obtained positive electrode precursor 3 and positive electrode precursor 4 were pressed using a roll press under conditions with a pressure of 6 kN/cm and a pressed portion surface temperature of 25° C. The total thicknesses of the pressed positive electrode precursor 3 and positive electrode precursor 4 were measured at 10 arbitrary locations of positive electrode precursor 3 and positive electrode precursor 4 using a Linear Gauge Sensor GS-551. by Ono Sokki Co., Ltd. The thickness of the aluminum foil was subtracted from the mean values for the measured total thicknesses, and as a result of determining the film thickness of the positive electrode active material layer of positive electrode precursor 4, the film thickness of the positive electrode active material layer (the film thickness of the coated coating solution 1) was 54 µm on each side, while the film thickness of the positive electrode active material layer of positive electrode precursor 3 coated with coating solution 2 was 55 µm on each side.

<Production of Negative Electrode>

Composite porous carbon material 2a fabricated in Example 1 was used as a negative electrode active material to produce a negative electrode.

After mixing 84 parts by weight of composite porous carbon material 2a, 10 parts by weight of acetylene black, 6 parts by weight of PVdF (polyvinylidene fluoride) and NMP (N-methylpyrrolidone), the mixture was dispersed using a FILMIX thin-film spinning high-speed mixer by Primix Corp., under conditions with a circumferential speed of 17 m/s, to obtain a coating solution. The viscosity ($\eta$b) and TI value of the obtained coating solution were measured using a TVE-35H E-type viscometer by Toki Sangyo Co., Ltd. As a result, the viscosity ($\eta$b) was 2,310 mPa·s and the TI value was 2.9.

The coating solution was coated onto both sides of an electrolytic copper foil with a thickness of 10 µm using a die coater by Toray Engineering Co., Ltd. under conditions with a coating speed of 2 m/s, and dried at a drying temperature of 120° C. to obtain negative electrode 3. The obtained negative electrode 3 was pressed using a roll press under conditions with a pressure of 5 kN/cm and a pressed portion surface temperature of 25° C.

The total thickness of the pressed negative electrode 3 was measured at 10 arbitrary locations of negative electrode 3, using a Linear Gauge Sensor GS-551 by Ono Sokki Co., Ltd. The total thickness of the copper foil was subtracted from the mean value of the measured film thickness, to determine the film thickness of the negative electrode active material layer of negative electrode 3. As a result, the film thickness of the negative electrode active material layers was 31 µm per side.

[Measurement of Capacitance Per Unit Weight of Negative Electrode]

One piece of the obtained negative electrode 3 was cut out to a size of 1.4 cm×2.0 cm (2.8 cm$^2$), and the negative electrode active material layer coated onto both sides of the copper foil was removed on one side using a spatula, brush or bristles to obtain a working electrode. Metal lithium was used as the counter electrode and reference electrode, to fabricate an electrochemical cell in an argon box, using a nonaqueous solution of LiPF$_6$ dissolved to a concentration of 1.0 mol/L in a mixed solvent of ethylene carbonate (EC) and ethylmethyl carbonate (EMC) at a volume ratio of 1:1, as the electrolytic solution.

The initial charging capacitance of the obtained electrochemical cell was measured by the following procedure using a charge/discharge apparatus (TOSCAT-3100U) by Toyo System Co., Ltd.

The electrochemical cell was subjected to constant-current charge at a temperature of 25° C., with a current value of 0.5 mA/cm$^2$ until reaching a voltage value of 0.01 V, and then to constant-voltage charge until the current value reached 0.01 mA/cm$^2$. When the charge capacity during constant-current charge and constant-voltage charge was evaluated as the initial charge capacity, it was found to be 0.74 mAh, and the capacitance per unit weight of negative electrode 3 (lithium ion doping amount) was 545 mAh/g.

<Fabrication of Nonaqueous Lithium Power Storage Element>

The obtained positive electrode precursor 3 and positive electrode precursor 4 were cut into two positive electrode precursors 3 and 19 positive electrode precursors 4, with the positive electrode active material layers at sizes of 10.0 cm×10.0 cm (100 cm$^2$). Twenty negative electrodes 3 were then cut out, with the negative electrode active material layers at sizes of 10.1 cm×10.1 cm (102 cm$^2$). Also, 40 10.3 cm×10.3 cm (106 cm$^2$) polyethylene separators (by Asahi Kasei Corp., thickness: 10 µm) were prepared. These were situated with the positive electrode precursors 3 as the outermost layers, and the outermost layers being situated so that the positive electrode active material layer coated with coating solution 2 was not facing the negative electrode, and lamination was performed in the order: positive electrode precursor 3, separator, negative electrode 3, separator, positive electrode precursor 4, with the positive electrode active material layers and negative electrode active material layers laminated facing each other across the separators, to obtain an electrode laminated body. A positive electrode terminal and negative electrode terminal were ultrasonically welded to the obtained electrode laminated body and placed in a vessel formed of an aluminum laminate package material, and 3 sides including the electrode terminal section were sealed by heat sealing.

Approximately 70 g of the nonaqueous electrolytic solution 1 was injected into the electrode laminated body housed in the aluminum laminate package material, in a dry air environment at atmospheric pressure, a temperature of 25° C. and a dew point of no higher than −40° C. Next, the aluminum laminate package material housing the electrode laminated body and nonaqueous electrolytic solution was placed in a pressure reduction chamber and the pressure was reduced from atmospheric pressure to −87 kPa, after which it was restored to atmospheric pressure and allowed to stand for 5 minutes. The procedure of reducing the pressure of the package material in the chamber from atmospheric pressure to −87 kPa and then restoring to atmospheric pressure was subsequently repeated 4 times, and it was then allowed to stand for 15 minutes. The pressure of the package material in the chamber was again reduced from atmospheric pressure to −91 kPa, and then restored to atmospheric pressure. The procedure of pressure reduction and restoration to atmospheric pressure in the same manner was repeated a total of 7 times (pressure reduction from atmospheric pressure to −95 kPa, −96 kPa, −97 kPa, −81 kPa, −97 kPa, −97 kPa and −97 kPa, respectively). The electrode laminated body was impregnated with nonaqueous electrolytic solution 1 by this procedure.

Next, the electrode laminated body impregnated with nonaqueous electrolytic solution 1 was placed in a pressure-reducing sealing machine, and with the pressure reduced to −95 kPa, it was sealed at 180° C. for 10 seconds at a pressure of 0.1 MPa to seal the aluminum laminate package material.

[Lithium Doping]

The electrode laminated body obtained after sealing was placed in an argon box at a temperature of 25° C., a dew point of −60° C. and an oxygen concentration of 1 ppm. The excess portion of the aluminum laminate package material was cut to unseal it, and it was subjected to initial charging by a method of constant-current charge using a power source by Matsusada Precision, Inc. (P4LT18-0.2), with a current value of 100 mA until reaching a voltage of 4.5 V, followed by constant-voltage charge at 4.5 V continued for 72 hours, for lithium doping of the negative electrode. Upon completion of the lithium doping, a heat sealer by Fuji Impulse Co., Ltd. (FA-300) was used to seal the aluminum laminate.

[Aging]

The lithium-doped electrode laminated body was removed from the argon box and subjected to constant-current discharge in an environment of 25° C. at 100 mA until reaching a voltage of 3.8 V, and then constant-current discharge at 3.8 V for 1 hour, to adjust the voltage to 3.8 V. The electrode laminated body was then stored for 48 hours in a thermostatic bath at 60° C.

[Degassing]

A portion of the aluminum laminate package material of the aged electrode laminated body was unsealed in a dry air environment with a temperature of 25° C. and a dew point of −40° C. Next, the electrode laminated body was placed in a pressure reduction chamber, and a procedure of using a diaphragm pump (N816.3KT.45.18 by KNF Co.) for pressure reduction over a period of 3 minutes from atmospheric pressure to −80 kPa, followed by restoration to atmospheric pressure over a period of 3 minutes, was repeated 3 times. Next, the electrode laminated body was placed in a pressure-reducing sealing machine, and after pressure reduction to −90 kPa, it was sealed at 200° C. for 10 seconds at a pressure of 0.1 MPa to seal the aluminum laminate package material, to fabricate a nonaqueous lithium power storage element. Four nonaqueous lithium power storage elements were fabricated by this procedure.

<Evaluation of Nonaqueous Lithium Power Storage Elements>

[Measurement of Electrostatic Capacitance Fa]

One of the obtained nonaqueous lithium power storage elements was subjected to constant-current charge using a charge/discharge apparatus (5 V, 360 A) by Fujitsu Telecom Networks, Fukushima in a thermostatic bath set to 25° C., with a 2 C current value (1.6 A) until reaching 3.8 V, and then constant-voltage charge was carried out with application of a constant voltage of 3.8 V for a total of 30 minutes. Next, with the capacitance after constant-current discharge to 2.2 V at the 2 C current value (1.6 A) as Q [C], F=Q/(3.8−2.2) was calculated as the electrostatic capacitance Fa, to be 1763 F.

[Measurement of Internal Resistance Ra]

The nonaqueous lithium power storage element was subjected to constant-current charge using a charge/discharge apparatus (5 V, 360 A) by Fujitsu Telecom Networks, Fukushima in a thermostatic bath set to 25° C., with a 20 C current value (16 A) until reaching 3.8 V, and then constant-voltage charge was carried out with application of a constant voltage of 3.8 V for a total of 30 minutes. Next, constant-current discharge was carried out to 2.2 V with a sampling time of 0.1 second and the 20 C current value (16 A), to obtain a discharge curve (time-voltage). From the discharge curve, with the voltage of Eo at discharge time=0 seconds, obtained by extrapolating by linear approximation from the voltage values at discharge times of 2 seconds and 4 seconds, the internal resistance Ra was calculated from the voltage drop $\Delta E=3.8-Eo$ and $R=\Delta E/(20\text{ C current value})$, to be 0.57 mΩ.

[High Load Charge/Discharge Cycle Test]

The nonaqueous lithium power storage element was subjected to constant-current charge using a charge/discharge apparatus (5 V, 360 A) by Fujitsu Telecom Networks, Fukushima in a thermostatic bath set to 25° C., with a 200 C current value (160 A) until reaching 3.8 V, followed by constant-current discharge at the 200 C current value until reaching 2.2 V, as a charge/discharge procedure that was repeated 60,000 times without pause. Upon completion of the cycle, the internal resistance Rb was measured to be 0.63 mΩ, and Rb/Ra=1.11.

[High-Temperature Storage Test]

One of the remaining nonaqueous lithium power storage elements was subjected to constant-current charge using a charge/discharge apparatus (5 V, 360 A) by Fujitsu Telecom Networks, Ltd. in a thermostatic bath set to 25° C., with the 100 C current value (80 A) until reaching 4.0 V, and then constant-voltage charge was carried out with application of a constant voltage of 4.0 V for a total of 10 minutes. The cell was then stored in a 60° C. environment, and every 2 weeks it was removed out from the 60° C. environment, the cell voltage was charged to 4.0 V by the same charging procedure, and the cell was again stored in a 60° C. environment. This procedure was repeated for a period of 2 months, and the cell volume Va before start of the storage test and the volume Vb of the cell after two months of the storage test were measured by Archimedes' method in a 25° C. environment, using FLUORINERT™ (registered trademark of 3M Co. Japan) FC-40 as the measuring solvent. The value of B, as the gas generation volume determined by Vb−Va normalized by the electrostatic capacitance Fa, w as $1.51 \times 10^{-3}$ cc/F.

[Overcharge Test]

For one of the remaining nonaqueous lithium power storage elements, a thermocouple was attached to the negative electrode terminal, the positive electrode terminal and the center section of the casing, and in an explosion-proof thermostatic bath set to 25° C., using a power source by Takasago, Ltd. (ELZ-175), constant-current charge was conducted at the 20 C current value (16 A) until reaching 4.0 V, after which constant-voltage charge was carried out for 10 minutes with application of a constant voltage of 4.0 V. The set voltage was then changed to 8.0 V, and charging was continued for 3 minutes at the 20 C current value (16 A). The sampling time for voltage and temperature during this overcharge test was a 1 second interval. The maximum temperature reached at the negative electrode terminal during the overcharge test was 42° C., and the condition of the nonaqueous lithium power storage element after the overcharge test was "splitting".

[Calculation of $C_{x1}$, $C_{y1}$ and $C_{x2}$, $C_{y2}$]

The remaining nonaqueous lithium power storage element was adjusted to a voltage of 2.9 V and disassembled in an argon box at a dew point temperature of −72° C., and the two positive electrodes situated on the outermost layers of the electrode laminated body (corresponding to the positive electrode precursors 3 before lithium doping) were cut out to sizes of 10 cm×10 cm each. The obtained positive electrodes were immersed in 30 g of a diethyl carbonate solvent, and was washed for 10 minutes while occasionally moving the positive electrode with a pincette. Each positive electrode was then removed out and air-dried for 5 minutes in an argon box, and the positive electrode was immersed in 30 g of freshly prepared diethyl carbonate solvent and washed for 10 minutes by the same method as described above. Each washed positive electrode was removed from the argon box, and a vacuum dryer (DP33 by Yamato Scientific Co., Ltd.) was used for drying for 20 hours at a temperature of 25° C. and a pressure of 1 kPa, to obtain two positive electrode samples 2.

One of the obtained positive electrode samples 2 was immersed in 100 g of ethanol, and the vessel was capped and allowed to stand for 3 days in an environment at 25° C. The positive electrode sample was then removed out and vacuum dried for 10 hours under conditions of 120° C., 5 kPa. The ethanol solution after washing was measured by GC/MS under conditions with a predrawn calibration curve, and a diethyl carbonate abundance of less than 1% was confirmed. The positive electrode sample 2 was then cut out to sizes of 5 cm×10 cm, one as positive electrode $C_{x0}$ and the other as positive electrode $C_{y0}$, and the positive electrode active material layer on the $C_y$ side of the positive electrode $C_{x0}$ and the positive electrode active material layer on the $C_x$ side of the positive electrode $C_{y0}$ were removed using a spatula, brush, bristles or the like. After removal of the positive electrode active material layer, the weight $M_{0x}$ of the positive electrode $C_{x0}$ was 0.431 g and the weight $M_{0y}$ of the positive electrode $C_{y0}$ was 0.353 g. Next, positive electrode $C_{x0}$ and positive electrode $C_{y0}$ were each fully immersed in 100 g of distilled water, and the vessel was capped and allowed to stand for 3 days in an environment at 45° C. The positive electrodes were then removed out and vacuum dried for 12 hours under conditions of 150° C., 3 kPa. After vacuum drying, the weight $M_{1x}$ was 0.343 g and the weight $M_{1y}$ was 0.345 g. The distilled water after washing was measured by GC/MS under conditions with a predrawn calibration curve, and an ethanol abundance of less than 1% was confirmed. Next, a spatula, brush or bristles were used to remove off all of the positive electrode active material layer of positive electrode $C_{x0}$ and positive electrode $C_{y0}$, and the weights $M_{2x}$ and $M_{2y}$ of the positive electrode power collectors were measured to be 0.200 g each. The values obtained using formula (5) and formula (6) were $C_{x1}$=17.6 g/m$^2$, $C_{y1}$=1.6 g/m$^2$, $C_{x2}$=28.6 g/m$^2$ and $C_{y2}$=29.0 g/m$^2$. Based on the calculated $C_{x2}$ and $C_{y2}$, $C_{x2}/C_{y2}$=0.99.

[Microscopic Raman Spectroscopy]

Two small 1 cm×1 cm pieces were cut out from the remaining positive electrode sample 2 obtained above, while maintaining a state of non-exposure to air in an Ar box, and sample $S_x$ was prepared by removing the positive electrode active material layer on the $C_y$ side while sample $S_y$ was prepared by removing the positive electrode active material layer on the $C_x$ side, using a spatula, brush or bristles, as samples for microscopic Raman spectroscopy.

(Measurement)

Carbonate ion mapping was performed using an inVia Reflex Raman microscope by Renishaw Co. The excitation light laser wavelength was 532 nm, and focusing was to a power of approximately 0.7 mW at the sample position, using a long-working-distance 50× objective lens. Point scanning was performed at 1 μm intervals in a range of 90 μm in the thickness direction of the positive electrode cross-section and 30 μm in the direction perpendicular to the thickness direction, and a Raman spectrum was obtained for each measurement point. For the peaks due to carbonate ion observed at 1086 cm$^{-1}$ in the Raman spectrum, a straight baseline was drawn for 1071 cm$^{-1}$ to 1104 cm$^{-1}$, and the area appearing in the positive region from the baseline and the area appearing on the negative side of the baseline were each calculated as peak areas. The negative sign was assigned to the area appearing on the negative side of the baseline. This was traced as the space distribution for the carbonate ion peak area, and an imaging representation for carbonate ion was obtained.

(Calculation of Areas $S_x$ and $S_y$ in Carbonate Ion Mapping)

The areas $S_x$ and $S_y$ in carbonate ion mapping were calculated as follows. A straight line baseline was set at positions of 1071 and 1104 cm$^{-1}$ in the Raman spectra for 2700 points obtained at each measurement position on the front side of the sample $S_x$, setting the area at the portions higher than the baseline as positive and the areas of the lower portions as negative, to construct the mapping data area (a). Next, the region from the maximum value to the minimum value of the area (a) was divided into 100 zones to construct histogram 1, and the portion on the negative side from the area value giving the maximum frequency was fitted by the least square method using a Gaussian function, thereby approximating the noise component by a Gaussian function. The difference obtained by subtracting the fitted Gaussian function from the original histogram 1 was used as histogram 2 for the peak area of $CO_3^{2-}$. In histogram 2, the cumulative frequency greater than the area (b) giving the maximum frequency was determined to be 921, as the mapping frequency for $CO_3^{2-}$ ion. This was divided by the total frequency of 2700 to calculate the area $S_x$ of carbonate ion mapping, which was $S_x$=34.1%. Similarly, the area $S_y$ of carbonate ion mapping for the sample $S_y$ was calculated to be $S_y$=6.9%.

[Calculation of $C_{y3}$ and $A_{y3}$]

While maintaining a state of non-exposure to air in the Ar box, the remaining positive electrode sample 2 was cut to a size of 10 cm×5 cm, and a spatula, brush or bristles were used to remove the positive electrode active material layer on the $C_x$ side. The obtained positive electrode sample 2 was washed for 10 minutes with 30 g of a diethyl carbonate solvent, and was vacuum dried in a side box while maintaining a state of not being exposed to air. The dried positive electrode body was transferred from the side box to an Ar box while maintaining a state of non-exposure to air, and was immersed and extracted in heavy water to obtain a positive electrode body liquid extract. Analysis of the liquid extract was by ion chromatography (IC) and $^1$H-NMR, and the abundance $C_{y3}$ (mol/g) per unit weight of the positive electrode active material for each compound accumulated on the positive electrode body was determined by the following formula (7), from the concentration C (mol/ml) of each compound in the positive electrode body liquid extract, the volume D (ml) of heavy water used for extraction and the weight E (g) of active material of the positive electrode used for extraction.

$$C_{y3}=C \times D/E \quad (7)$$

The active material weight in the positive electrode active material layer used for extraction was determined by the following method.

The positive electrode active material layer was peeled off from the power collector of the positive electrode body remaining after heavy water extraction, using a spatula, brush or bristles, and the peeled off positive electrode active material layer was washed and then vacuum dried. The positive electrode active material layer obtained by vacuum drying was washed with NMP. Next, the obtained positive electrode active material layer was again vacuum dried, and weighed to determine the weight of the positive electrode active material layer used for extraction.

(¹H-NMR Measurement)

The positive electrode body liquid extract was placed in a 3 mmφ NMR tube (PN-002 by Shigemi Corp.) and inserted into a 5 mmφ NMR tube (N-5 by Nihon Seimitsu Kagaku Co., Ltd.) containing 1,2,4,5-tetrafluorobenzene-added deuterated chloroform, and ¹H NMR measurement was performed by the double tube method. The integral of each observed compound was calculated by normalization based on the 7.1 ppm (m, 2H) signal of 1,2,4,5-tetrafluorobenzene.

Deuterated chloroform containing dimethyl sulfoxide at known concentration was placed in a 3 mmφ NMR tube (PN-002 by Shigemi Corp.) and inserted into a 5 mmφ NMR tube (N-5 by Nihon Seimitsu Kagaku Co., Ltd.) containing the same 1,2,4,5-tetrafluorobenzene-added deuterated chloroform as above, and ¹H NMR measurement was performed by the double tube method. In the same manner as above, and the integral of the 2.6 ppm (s, 6H) signal of dimethyl sulfoxide was calculated by normalization based on the 7.1 ppm (m, 2H) signal of 1,2,4,5-tetrafluorobenzene. The concentration C of each compound in the positive electrode body liquid extract was determined based on the relationship between the dimethyl sulfoxide concentration used and the integral.

Assignment for the ¹H NMR spectrum was as follows.
(For $LiOCH_2CH_2OLi$)
$CH_2$ in $LiOCH_2CH_2OLi$: 3.7 ppm (s, 4H)
$CH_3OLi$: 3.3 ppm (s, 3H)
$CH_3$ in $CH_3CH_2OLi$: 1.2 ppm (t, 3H)
$CH_2O$ in $CH_3CH_2OLi$: 3.7 ppm (q, 2H)

Since the signal for $CH_2$ in $LiOCH_2CH_2OLi$ (3.7 ppm) thus overlaps the signal for $CH_2O$ in $CH_3CH_2OLi$ (3.7 ppm), the amount of $LiOCH_2CH_2OLi$ was calculated without the portion corresponding to $CH_2O$ in $CH_3CH_2OLi$, calculated from the signal for $CH_3$ in $CH_3CH_2OLi$ (1.2 ppm).

From the concentration of each compound in the extract as determined by the analysis described above, as well as the volume of heavy water used for extraction and the active material weight of the positive electrode used for extraction, the concentration $C_{y3}$ of $LiOCH_2CH_2OLi$ on the $C_y$ side was determined to be $89.9 \times 10^{-4}$ mol/g.

Using the same method, the concentration $A_{y3}$ of $LiOCH_2CH_2OLi$ in the negative electrode active material layer facing the $C_y$ side was determined to be $48.3 \times 10^{-4}$ mol/g.

Example 32

A nonaqueous lithium power storage element was fabricated by the same method as Example 31, except that for initial charging of the nonaqueous lithium power storage element in the lithium doping procedure, constant-current charge was carried out at a current value of 100 mA until reaching a voltage of 4.5 V, and then constant-voltage charge was carried out at 4.5 V continuously for 36 hours, for lithium doping at the negative electrode.

Example 33

A nonaqueous lithium power storage element was fabricated by the same method as Example 31, except that for initial charging of the nonaqueous lithium power storage element in the lithium doping procedure, constant-current charge was carried out at a current value of 100 mA until reaching a voltage of 4.5 V, and then constant-voltage charge was carried out at 4.5 V continuously for 12 hours, for lithium doping at the negative electrode.

Example 34

A nonaqueous lithium power storage element was fabricated by the same method as Example 31, except that for initial charging of the nonaqueous lithium power storage element in the lithium doping procedure, constant-current charge was carried out at a current value of 100 mA until reaching a voltage of 4.6 V, and then constant-voltage charge was carried out at 4.6 V continuously for 72 hours, for lithium doping at the negative electrode.

Example 35

A nonaqueous lithium power storage element was fabricated by the same method as Example 34, except that for initial charging of the nonaqueous lithium power storage element in the lithium doping procedure, constant-current charge was carried out at a current value of 100 mA until reaching a voltage of 4.6 V, and then constant-voltage charge was carried out at 4.6 V continuously for 36 hours, for lithium doping at the negative electrode.

Example 36

A nonaqueous lithium power storage element was fabricated by the same method as Example 34, except that for initial charging of the nonaqueous lithium power storage element in the lithium doping procedure, constant-current charge was carried out at a current value of 100 mA until reaching a voltage of 4.6 V, and then constant-voltage charge was carried out at 4.6 V continuously for 12 hours, for lithium doping at the negative electrode.

Example 37

A nonaqueous lithium power storage element was fabricated by the same method as Example 31, except that for initial charging of the nonaqueous lithium power storage element in the lithium doping procedure, constant-current charge was carried out at a current value of 100 mA until reaching a voltage of 4.3 V, and then constant-voltage charge was carried out at 4.3 V continuously for 72 hours, for lithium doping at the negative electrode.

Example 38

A nonaqueous lithium power storage element was fabricated by the same method as Example 37, except that for initial charging of the nonaqueous lithium power storage element in the lithium doping procedure, constant-current charge was carried out at a current value of 100 mA until reaching a voltage of 4.3 V, and then constant-voltage charge was carried out at 4.3 V continuously for 36 hours, for lithium doping at the negative electrode.

Example 39

A nonaqueous lithium power storage element was fabricated by the same method as Example 37, except that for initial charging of the nonaqueous lithium power storage element in the lithium doping procedure, constant-current charge was carried out at a current value of 100 mA until reaching a voltage of 4.3 V, and then constant-voltage charge was carried out at 4.3 V continuously for 12 hours, for lithium doping at the negative electrode.

Example 40

Coating solution 3 was obtained by the same method as in Example 31, except for using 47.2 parts by weight of activated carbon $2_{a2}$, 42.0 parts by weight of lithium carbonate having a mean particle diameter of 2.5 μm, 2.5 parts by weight of Ketchen black, 1.3 parts by weight of PVP (polyvinylpyrrolidone) and 7.0 parts by weight of PVdF (polyvinylidene fluoride). A nonaqueous lithium power storage element was fabricated by the same method as Example 31, except that coating solution 1 was coated onto one side of an aluminum foil with a thickness of 15 μm and coating solution 3 was coated onto the other side, to fabricate positive electrode precursor 5, and positive electrode precursor 5 was used instead of positive electrode precursor 3.

Example 41

A nonaqueous lithium power storage element was fabricated by the same method as Example 40, except that for initial charging of the nonaqueous lithium power storage element in the lithium doping procedure, constant-current charge was carried out at a current value of 100 mA until reaching a voltage of 4.5 V, and then constant-voltage charge was carried out at 4.5 V continuously for 36 hours, for lithium doping at the negative electrode.

Example 42

A nonaqueous lithium power storage element was fabricated by the same method as Example 40, except that for initial charging of the nonaqueous lithium power storage element in the lithium doping procedure, constant-current charge was carried out at a current value of 100 mA until reaching a voltage of 4.5 V, and then constant-voltage charge was carried out at 4.5 V continuously for 12 hours, for lithium doping at the negative electrode.

Example 43

Coating solution 4 was obtained by the same method as in Example 31, except for using 68.0 parts by weight of activated carbon $2_{a2}$, 15.0 parts by weight of lithium carbonate having a mean particle diameter of 2.5 μm, 5.2 parts by weight of Ketchen black, 2.8 parts by weight of PVP (polyvinylpyrrolidone) and 9.0 parts by weight of PVdF (polyvinylidene fluoride). A nonaqueous lithium power storage element was fabricated by the same method as Example 31, except that coating solution 1 was coated onto one side of an aluminum foil with a thickness of 15 μm and coating solution 4 was coated onto the other side, to fabricate positive electrode precursor 6, and positive electrode precursor 6 was used instead of positive electrode precursor 3.

Example 44

A nonaqueous lithium power storage element was fabricated by the same method as Example 43, except that for initial charging of the nonaqueous lithium power storage element in the lithium doping procedure, constant-current charge was carried out at a current value of 100 mA until reaching a voltage of 4.5 V, and then constant-voltage charge was carried out at 4.5 V continuously for 36 hours, for lithium doping at the negative electrode.

Example 45

A nonaqueous lithium power storage element was fabricated by the same method as Example 43, except that for initial charging of the nonaqueous lithium power storage element in the lithium doping procedure, constant-current charge was carried out at a current value of 100 mA until reaching a voltage of 4.5 V, and then constant-voltage charge was carried out at 4.5 V continuously for 12 hours, for lithium doping at the negative electrode.

Example 46

Coating solution 5 was obtained by the same method as in Example 31, except for using 73.0 parts by weight of activated carbon $2_{a2}$, 10.0 parts by weight of lithium carbonate having a mean particle diameter of 2.5 μm, 5.2 parts by weight of Ketchen black, 2.8 parts by weight of PVP (polyvinylpyrrolidone) and 9.0 parts by weight of PVdF (polyvinylidene fluoride). A nonaqueous lithium power storage element was fabricated by the same method as Example 31, except that coating solution 1 was coated onto one side of an aluminum foil with a thickness of 15 μm and coating solution 5 was coated onto the other side, to fabricate positive electrode precursor 7, and positive electrode precursor 7 was used instead of positive electrode precursor 3.

Example 47

A nonaqueous lithium power storage element was fabricated by the same method as Example 46, except that for initial charging of the nonaqueous lithium power storage element in the lithium doping procedure, constant-current charge was carried out at a current value of 100 mA until reaching a voltage of 4.5 V, and then constant-voltage charge was carried out at 4.5 V continuously for 36 hours, for lithium doping at the negative electrode.

Example 48

A nonaqueous lithium power storage element was fabricated by the same method as Example 46, except that for initial charging of the nonaqueous lithium power storage element in the lithium doping procedure, constant-current charge was carried out at a current value of 100 mA until reaching a voltage of 4.5 V, and then constant-voltage charge was carried out at 4.5 V continuously for 24 hours, for lithium doping at the negative electrode.

Comparative Example 27

Coating solution 6 was obtained by the same method as in Example 31, except for using 78.0 parts by weight of activated carbon $2_{a2}$, 3.0 parts by weight of lithium carbonate having a mean particle diameter of 2.5 μm, 7.0 parts by weight of Ketchen black, 3.0 parts by weight of PVP (polyvinylpyrrolidone) and 9.0 parts by weight of PVdF (polyvinylidene fluoride). A nonaqueous lithium power storage element was fabricated by the same method as Example 31, except that coating solution 1 was coated onto one side of an aluminum foil with a thickness of 15 μm and coating solution 6 was coated onto the other side, to fabricate positive electrode precursor 8, and positive electrode precursor 8 was used instead of positive electrode precursor 3.

Comparative Example 28

A nonaqueous lithium power storage element was fabricated by the same method as Comparative Example 27, except that for initial charging of the nonaqueous lithium power storage element in the lithium doping procedure, constant-current charge was carried out at a current value of 100 mA until reaching a voltage of 4.5 V, and then constant-voltage charge was carried out at 4.5 V continuously for 36 hours, for lithium doping at the negative electrode.

Comparative Example 29

A nonaqueous lithium power storage element was fabricated by the same method as
Comparative Example 27, except that for initial charging of the nonaqueous lithium power storage element in the lithium doping procedure, constant-current charge was carried out at a current value of 100 mA until reaching a voltage of 4.5 V, and then constant-voltage charge was carried out at 4.5 V continuously for 12 hours, for lithium doping at the negative electrode.

Comparative Example 30

Coating solution 7 was obtained by the same method as in Example 31, except for using 81.0 parts by weight of activated carbon $2_{a2}$, 7.0 parts by weight of Ketchen black, 3.0 parts by weight of PVP (polyvinylpyrrolidone) and 9.0 parts by weight of PVdF (polyvinylidene fluoride). A nonaqueous lithium power storage element was fabricated by the same method as Example 31, except that coating solution 1 was coated onto one side of an aluminum foil with a thickness of 15 μm and coating solution 7 was coated onto the other side, to fabricate positive electrode precursor 9, and positive electrode precursor 9 was used instead of positive electrode precursor 3.

Comparative Example 31

A nonaqueous lithium power storage element was fabricated by the same method as Comparative Example 30, except that for initial charging of the nonaqueous lithium power storage element in the lithium doping procedure, constant-current charge was carried out at a current value of 100 mA until reaching a voltage of 4.5 V, and then constant-voltage charge was carried out at 4.5 V continuously for 36 hours, for lithium doping at the negative electrode.

Comparative Example 32

A nonaqueous lithium power storage element was fabricated by the same method as Comparative Example 30, except that for initial charging of the nonaqueous lithium power storage element in the lithium doping procedure, constant-current charge was carried out at a current value of 100 mA until reaching a voltage of 4.5 V, and then constant-voltage charge was carried out at 4.5 V continuously for 12 hours, for lithium doping at the negative electrode.

Comparative Example 33

Coating solution 8 was obtained by the same method as in Example 31, except for using 35.0 parts by weight of activated carbon $2_{a2}$, 53.0 parts by weight of lithium carbonate having a mean particle diameter of 2.5 μm, 2.0 parts by weight of Ketchen black, 1.5 parts by weight of PVP (polyvinylpyrrolidone) and 8.5 parts by weight of PVdF (polyvinylidene fluoride). A nonaqueous lithium power storage element was fabricated by the same method as Example 31, except that coating solution 1 was coated onto one side of an aluminum foil with a thickness of 15 μm and coating solution 8 was coated onto the other side, to fabricate positive electrode precursor 10, and positive electrode precursor 10 was used instead of positive electrode precursor 3.

Comparative Example 34

A nonaqueous lithium power storage element was fabricated by the same method as Comparative Example 33, except that for initial charging of the nonaqueous lithium power storage element in the lithium doping procedure, constant-current charge was carried out at a current value of 100 mA until reaching a voltage of 4.5 V, and then constant-voltage charge was carried out at 4.5 V continuously for 36 hours, for lithium doping at the negative electrode.

Comparative Example 35

A nonaqueous lithium power storage element was fabricated by the same method as Comparative Example 33, except that for initial charging of the nonaqueous lithium power storage element in the lithium doping procedure, constant-current charge was carried out at a current value of 100 mA until reaching a voltage of 4.5 V, and then constant-voltage charge was carried out at 4.5 V continuously for 12 hours, for lithium doping at the negative electrode.

Comparative Example 36

A nonaqueous lithium power storage element was fabricated by the same method as Comparative Example 27, except that for initial charging of the nonaqueous lithium power storage element in the lithium doping procedure, constant-current charge was carried out at a current value of 100 mA until reaching a voltage of 4.1 V, and then constant-voltage charge was carried out at 4.1 V continuously for 72 hours, for lithium doping at the negative electrode.

Comparative Example 37

A nonaqueous lithium power storage element was fabricated by the same method as Comparative Example 27, except that for initial charging of the nonaqueous lithium power storage element in the lithium doping procedure, constant-current charge was carried out at a current value of 100 mA until reaching a voltage of 4.1 V, and then constant-voltage charge was carried out at 4.1 V continuously for 36 hours, for lithium doping at the negative electrode.

Comparative Example 38

A nonaqueous lithium power storage element was fabricated by the same method as Comparative Example 27, except that for initial charging of the nonaqueous lithium power storage element in the lithium doping procedure, constant-current charge was carried out at a current value of 100 mA until reaching a voltage of 4.1 V, and then constant-voltage charge was carried out at 4.1 V continuously for 12 hours, for lithium doping at the negative electrode.

Comparative Example 39

A nonaqueous lithium power storage element was fabricated by the same method as Comparative Example 33, except that for initial charging of the nonaqueous lithium power storage element in the lithium doping procedure, constant-current charge was carried out at a current value of 100 mA until reaching a voltage of 4.1 V, and then constant-voltage charge was carried out at 4.1 V continuously for 72 hours, for lithium doping at the negative electrode.

Comparative Example 40

A nonaqueous lithium power storage element was fabricated by the same method as Comparative Example 33, except that for initial charging of the nonaqueous lithium power storage element in the lithium doping procedure, constant-current charge was carried out at a current value of 100 mA until reaching a voltage of 4.1 V, and then constant-voltage charge was carried out at 4.1 V continuously for 36 hours, for lithium doping at the negative electrode.

Comparative Example 41

A nonaqueous lithium power storage element was fabricated by the same method as Comparative Example 33, except that for initial charging of the nonaqueous lithium power storage element in the lithium doping procedure, constant-current charge was carried out at a current value of 100 mA until reaching a voltage of 4.1 V, and then constant-voltage charge was carried out at 4.1 V continuously for 12 hours, for lithium doping at the negative electrode.

Comparative Example 42

A nonaqueous lithium power storage element was fabricated by the same method as Comparative Example 33, except that for initial charging of the nonaqueous lithium power storage element in the lithium doping procedure, constant-current charge was carried out at a current value of 100 mA until reaching a voltage of 5.0 V, and then constant-voltage charge was carried out at 5.0 V continuously for 72 hours, for lithium doping at the negative electrode.

Comparative Example 43

A nonaqueous lithium power storage element was fabricated by the same method as Comparative Example 33, except that for initial charging of the nonaqueous lithium power storage element in the lithium doping procedure, constant-current charge was carried out at a current value of 100 mA until reaching a voltage of 5.0 V, and then constant-voltage charge was carried out at 5.0 V continuously for 36 hours, for lithium doping at the negative electrode.

Comparative Example 44

A nonaqueous lithium power storage element was fabricated by the same method as Comparative Example 33, except that for initial charging of the nonaqueous lithium power storage element in the lithium doping procedure, constant-current charge was carried out at a current value of 100 mA until reaching a voltage of 5.0 V, and then constant-voltage charge was carried out at 5.0 V continuously for 12 hours, for lithium doping at the negative electrode.

The evaluation results for the nonaqueous lithium power storage elements of Examples 31 to 48 and Comparative Examples 27 to 44 are shown in Table 3.

TABLE 3

| | $C_{x1}$ (g/m²) | $C_{y1}$ (g/m²) | $C_{x2}$ (g/m²) | $C_{y2}$ (g/m²) | $C_{x2}/C_{y2}$ | Microscopic Raman spectroscopy $S_x$ (%) | $S_y$ (%) | $C_{y3}$ (10⁻⁴ mol/g) | $A_{y3}$ (10⁻⁴ mol/g) | $C_{y3}/A_{y3}$ | Initial properties Fa (F) | Ra (mΩ) | High-load Charge/discharge cycle test Rb (mΩ) | Rb/Ra | High-temperature storage test B (10⁻³ °C/F) | Overcharge test Maximum temperature (°C) | Condition |
|---|---|---|---|---|---|---|---|---|---|---|---|---|---|---|---|---|---|
| Example 31 | 17.6 | 1.6 | 28.6 | 29.0 | 0.99 | 34.1 | 6.9 | 89.9 | 48.3 | 1.9 | 1763 | 0.57 | 0.63 | 1.11 | 1.51 | 42 | Splitting |
| Example 32 | 17.7 | 4.8 | 28.4 | 28.9 | 0.98 | 33.4 | 10.3 | 45.0 | 40.3 | 1.1 | 1727 | 0.55 | 0.61 | 1.11 | 2.43 | 40 | Splitting |
| Example 33 | 17.4 | 8.3 | 29.1 | 27.9 | 1.04 | 34.6 | 19.3 | 21.3 | 35.5 | 0.6 | 1790 | 0.60 | 0.65 | 1.08 | 2.76 | 45 | Splitting |
| Example 34 | 17.8 | 0.2 | 28.6 | 28.9 | 0.99 | 32.5 | 2.6 | 273.0 | 41.0 | 6.7 | 1830 | 0.59 | 0.67 | 1.14 | 1.32 | 43 | Splitting |
| Example 35 | 17.6 | 2.5 | 28.8 | 29.0 | 0.99 | 35.6 | 7.4 | 213.0 | 21.8 | 9.8 | 1796 | 0.55 | 0.62 | 1.13 | 1.76 | 40 | Splitting |
| Example 36 | 17.8 | 5.3 | 28.9 | 28.7 | 1.01 | 34.1 | 13.2 | 143.0 | 7.8 | 18.3 | 1798 | 0.58 | 0.64 | 1.10 | 1.97 | 44 | Splitting |
| Example 37 | 17.5 | 4.2 | 29.0 | 28.6 | 1.01 | 36.3 | 10.3 | 32.5 | 39.7 | 0.8 | 1783 | 0.59 | 0.65 | 1.10 | 2.43 | 45 | Splitting |
| Example 38 | 17.9 | 8.9 | 28.6 | 29.2 | 0.98 | 31.4 | 22.5 | 10.2 | 20.2 | 0.5 | 1710 | 0.56 | 0.61 | 1.09 | 2.98 | 40 | Splitting |
| Example 39 | 17.7 | 14.0 | 28.4 | 28.6 | 0.99 | 32.5 | 31.0 | 2.5 | 10.4 | 0.2 | 1706 | 0.58 | 0.63 | 1.09 | 3.24 | 41 | Splitting |
| Example 40 | 23.5 | 0.8 | 25.4 | 28.4 | 0.89 | 46.8 | 7.3 | 90.3 | 38.3 | 2.4 | 1816 | 0.59 | 0.65 | 1.10 | 1.63 | 44 | Splitting |
| Example 41 | 24.3 | 4.9 | 25.2 | 28.9 | 0.87 | 47.2 | 11.3 | 42.0 | 36.8 | 1.1 | 1745 | 0.56 | 0.62 | 1.11 | 1.87 | 41 | Splitting |
| Example 42 | 24.2 | 8.0 | 25.3 | 28.7 | 0.88 | 46.1 | 20.4 | 17.9 | 36.0 | 0.5 | 1834 | 0.58 | 0.64 | 1.10 | 2.08 | 43 | Splitting |
| Example 43 | 9.3 | 2.1 | 32.3 | 28.9 | 1.12 | 16.9 | 5.5 | 80.9 | 40.2 | 2.0 | 1780 | 0.57 | 0.63 | 1.11 | 1.58 | 43 | Splitting |
| Example 44 | 9.8 | 4.9 | 31.0 | 27.6 | 1.12 | 15.9 | 9.8 | 38.0 | 38.9 | 1.0 | 1733 | 0.55 | 0.61 | 1.11 | 1.87 | 41 | Splitting |
| Example 45 | 9.5 | 8.0 | 31.7 | 28.0 | 1.13 | 17.0 | 14.5 | 16.5 | 39.3 | 0.4 | 1816 | 0.58 | 0.64 | 1.10 | 1.76 | 43 | Splitting |
| Example 46 | 5.7 | 1.5 | 29.6 | 27.8 | 1.06 | 12.1 | 4.5 | 79.5 | 50.3 | 1.6 | 1762 | 0.58 | 0.64 | 1.10 | 1.78 | 43 | Splitting |
| Example 47 | 5.8 | 3.7 | 29.6 | 28.1 | 1.05 | 11.0 | 8.3 | 40.1 | 37.9 | 1.1 | 1780 | 0.56 | 0.62 | 1.11 | 1.65 | 43 | Splitting |
| Example 48 | 6.4 | 6.0 | 29.3 | 27.8 | 1.05 | 11.3 | 10.3 | 12.1 | 28.7 | 0.4 | 1853 | 0.59 | 0.65 | 1.10 | 1.96 | 44 | Splitting |
| Comp. Example 27 | 2.1 | 2.3 | 27.8 | 27.4 | 1.01 | 5.8 | 6.6 | 89.0 | 47.5 | 1.9 | 1711 | 0.56 | 0.62 | 1.11 | 2.32 | 84 | Rupture |
| Comp. Example 28 | 2.4 | 4.5 | 28.2 | 27.8 | 1.01 | 7.8 | 9.5 | 47.4 | 39.4 | 1.2 | 1693 | 0.56 | 0.62 | 1.11 | 2.65 | 85 | Rupture |
| Comp. Example 29 | 2.3 | 9.3 | 28.6 | 28.0 | 1.02 | 6.0 | 18.8 | 24.3 | 34.1 | 0.7 | 1690 | 0.60 | 0.67 | 1.12 | 2.70 | 88 | Rupture |
| Comp. Example 30 | 0.0 | 2.0 | 28.9 | 28.3 | 1.02 | 0.0 | 6.7 | 80.3 | 50.3 | 1.6 | 1798 | 0.58 | 0.64 | 1.10 | 2.43 | 132 | Rupture |
| Comp. Example 31 | 0.0 | 4.9 | 28.6 | 27.9 | 1.03 | 0.0 | 10.2 | 44.0 | 40.3 | 1.1 | 1780 | 0.57 | 0.63 | 1.11 | 2.80 | 128 | Rupture |
| Comp. Example 32 | 0.0 | 8.8 | 29.7 | 27.6 | 1.08 | 0.0 | 18.8 | 20.6 | 37.8 | 0.5 | 1727 | 0.59 | 0.63 | 1.11 | 2.15 | 120 | Rupture |
| Comp. Example 33 | 28.7 | 2.2 | 25.4 | 28.4 | 0.89 | 57.4 | 7.4 | 80.9 | 48.8 | 1.7 | 1653 | 0.59 | 0.66 | 1.12 | 2.76 | 65 | Splitting |
| Comp. Example 34 | 29.3 | 5.3 | 25.8 | 27.9 | 0.92 | 55.4 | 11.2 | 47.0 | 40.8 | 1.2 | 1677 | 0.55 | 0.61 | 1.11 | 2.56 | 66 | Splitting |
| Comp. Example 35 | 28.9 | 9.0 | 25.4 | 28.6 | 0.89 | 55.0 | 18.4 | 24.3 | 34.6 | 0.7 | 1594 | 0.53 | 0.58 | 1.09 | 2.89 | 60 | Splitting |
| Comp. Example 36 | 2.1 | 17.8 | 28.3 | 27.6 | 1.03 | 5.8 | 7.3 | 5.8 | 47.9 | 0.12 | 1201 | 0.78 | 1.06 | 1.36 | 3.76 | 87 | Rupture |
| Comp. Example 37 | 2.0 | 18.9 | 27.8 | 27.9 | 1.00 | 7.6 | 10.3 | 1.0 | 40.4 | 0.02 | 1102 | 0.83 | 1.28 | 1.54 | 5.45 | 89 | Rupture |
| Comp. Example 38 | 2.3 | 21.2 | 27.9 | 28.0 | 1.00 | 6.9 | 16.7 | 0.3 | 37.7 | 0.01 | 1038 | 0.98 | 1.48 | 1.51 | 7.54 | 84 | Rupture |
| Comp. Example 39 | 28.1 | 17.1 | 25.6 | 28.4 | 0.90 | 53.4 | 7.4 | 4.7 | 47.0 | 0.10 | 1242 | 0.76 | 1.05 | 1.38 | 3.66 | 62 | Splitting |
| Comp. Example 40 | 28.9 | 18.8 | 25.8 | 27.6 | 0.93 | 55.4 | 10.4 | 1.1 | 40.9 | 0.03 | 1089 | 0.85 | 1.30 | 1.53 | 5.61 | 65 | Splitting |
| Comp. Example 41 | 29.3 | 22.2 | 26.0 | 27.5 | 0.95 | 56.0 | 16.8 | 0.4 | 37.1 | 0.01 | 1002 | 1.01 | 1.51 | 1.50 | 7.10 | 68 | Splitting |
| Comp. Example 42 | 27.6 | 0.02 | 25.1 | 27.3 | 0.92 | 53.5 | 0.3 | 332.0 | 52.1 | 6.4 | 1652 | 0.84 | 1.45 | 1.73 | 3.89 | 57 | Splitting |
| Comp. Example 43 | 27.8 | 0.05 | 25.6 | 27.8 | 0.92 | 54.6 | 0.6 | 376.0 | 45.0 | 8.4 | 1675 | 0.91 | 1.68 | 1.85 | 4.54 | 60 | Splitting |
| Comp. Example 44 | 27.3 | 0.08 | 25.3 | 28.1 | 0.90 | 53.7 | 0.8 | 422.0 | 37.0 | 11.4 | 1630 | 0.99 | 1.98 | 2.00 | 5.11 | 63 | Splitting |

Example 49

<Production of Positive Electrode Precursor>

Coating solution 9 was obtained by the same method as in Example 1, except for using 50.5 parts by weight of activated carbon $1_{a2}$, 38.0 parts by weight of lithium carbonate having a mean particle diameter of 2.5 µm, 2.7 parts by weight of Ketchen black, 1.4 parts by weight of PVP (polyvinylpyrrolidone) and 7.4 parts by weight of PVdF (polyvinylidene fluoride).

Coating solution 10 was obtained by the same method as above, except for mixing 45.5 parts by weight of activated carbon $1_{a2}$, 45.0 parts by weight of lithium carbonate having a mean particle diameter of 2.5 µm, 3.0 parts by weight of Ketchen black, 1.5 parts by weight of PVP (polyvinylpyrrolidone), 5.0 parts by weight of PVdF (polyvinylidene fluoride), and NMP (N-methylpyrrolidone).

The viscosity (ηb) and TI value of coating solution 9 and coating solution 10 were measured using a TVE-35H E-type viscometer by Toki Sangyo Co., Ltd., and as a result the viscosity (ηb) of coating solution 9 was 2,350 mPa·s and the TI value was 3.9, and the viscosity (ηb) of coating solution 10 was 2,120 mPa·s and the TI value was 3.7.

Also, the degree of dispersion of the obtained coating solution was measured using a fineness gauge by Yoshimitsu Seiki Co., and as a result the granularity of coating solution 9 was 34 µm and the granularity of coating solution 10 was 32 µm.

Coating solution 9 was coated onto one side of an aluminum foil with a thickness of 15 µm and coating solution 10 was coated onto the other side, using a die coater by Toray Engineering Co., Ltd. under conditions with a coating speed of 1 m/s, and they were dried at a drying temperature of 120° C. to obtain positive electrode precursor 11.

Next, coating solution 9 was coated onto both sides of an aluminum foil with a thickness of 15 µm by the same method as above, to obtain positive electrode precursor 12.

The obtained positive electrode precursor 11 and positive electrode precursor 12 were pressed using a roll press under conditions with a pressure of 6 kN/cm and a pressed portion surface temperature of 25° C. The total thicknesses of the pressed positive electrode precursor 11 and positive electrode precursor 12 were measured at 10 arbitrary locations of positive electrode precursor 11 and positive electrode precursor 12 using a Linear Gauge Sensor GS-551. by Ono Sokki Co., Ltd. The thickness of the aluminum foil was subtracted from the mean values for the measured total thicknesses, and as a result of determining the film thickness of the positive electrode active material layer of positive electrode precursor 12, the film thickness of the positive electrode active material layer (the film thickness of the coated coating solution 9) was 52 µm on each side, while the film thickness of the positive electrode active material layer of positive electrode precursor 11 coated with coating solution 10 was 53 µm on each side.

<Production of Negative Electrode>

Composite porous carbon material 1a fabricated in Example 15 was used as a negative electrode active material to produce a negative electrode.

After mixing 84 parts by weight of composite porous carbon material 1a, 10 parts by weight of acetylene black, 6 parts by weight of PVdF (polyvinylidene fluoride) and NMP (N-methylpyrrolidone), the mixture was dispersed using a FILMIX® thin-film spinning high-speed mixer by Primix Corp., under conditions with a circumferential speed of 17 m/s, to obtain a coating solution.

The viscosity (ηb) and TI value of the obtained coating solution were measured using a TVE-35H E-type viscometer by Toki Sangyo Co., Ltd., and as a result the viscosity (ηb) was 2,789 mPa·s and the TI value was 4.3.

The coating solution was coated onto both sides of an electrolytic copper foil with a thickness of 10 µm using a die coater by Toray Engineering Co., Ltd. under conditions with a coating speed of 2 m/s, and dried at a drying temperature of 120° C. to obtain negative electrode 4. The obtained negative electrode 4 was pressed using a roll press under conditions with a pressure of 5 kN/cm and a pressed portion surface temperature of 25° C.

The total thickness of the pressed negative electrode 4 was measured at 10 arbitrary locations of negative electrode 4, using a Linear Gauge Sensor GS-551 by Ono Sokki Co., Ltd. The total thickness of the copper foil was subtracted from the mean value of the measured film thickness, to determine the film thickness of the negative electrode active material layer of negative electrode 4. As a result, the film thickness of the negative electrode active material layers was 40 µm per side.

[Measurement of Capacitance Per Unit Weight of Negative Electrode]

One piece of the obtained negative electrode 4 was cut out to a size of 1.4 cm×2.0 cm (2.8 cm²), and the negative electrode active material layer coated onto both sides of the copper foil was removed on one side using a spatula, brush or bristles to obtain a working electrode. Metal lithium was used as the counter electrode and reference electrode, to fabricate an electrochemical cell in an argon box, using a nonaqueous solution of $LiPF_6$ dissolved to a concentration of 1.0 mol/L in a mixed solvent of ethylene carbonate (EC) and ethylmethyl carbonate (EMC) at a volume ratio of 1:1, as the electrolytic solution.

The initial charging capacitance of the obtained electrochemical cell was measured by the following procedure using a charge/discharge apparatus (TOSCAT-3100U) by Toyo System Co., Ltd.

The electrochemical cell was subjected to constant-current charge at a temperature of 25° C., with a current value of 0.5 mA/cm² until reaching a voltage value of 0.01 V, and then to constant-voltage charge until the current value reached 0.01 mA/cm². When the charge capacity during constant-current charge and constant-voltage charge was evaluated as the initial charge capacity, it was found to be 1.6 mAh, and the capacitance per unit weight of negative electrode 4 (lithium ion doping amount) was 1460 mAh/g.

<Fabrication of Nonaqueous Lithium Power Storage Element>

The obtained positive electrode precursor 11 and positive electrode precursor 12 were cut into two positive electrode precursors 11 and 19 positive electrode precursors 12, with the positive electrode active material layers at sizes of 10.0 cm×10.0 cm (100 cm²). Twenty negative electrodes 4 were then cut out, with the negative electrode active material layers at sizes of 10.1 cm×10.1 cm (102 cm²). Also, 40 10.3 cm×10.3 cm (106 cm²) polyethylene separators (by Asahi Kasei Corp., thickness: 10 µm) were prepared. These were situated with the positive electrode precursors 11 as the outermost layers, and the outermost layers being situated so that the positive electrode active material layer coated with coating solution 10 was not facing the negative electrode, and lamination was performed in the order: positive electrode precursor 11, separator, negative electrode 4, separator, positive electrode precursor 12, with the positive electrode active material layers and negative electrode active material layers laminated facing each other across the separators, to obtain an electrode laminated body. A nonaqueous lithium power storage element was then fabricated by the same method as Example 31.

Example 50

A nonaqueous lithium power storage element was fabricated by the same method as Example 49, except that for initial charging of the nonaqueous lithium power storage element in the lithium doping procedure, constant-current charge was carried out at a current value of 100 mA until reaching a voltage of 4.5 V, and then constant-voltage charge was carried out at 4.5 V continuously for 36 hours, for lithium doping at the negative electrode.

Example 51

A nonaqueous lithium power storage element was fabricated by the same method as Example 49, except that for initial charging of the nonaqueous lithium power storage element in the lithium doping procedure, constant-current charge was carried out at a current value of 100 mA until reaching a voltage of 4.5 V, and then constant-voltage charge was carried out at 4.5 V continuously for 12 hours, for lithium doping at the negative electrode.

Example 52

A nonaqueous lithium power storage element was fabricated by the same method as Example 49, except for using lithium oxide instead of lithium carbonate.

Example 53

A nonaqueous lithium power storage element was fabricated by the same method as Example 49, except for using lithium hydroxide instead of lithium carbonate.

Comparative Example 45

A nonaqueous lithium power storage element was fabricated by the same method as Example 49, except that for initial charging of the nonaqueous lithium power storage element in the lithium doping procedure, constant-current charge was carried out at a current value of 100 mA until reaching a voltage of 4.1 V, and then constant-voltage charge was carried out at 4.1 V continuously for 72 hours, for lithium doping at the negative electrode.

Comparative Example 46

A nonaqueous lithium power storage element was fabricated by the same method as Example 49, except that for initial charging of the nonaqueous lithium power storage element in the lithium doping procedure, constant-current charge was carried out at a current value of 100 mA until reaching a voltage of 4.1 V, and then constant-voltage charge was carried out at 4.1 V continuously for 36 hours, for lithium doping at the negative electrode.

Comparative Example 47

A nonaqueous lithium power storage element was fabricated by the same method as Example 49, except that for initial charging of the nonaqueous lithium power storage element in the lithium doping procedure, constant-current charge was carried out at a current value of 100 mA until reaching a voltage of 4.1 V, and then constant-voltage charge was carried out at 4.1 V continuously for 12 hours, for lithium doping at the negative electrode.

Comparative Example 48

Coating solution 11 was obtained by the same method as in Example 49, except for using 81.0 parts by weight of activated carbon $1_{a2}$, 7.0 parts by weight of Ketchen black, 3.0 parts by weight of PVP (polyvinylpyrrolidone) and 9.0 parts by weight of PVdF (polyvinylidene fluoride). A nonaqueous lithium power storage element was fabricated by the same method as Example 49, except that coating solution 9 was coated onto one side of an aluminum foil with a thickness of 15 μm and coating solution 11 was coated onto the other side, to fabricate positive electrode precursor 13, and positive electrode precursor 13 was used instead of positive electrode precursor 11.

Comparative Example 49

A nonaqueous lithium power storage element was fabricated by the same method as Comparative Example 48, except that for initial charging of the nonaqueous lithium power storage element in the lithium doping procedure, constant-current charge was carried out at a current value of 100 mA until reaching a voltage of 4.5 V, and then constant-voltage charge was carried out at 4.5 V continuously for 36 hours, for lithium doping at the negative electrode.

Comparative Example 50

A nonaqueous lithium power storage element was fabricated by the same method as Comparative Example 48, except that for initial charging of the nonaqueous lithium power storage element in the lithium doping procedure, constant-current charge was carried out at a current value of 100 mA until reaching a voltage of 4.5 V, and then constant-voltage charge was carried out at 4.5 V continuously for 12 hours, for lithium doping at the negative electrode.

Comparative Example 51

A nonaqueous lithium power storage element was fabricated by the same method as Example 52, except that for initial charging of the nonaqueous lithium power storage element in the lithium doping procedure, constant-current charge was carried out at a current value of 100 mA until reaching a voltage of 4.1 V, and then constant-voltage charge was carried out at 4.1 V continuously for 72 hours, for lithium doping at the negative electrode.

Comparative Example 52

A nonaqueous lithium power storage element was fabricated by the same method as Example 53, except that for initial charging of the nonaqueous lithium power storage element in the lithium doping procedure, constant-current charge was carried out at a current value of 100 mA until reaching a voltage of 4.1 V, and then constant-voltage charge was carried out at 4.1 V continuously for 72 hours, for lithium doping at the negative electrode.

Comparative Example 53

Coating solution 12 was prepared using 23.0 parts by weight of activated carbon $1_{a2}$, 58.0 parts by weight of lithium carbonate having a mean particle diameter of 2.5 µm, 7.0 parts by weight of Ketchen black, 3.0 parts by weight of PVP (polyvinylpyrrolidone) and 9.0 parts by weight of PVdF (polyvinylidene fluoride). Coating solution 9 was coated on one side of an aluminum foil having a thickness of 15 µm and coating solution 12 was coated onto the other side to fabricate positive electrode precursor 14, and when the film thickness of the positive electrode active material layer was measured by the same method as Example 31, the film thickness of the positive electrode active material layer coated with coating solution 9 was 53 µm and the film thickness of the positive electrode active material layer coated with coating solution 12 was 30 µm. A nonaqueous lithium power storage element was fabricated by the same method as Example 49, except for using positive electrode precursor 14 instead of positive electrode precursor 11.

Comparative Example 54

A nonaqueous lithium power storage element was fabricated by the same method as Comparative Example 53, except that for initial charging of the nonaqueous lithium power storage element in the lithium doping procedure, constant-current charge was carried out at a current value of 100 mA until reaching a voltage of 4.5 V, and then constant-voltage charge was carried out at 4.5 V continuously for 36 hours, for lithium doping at the negative electrode.

Comparative Example 55

A nonaqueous lithium power storage element was fabricated by the same method as Comparative Example 53, except that for initial charging of the nonaqueous lithium power storage element in the lithium doping procedure, constant-current charge was carried out at a current value of 100 mA until reaching a voltage of 4.5 V, and then constant-voltage charge was carried out at 4.5 V continuously for 12 hours, for lithium doping at the negative electrode.

Comparative Example 56

Coating solution 13 was prepared using 76.0 parts by weight of activated carbon $1_{a2}$, 5.0 parts by weight of lithium carbonate having a mean particle diameter of 2.5 µm, 7.0 parts by weight of Ketchen black, 3.0 parts by weight of PVP (polyvinylpyrrolidone) and 9.0 parts by weight of PVdF (polyvinylidene fluoride). Coating solution 9 was coated on one side of an aluminum foil having a thickness of 15 µm and coating solution 13 was coated onto the other side to fabricate positive electrode precursor 15, and when the film thickness of the positive electrode active material layer was measured by the same method as Example 31, the film thickness of the positive electrode active material layer coated with coating solution 9 was 53 µm and the film thickness of the positive electrode active material layer coated with coating solution 13 was 72 µm. A nonaqueous lithium power storage element was fabricated by the same method as Example 49, except for using positive electrode precursor 15 instead of positive electrode precursor 11.

Comparative Example 57

A nonaqueous lithium power storage element was fabricated by the same method as Comparative Example 56, except that for initial charging of the nonaqueous lithium power storage element in the lithium doping procedure, constant-current charge was carried out at a current value of 100 mA until reaching a voltage of 4.5 V, and then constant-voltage charge was carried out at 4.5 V continuously for 36 hours, for lithium doping at the negative electrode.

Comparative Example 58

A nonaqueous lithium power storage element was fabricated by the same method as Comparative Example 56, except that for initial charging of the nonaqueous lithium power storage element in the lithium doping procedure, constant-current charge was carried out at a current value of 100 mA until reaching a voltage of 4.5 V, and then constant-voltage charge was carried out at 4.5 V continuously for 12 hours, for lithium doping at the negative electrode.

Example 54

The positive electrode precursor 4 was cut to a size of 12.0 cm×220.0 cm (a positive electrode active material layer size of 10.0 cm×220.0 cm, and a size of 2.0 cm×220.0 cm for the non-coated portion of the positive electrode, where the positive electrode active material layer was not coated on the positive electrode power collector), the negative electrode 3 was cut to a size of 12.1×210.0 cm (a negative electrode active material layer size of 10.1 cm×210.0 cm, and a size of 2.0 cm×210.0 cm for the non-coated portion of the negative electrode, where the negative electrode active material layer was not coated on the negative electrode power collector), and these were wound using a polyethylene separator (product of Asahi Kasei Corp., thickness: 10 µm), to fabricate an electrode laminated body. During the procedure, the positive electrode active material layer and negative electrode active material layer were facing across the separator, the non-coated portion of the positive electrode and the non-coated portion of the negative electrode protruded from opposite directions of the electrode laminated body, and winding was in an ellipsoid fashion with the positive electrode precursor 4 situated on the outermost layer of the electrode laminated body. A positive electrode terminal and negative electrode terminal were ultrasonically welded to the obtained electrode laminated body and placed in a vessel formed of an aluminum laminate package material, and 3 sides including the electrode terminal section were sealed by heat sealing. A nonaqueous lithium power storage element was then fabricated by the same method as Example 31.

Example 55

A nonaqueous lithium power storage element was fabricated by the same method as Example 54, except that for initial charging of the nonaqueous lithium power storage element in the lithium doping procedure, constant-current charge was carried out at a current value of 100 mA until reaching a voltage of 4.5 V, and then constant-voltage charge was carried out at 4.5 V continuously for 36 hours, for lithium doping at the negative electrode.

Example 56

A nonaqueous lithium power storage element was fabricated by the same method as Example 54, except that for initial charging of the nonaqueous lithium power storage element in the lithium doping procedure, constant-current charge was carried out at a current value of 100 mA until reaching a voltage of 4.5 V, and then constant-voltage charge was carried out at 4.5 V continuously for 12 hours, for lithium doping at the negative electrode.

Example 57

A nonaqueous lithium power storage element was fabricated by the same method as Example 54, except that positive electrode precursor 3 was used, and the electrode laminated body was fabricated with the side coated with coating solution 2 as the outermost layer of the electrode laminated body.

Example 58

A nonaqueous lithium power storage element was fabricated by the same method as Example 57, except that for initial charging of the nonaqueous lithium power storage element in the lithium doping procedure, constant-current charge was carried out at a current value of 100 mA until reaching a voltage of 4.5 V, and then constant-voltage charge was carried out at 4.5 V continuously for 36 hours, for lithium doping at the negative electrode.

Example 59

A nonaqueous lithium power storage element was fabricated by the same method as Example 57, except that for initial charging of the nonaqueous lithium power storage element in the lithium doping procedure, constant-current charge was carried out at a current value of 100 mA until reaching a voltage of 4.5 V, and then constant-voltage charge was carried out at 4.5 V continuously for 12 hours, for lithium doping at the negative electrode.

Comparative Example 59

A nonaqueous lithium power storage element was fabricated by the same method as Example 54, except that positive electrode precursor 8 was used, and the electrode laminated body was fabricated with the side coated with coating solution 6 as the outermost layer of the electrode laminated body.

Comparative Example 60

A nonaqueous lithium power storage element was fabricated by the same method as Comparative Example 59, except that for initial charging of the nonaqueous lithium power storage element in the lithium doping procedure, constant-current charge was carried out at a current value of 100 mA until reaching a voltage of 4.5 V, and then constant-voltage charge was carried out at 4.5 V continuously for 36 hours, for lithium doping at the negative electrode.

Comparative Example 61

A nonaqueous lithium power storage element was fabricated by the same method as Comparative Example 59, except that for initial charging of the nonaqueous lithium power storage element in the lithium doping procedure, constant-current charge was carried out at a current value of 100 mA until reaching a voltage of 4.5 V, and then constant-voltage charge was carried out at 4.5 V continuously for 12 hours, for lithium doping at the negative electrode.

Comparative Example 62

A nonaqueous lithium power storage element was fabricated by the same method as Example 54, except that positive electrode precursor 10 was used, and the electrode laminated body was fabricated with the side coated with coating solution 8 as the outermost layer of the electrode laminated body.

Comparative Example 63

A nonaqueous lithium power storage element was fabricated by the same method as Comparative Example 62, except that for initial charging of the nonaqueous lithium power storage element in the lithium doping procedure, constant-current charge was carried out at a current value of 100 mA until reaching a voltage of 4.5 V, and then constant-voltage charge was carried out at 4.5 V continuously for 36 hours, for lithium doping at the negative electrode.

Comparative Example 64

A nonaqueous lithium power storage element was fabricated by the same method as Comparative Example 62, except that for initial charging of the nonaqueous lithium power storage element in the lithium doping procedure, constant-current charge was carried out at a current value of 100 mA until reaching a voltage of 4.5 V, and then constant-voltage charge was carried out at 4.5 V continuously for 12 hours, for lithium doping at the negative electrode.

The evaluation results for the nonaqueous lithium power storage elements of Examples 49 to 59 and Comparative Examples 45 to 64 are shown in Table 4.

TABLE 4

| | Lithium compound | $C_{x1}$ (g/m²) | $C_{y1}$ (g/m²) | $C_{x2}$ (g/m²) | $C_{y2}$ (g/m²) | $C_{x2}/C_{y2}$ | Microscopic Raman spectroscopy | | | | | | Initial properties | | | High-load Charge/discharge cycle test | | | High-temperature storage test | Overcharge test | |
|---|---|---|---|---|---|---|---|---|---|---|---|---|---|---|---|---|---|---|---|---|
| | | | | | | | $S_x$ (%) | $S_y$ (%) | $C_{y3}$ ($10^{-4}$ mol/g) | $A_{y3}$ ($10^{-4}$ mol/g) | $C_{y3}/A_{y3}$ | Fa (F) | Ra (mΩ) | Rb (mΩ) | Rb/Ra | B ($10^{-3}$ cc/F) | Maximum temperature (°C) | Condition |
| Example 49 | Li₂CO₃ | 20.3 | 2.6 | 28.6 | 28.2 | 1.02 | 39.1 | 6.9 | 85.6 | 50.3 | 1.7 | 1458 | 0.54 | 0.62 | 1.15 | 2.32 | 41 | Splitting |
| Example 50 | Li₂CO₃ | 21.2 | 5.9 | 28.1 | 29.5 | 0.95 | 40.2 | 10.3 | 44.1 | 41.1 | 1.1 | 1428 | 0.58 | 0.65 | 1.12 | 2.78 | 44 | Splitting |
| Example 51 | Li₂CO₃ | 19.7 | 12.1 | 30.9 | 28.2 | 1.10 | 41.2 | 19.3 | 20.0 | 34.5 | 0.6 | 1451 | 0.55 | 0.62 | 1.13 | 2.60 | 40 | Splitting |
| Example 52 | Li₂O | 18.9 | 5.3 | 28.6 | 28.1 | 1.02 | — | — | 80.4 | 51.2 | 1.6 | 1408 | 0.59 | 0.67 | 1.14 | 2.87 | 42 | Splitting |
| Example 53 | LiOH | 19.5 | 3.5 | 27.9 | 29.3 | 0.95 | — | — | 90.1 | 55.4 | 1.6 | 1423 | 0.60 | 0.69 | 1.15 | 2.40 | 45 | Splitting |
| Comp. Example 45 | Li₂CO₃ | 21.2 | 21.5 | 29.8 | 29.3 | 1.02 | 34.1 | 13.2 | 1.3 | 14.5 | 0.09 | 1003 | 0.81 | 1.11 | 1.37 | 5.45 | 67 | Splitting |
| Comp. Example 46 | Li₂CO₃ | 22.0 | 23.0 | 30.5 | 29.2 | 1.04 | 36.3 | 10.3 | 0.7 | 13.7 | 0.05 | 929 | 0.78 | 1.04 | 1.33 | 6.37 | 65 | Splitting |
| Comp. Example 47 | Li₂CO₃ | 21.6 | 22.2 | 27.5 | 28.3 | 0.97 | 31.4 | 22.5 | 0.3 | 10.4 | 0.03 | 871 | 0.77 | 1.14 | 1.48 | 7.40 | 60 | Splitting |
| Comp. Example 48 | Li₂CO₃ | 0.0 | 3.2 | 27.8 | 28.1 | 1.00 | 0.0 | 31.0 | 80.5 | 47.5 | 1.7 | 1489 | 0.58 | 0.66 | 1.14 | 2.53 | 132 | Rupture |
| Comp. Example 49 | Li₂CO₃ | 0.0 | 5.6 | 25.9 | 27.5 | 0.92 | 0.0 | 7.3 | 43.4 | 40.9 | 1.1 | 1442 | 0.59 | 0.67 | 1.14 | 2.79 | 135 | Rupture |
| Comp. Example 50 | Li₂CO₃ | 0.0 | 12.0 | 27.2 | 28.1 | 0.99 | 0.0 | 11.3 | 23.0 | 35.5 | 0.6 | 1479 | 0.56 | 0.65 | 1.16 | 2.91 | 129 | Rupture |
| Comp. Example 51 | Li₂O | 18.8 | 20.5 | 26.1 | 29.0 | 0.90 | — | — | 1.1 | 15.4 | 0.07 | 961 | 0.82 | 1.23 | 1.50 | 6.34 | 64 | Splitting |
| Comp. Example 52 | LiOH | 19.1 | 21.1 | 33.0 | 29.5 | 1.12 | — | — | 1.0 | 12.1 | 0.08 | 933 | 0.84 | 1.22 | 1.45 | 6.01 | 59 | Splitting |
| Comp. Example 53 | Li₂CO₃ | 27.6 | 2.1 | 22.1 | 27.1 | 0.82 | 53.4 | 5.6 | 85.6 | 45.4 | 1.9 | 1454 | 0.58 | 0.67 | 1.16 | 2.32 | 74 | Splitting |
| Comp. Example 54 | Li₂CO₃ | 26.7 | 4.5 | 21.2 | 27.0 | 0.79 | 55.4 | 10.2 | 54.1 | 40.3 | 1.3 | 1465 | 0.55 | 0.62 | 1.13 | 2.54 | 76 | Splitting |
| Comp. Example 55 | Li₂CO₃ | 27.0 | 9.6 | 20.1 | 27.3 | 0.74 | 54.0 | 15.6 | 28.4 | 35.3 | 0.8 | 1402 | 0.57 | 0.66 | 1.16 | 2.33 | 77 | Splitting |
| Comp. Example 56 | Li₂CO₃ | 4.5 | 2.9 | 35.4 | 28.8 | 1.23 | 6.7 | 5.5 | 80.5 | 49.5 | 1.6 | 1403 | 0.55 | 0.63 | 1.15 | 2.40 | 87 | Rupture |
| Comp. Example 57 | Li₂CO₃ | 3.6 | 6.8 | 36.1 | 28.1 | 1.28 | 5.8 | 10.5 | 51.1 | 40.4 | 1.3 | 1489 | 0.59 | 0.70 | 1.19 | 2.58 | 90 | Rupture |
| Comp. Example 58 | Li₂CO₃ | 4.4 | 11.6 | 35.0 | 28.0 | 1.25 | 7.3 | 16.8 | 22.0 | 33.0 | 0.7 | 1438 | 0.57 | 0.70 | 1.23 | 2.88 | 85 | Rupture |
| Example 54 | Li₂CO₃ | 15.4 | 2.2 | 28.1 | 29.3 | 0.96 | 27.8 | 5.7 | 85.6 | 48.0 | 1.8 | 1754 | 0.56 | 0.62 | 1.11 | 1.90 | 41 | Splitting |
| Example 55 | Li₂CO₃ | 15.3 | 5.6 | 28.4 | 28.4 | 1.00 | 27.0 | 13.2 | 40.4 | 43.4 | 0.9 | 1720 | 0.57 | 0.63 | 1.11 | 2.12 | 45 | Splitting |
| Example 56 | Li₂CO₃ | 15.7 | 9.5 | 29.1 | 28.0 | 1.04 | 26.9 | 18.9 | 21.0 | 37.4 | 0.6 | 1710 | 0.59 | 0.66 | 1.12 | 2.02 | 42 | Splitting |
| Example 57 | Li₂CO₃ | 17.3 | 2.5 | 29.3 | 27.7 | 1.06 | 33.7 | 4.7 | 83.9 | 43.0 | 2.0 | 1730 | 0.57 | 0.64 | 1.12 | 1.76 | 44 | Splitting |
| Example 58 | Li₂CO₃ | 17.3 | 6.2 | 29.3 | 28.5 | 1.03 | 34.5 | 13.5 | 48.9 | 38.9 | 1.3 | 1768 | 0.55 | 0.64 | 1.16 | 2.32 | 40 | Splitting |
| Example 59 | Li₂CO₃ | 17.5 | 10.5 | 28.5 | 28.8 | 0.99 | 35.1 | 19.5 | 34.3 | 35.5 | 1.0 | 1711 | 0.58 | 0.66 | 1.14 | 2.04 | 48 | Splitting |
| Comp. Example 59 | Li₂CO₃ | 2.4 | 2.0 | 28.2 | 28.5 | 0.99 | 5.6 | 4.2 | 89.3 | 45.5 | 2.0 | 1574 | 0.60 | 0.86 | 1.43 | 2.43 | 90 | Rupture |
| Comp. Example 60 | Li₂CO₃ | 2.3 | 4.6 | 28.3 | 28.1 | 1.01 | 4.6 | 10.4 | 54.1 | 40.4 | 1.3 | 1567 | 0.61 | 0.88 | 1.44 | 2.76 | 93 | Rupture |
| Comp. Example 61 | Li₂CO₃ | 2.1 | 8.9 | 28.6 | 27.9 | 1.03 | 5.7 | 17.7 | 38.0 | 35.4 | 1.1 | 1502 | 0.63 | 0.92 | 1.46 | 2.99 | 95 | Rupture |
| Comp. Example 62 | Li₂CO₃ | 28.6 | 2.8 | 25.6 | 28.1 | 0.91 | 54.5 | 5.5 | 80.1 | 47.1 | 1.7 | 1769 | 0.56 | 0.65 | 1.16 | 3.78 | 70 | Splitting |
| Comp. Example 63 | Li₂CO₃ | 28.1 | 5.8 | 25.7 | 28.3 | 0.91 | 55.3 | 14.7 | 38.2 | 39.5 | 1.0 | 1729 | 0.56 | 0.68 | 1.21 | 4.02 | 72 | Splitting |
| Comp. Example 64 | Li₂CO₃ | 28.6 | 11.1 | 25.1 | 28.8 | 0.87 | 53.0 | 21.0 | 28.9 | 34.0 | 0.9 | 1750 | 0.56 | 0.70 | 1.25 | 4.55 | 68 | Splitting |

Without being limited to theory, it is believed that for the nonaqueous lithium power storage element of the second embodiment, when the amount of carbonate $C_{x1}$ per area on the $C_x$ side of the positive electrode active material layer situated on the outermost layer of the electrode laminated body was 5.0 to 25.0, and when the amount of carbonate $C_{y1}$ per area on the $C_y$ side of the positive electrode active material layer on the back side of the $C_x$ side was 0.1 to 8.0, and $C_{x1} > C_{y1}$, the lithium compound on the $C_x$ side gradually decomposed during overcharge, generating gas, and causing the casing to split under moderate conditions, thereby suppressing temperature increase.

Furthermore, it is believed that when a compound represented by formulas (1) to (3) was present in the positive electrode surface, it was possible to suppress reaction between the lithium compound in the positive electrode and the nonaqueous electrolytic solution, and to suppress gas generation in the high-temperature storage test.

The examples and comparative examples of the third embodiment will now be described in detail.

Example 60

[Pulverization of Lithium Carbonate]

Using a pulverizer (LNM liquid nitrogen bead mill) by Aimex Corp., 200 g of lithium carbonate with a mean particle diameter of 51 μm was cooled to −196° C. with liquid nitrogen and pulverized for 9 minutes at a circumferential speed of 10.0 m/s, using dry ice beads. The mean particle diameter of the lithium carbonate obtained by brittle fracture while preventing heat denaturation at −196° C. was measured, to determine the particle diameter of the added lithium carbonate, and it was found to be 2.5 μm.

[Preparation of Positive Electrode Active Material]
[Preparation of Activated Carbon $1_{a3}$]

Crushed coconut shell carbide was subjected to carbonization in a small carbonizing furnace, at 500° C. for 3 hours in nitrogen, to obtain a carbide. The obtained carbide was placed in an activating furnace, water vapor was introduced into the activating furnace at 1 kg/h in a heated state using a preheating furnace, and the temperature was increased to 900° C. over 8 hours for activation. The activated carbide was cooled under a nitrogen atmosphere to obtain activated carbon. The obtained activated carbon was flow-rinsed for 10 hours and then drained. After then drying for 10 hours in an electrodesiccator kept at 115° C., it was pulverized for 1 hour with a ball mill to obtain activated carbon $1_{a3}$.

A laser diffraction particle size distribution analyzer (SALD-2000J) by Shimadzu Corp. was used to measure the mean particle diameter of the activated carbon $1_{a3}$, which was found to be 4.1 μm. A pore distribution measuring apparatus (AUTOSORB-1 AS-1-MP) by Yuasa-Ionics Co., Ltd. was also used to measure the pore distribution. As a result, the BET specific surface area was 2360 m$^2$/g, the mesopore volume ($V_1$) was 0.52 cc/g, the micropore volume ($V_2$) was 0.88 cc/g, and $V_1/V_2=0.59$.

[Preparation of Activated Carbon $2_{a3}$]

For the phenol resin, after carbonization for 2 hours in a firing furnace at 600° C. under a nitrogen atmosphere, it was pulverized with a ball mill and sorted, to obtain a carbide having a mean particle diameter of 7.0 μm. The carbide and KOH were mixed at a weight ratio of 1:5, and heated for 1 hour in a firing furnace at 800° C. under a nitrogen atmosphere, for activation. The mixture was subsequently stirred and rinsed for 1 hour in dilute hydrochloric acid adjusted to a concentration of 2 mol/L, and then boiled and rinsed with distilled water until the pH stabilized to between 5 and 6, after which it was dried to produce activated carbon $2_{a3}$.

A laser diffraction particle size distribution analyzer (SALD-2000J) by Shimadzu Corp. was used to measure the mean particle diameter of the activated carbon $2_{a3}$, which was found to be 7.1 μm. A pore distribution measuring apparatus (AUTOSORB-1 AS-1-MP) by Yuasa-Ionics Co., Ltd. was also used to measure the pore distribution. As a result, the BET specific surface area was 3627 m$^2$/g, the mesopore volume ($V_1$) was 1.50 cc/g, the micropore volume ($V_2$) was 2.28 cc/g, and $V_1/V_2=0.66$.

[Preparation of Positive Electrode Coating Solution]

A positive electrode coating solution was produced by the following method, using activated carbons $1_{a3}$ and $2_{a3}$ obtained above as positive electrode active materials, and the lithium carbonate obtained above as the added lithium compound.

After mixing 59.5 parts by weight of activated carbon 1a3 or $2_{a3}$, 28.0 parts by weight of lithium carbonate, 3.0 parts by weight of Ketchen black, 1.5 parts by weight of PVP (polyvinylpyrrolidone), 8.0 parts by weight of PVdF (polyvinylidene fluoride) and NMP (N-methylpyrrolidone), the mixture was dispersed using a FILMIX® thin-film spinning high-speed mixer by Primix Corp., under conditions with a circumferential speed of 17.0 m/s, to obtain a coating solution.

The viscosity (ηb) and TI value of the obtained coating solution were measured using a TVE-35H E-type viscometer by Toki Sangyo Co., Ltd. As a result, the viscosity (ηb) was 2,700 mPa·s and the TI value was 3.5. The degree of dispersion of the obtained coating solution was measured using a fineness gauge by Yoshimitsu Seiki Co. As a result, the granularity was 35 μm.

[Preparation of Positive Electrode Precursor]

The coating solution was coated onto one or both sides of an aluminum foil with a thickness of 15 μm using a die coater by Toray Engineering Co., Ltd. under conditions with a coating speed of 1 m/s, and dried at a drying temperature of 100° C. to obtain a positive electrode precursor. The obtained positive electrode precursor was pressed using a roll press under conditions with a pressure of 4 kN/cm and a pressed portion surface temperature of 25° C. The film thickness of the positive electrode active material layer of the obtained positive electrode precursor was determined by subtracting the thickness of the aluminum foil from the average thickness measured at 10 arbitrary locations of the positive electrode precursor using a Linear Gauge Sensor GS-551 by Ono Sokki Co., Ltd. As a result, the film thickness of the positive electrode active material layer was 61 μm per side.

[Preparation of Negative Electrode]

A 150 g portion of commercially available coconut shell activated carbon having a mean particle diameter of 3.0 μm and a BET specific surface area of 1,780 m$^2$/g was placed into a stainless steel mesh basket and set on a stainless steel vat containing 270 g of coal-based pitch (softening point: 50° C.), both were set in an electric furnace (furnace inner usable dimension: 300 mm×300 mm×300 mm), and thermal reaction was carried out to obtain composite carbon material $1_{a3}$. The heat treatment was carried out under a nitrogen atmosphere, with temperature increase to 600° C. over a period of 8 hours, and 4 hours of holding at the same temperature. This was followed by natural cooling to 60° C., after which the composite carbon material $1_{a3}$ was removed out of the furnace.

The mean particle diameter and BET specific surface area of the obtained composite carbon material $1_{a3}$ were measured by the same methods as described above. As a result, the mean particle diameter was 3.2 μm and the BET specific surface area was 262 m$^2$/g. The weight ratio of coal-based pitch-derived carbonaceous material with respect to activated carbon was 78%.

Composite carbon material $1_{a3}$ was then used as a negative electrode active material to produce a negative electrode.

After mixing 85 parts by weight of composite carbon material $1_{a3}$, 10 parts by weight of acetylene black, 5 parts by weight of PVdF (polyvinylidene fluoride) and NMP (N-methylpyrrolidone), the mixture was dispersed using a FILMIX® thin-film spinning high-speed mixer by Primix Corp., under conditions with a circumferential speed of 15 m/s, to obtain a coating solution. The viscosity (ηb) and TI value of the obtained coating solution were measured using a TVE-35H E-type viscometer by Toki Sangyo Co., Ltd. As a result, the viscosity (ηb) was 2,789 mPa·s and the TI value was 4.3. The coating solution was coated onto both sides of an electrolytic copper foil with a thickness of 10 μm using a die coater by Toray Engineering Co., Ltd. under conditions with a coating speed of 1 m/s, and dried at a drying temperature of 85° C. to obtain a negative electrode. The obtained negative electrode was pressed using a roll press under conditions with a pressure of 4 kN/cm and a pressed portion surface temperature of 25° C. The film thickness of the negative electrode active material layer of the obtained negative electrode was determined by subtracting the thickness of the copper foil from the average thickness measured at 10 arbitrary locations of the negative electrode using a Linear Gauge Sensor GS-551 by Ono Sokki Co., Ltd. As a result, the film thickness per side of the negative electrode active material layer of the negative electrode was 40 μm.

[Preparation of Electrolytic Solution]

As an organic solvent there was used a mixed solvent of ethylene carbonate (EC):methyl ethyl carbonate (MEC)=33:67 (volume ratio), each electrolyte salt was dissolved so that the concentration ratio of LiN(SO$_2$F)$_2$ and LiPF$_6$ was 75:25 (molar ratio) with respect to the total electrolytic solution and the total concentration of LiN(SO$_2$F)$_2$ and LiPF$_6$ was 1.2 mol/L, and the obtained solution was used as a nonaqueous electrolytic solution.

The concentrations of LiN(SO$_2$F)$_2$ and LiPF$_6$ in the prepared electrolytic solution were 0.9 mol/L and 0.3 mol/L, respectively.

[Preparation of Nonaqueous Lithium Power Storage Element]

[Assembly]

The obtained double-sided negative electrode and double-sided positive electrode precursor were cut to 12 cm×230 cm (2760 cm$^2$). The negative electrode and positive electrode precursor each had non-coated sections. The non-coated sections were formed to widths of 2 cm from the edge sides. These were used to sandwich a microporous film separator with a thickness of 15 μm, with the non-coated sections facing opposite directions, and wound in an ellipsoid fashion with the non-coated sections protruding from the separator, and the wound body was pressed and formed into a flat shape. Next, a negative electrode terminal and positive electrode terminal were joined to the negative electrode and positive electrode precursor, respectively, by ultrasonic welding to form a wound body. The wound body was housed in a rectilinear aluminum casing. It was vacuum dried under conditions with a temperature of 80° C., a pressure of 50 Pa and a drying time of 60 hr.

[Filling, Impregnation and Sealing]

Approximately 80 g of the nonaqueous electrolytic solution was injected into the wound body housed in the rectilinear aluminum casing, under atmospheric pressure, in a dry air environment at a temperature of 25° C. and a dew point of no higher than −40° C. Next, the nonaqueous lithium power storage element was placed in a pressure reduction chamber and the pressure was reduced from ordinary pressure to −87 kPa, after which it was restored to atmospheric pressure and allowed to stand for 5 minutes. The procedure of reducing the pressure from ordinary pressure to −87 kPa and then restoring to atmospheric pressure was subsequently repeated 4 times, and it was then allowed to stand for 15 minutes. The pressure was again reduced from atmospheric pressure to −91 kPa, and then restored to atmospheric pressure. The procedure of pressure reduction and restoration to atmospheric pressure in the same manner was repeated a total of 7 times (pressure reduction from atmospheric pressure to −95 kPa, −96 kPa, −97 kPa, −81 kPa, −97 kPa, −97 kPa and −97 kPa, respectively). The electrode laminated body was impregnated with the nonaqueous electrolytic solution by this procedure.

[Lithium Doping]

The obtained nonaqueous lithium power storage element was subjected to initial charging by a method of constant-current charge using a charge/discharge apparatus (TOSCAT-3100U) by Toyo System Co., Ltd., in a dry air environment at a temperature of 25° C. and a dew point of no higher than −40° C., at a current value of 50 mA until reaching a voltage of 4.5 V, followed by constant-voltage charge at 4.5 V continued for 72 hours, for lithium doping of the negative electrode.

[Aging]

The lithium-doped nonaqueous lithium power storage element was subjected to constant-current discharge in a dry air environment at a temperature of 25° C. and a dew point of no higher than −40° C., at 1.0 A until reaching a voltage of 3.0 V, and then constant-current discharge at 3.0 V for 1 hour, to adjust the voltage to 3.0 V. The nonaqueous lithium power storage element was then stored for 60 hours in a thermostatic bath at 60° C.

[Degassing]

Next, the nonaqueous lithium power storage element was placed in a pressure reduction chamber, in a dry air environment at a temperature of 25° C. and a dew point of no higher than −40° C., and a procedure of using a diaphragm pump by KNF Co. (N816.3KT.45.18) for pressure reduction over a period of 3 minutes from atmospheric pressure to −80 kPa, followed by restoration to atmospheric pressure over a period of 3 minutes, was repeated 3 times. The nonaqueous lithium power storage element was subsequently placed in a pressure-reducing sealing machine, the pressure was reduced to −90 kPa, and then the opening of the rectilinear aluminum casing was covered with a degassing-valved metal cap with a working pressure of 0.10 MPa and sealed by joining with a laser.

This procedure completed the nonaqueous lithium power storage element.

[Evaluation of Power Storage Element]

[Measurement of Electrostatic Capacitance]

The obtained power storage element was subjected to constant-current charge using a charge/discharge apparatus (5 V, 360 A) by Fujitsu Telecom Networks, Ltd. in a thermostatic bath set to 25° C., at the 20 C current value until reaching 3.8 V, and then constant-voltage charge was carried out with application of a constant voltage of 3.8 V for a total of 30 minutes. With the capacitance after constant-current discharge to 2.2 V at the 2 C current value as Q, the electrostatic capacitance F was calculated by F=Q/(3.8−2.2) to be 1005 F.

[Calculation of Ra]

The obtained power storage element was subjected to constant-current charge using a charge/discharge apparatus (5 V, 360 A) by Fujitsu Telecom Networks, Ltd. in a thermostatic bath set to 25° C., at the 20 C current value until reaching 3.8 V, and then constant-voltage charge was carried out with application of a constant voltage of 3.8 V for a total of 30 minutes, after which constant-current discharge was carried out at the 20 C current value to 2.2 V, to obtain a discharge curve (time-voltage). From the discharge curve, with the voltage of Eo at discharge time=0 seconds, obtained by extrapolating by linear approximation from the voltage values at discharge times of 2 seconds and 4 seconds, the internal resistance Ra was calculated from the voltage drop ΔE=3.8−Eo and R=ΔE/(20 C (current value A)), as the ordinary temperature discharge internal resistance Ra, to be 1.91 mΩ.

[Increase in Ordinary Temperature Discharge Internal Resistance After the High Load Charge/Discharge Cycle Test]

The obtained power storage element was subjected to constant-current charge using a charge/discharge apparatus (5 V, 360 A) by Fujitsu Telecom Networks, Ltd. in a thermostatic bath set to 25° C., at the 300 C current value until reaching 3.8 V, followed by constant-current discharge at the 300 C current value until reaching 2.2 V, as a charge/discharge procedure that was repeated 60,000 times. After the high load charge/discharge cycle test, the internal resistance Rb after the high load charge/discharge cycle test was calculated in the same manner as in [Calculation of Ra·F] above. Rb (Ω) was divided by the internal resistance Ra (Ω) before the high load charge/discharge cycle test as determined in [Calculation of Ra·F] above, to calculate the ratio Rb/Ra as 1.21.

[Capacitance Recovery Rate After the High Load Charge/Discharge Cycle Test]

The obtained power storage element was subjected to constant-current charge using a charge/discharge apparatus (5 V, 360 A) by Fujitsu Telecom Networks, Ltd. in a thermostatic bath set to 25° C., at the 300 C current value until reaching 3.8 V, followed by constant-current discharge at the 300 C current value until reaching 2.2 V, as a charge/discharge procedure that was repeated 60,000 times. Upon completion of the cycle, charging was carried out at the 20 C current value to 4.5 V, and constant-voltage charge was carried out continuously for 1 hour afterwards. The electrostatic capacitance Fb was then measured to be 1075 F, and Fb/F=1.07.

[Confirming Fluid Leakage and Corrosion]

The obtained power storage element was stored for 1 year in a thermostatic bath set to 80° C., after which the casing and degassing valve were visually examined, and no leakage of the electrolytic solution was found. The casing was disassembled and the inner side of the casing observed, and no corrosion was found.

Examples 61 to 79 and Comparative Examples 65 to 72

Nonaqueous lithium power storage elements for Examples 61 to 79 and Comparative Examples 65 to 72 were each fabricated in the same manner as Example 60, except that for fabrication of the positive electrode, the time for pulverization of positive electrode activated carbons $1_{a3}$ and $2_{a3}$ with a ball mill and the mixing ratio of the positive electrode coating solution were changed, and the type of degassing valve was also changed, as shown in Table 5 below, and each was evaluated. The evaluation results for the obtained nonaqueous lithium power storage elements are shown in Table 5 below.

Examples 80 to 83 and Comparative Examples 73 to 78

For fabrication of the positive electrode, the time for pulverization of positive electrode activated carbons $1_{a3}$ and $2_{a3}$ with a ball mill and the mixing ratio of the positive electrode coating solution were changed, and the type of degassing valve was also changed. The obtained double-sided negative electrode and double-sided positive electrode precursor were cut to 10 cm×10 cm (100 cm$^2$). Nonaqueous lithium power storage elements for Examples 80 to 83 and Comparative Examples 73 to 78 were each fabricated in the same manner as Example 60, except that for lamination, the single-sided positive electrode precursor was used for the uppermost side and lowermost side, 21 double-sided negative electrodes and 20 double-sided positive electrode precursors were used and microporous film separators with thicknesses of 15 μm were sandwiched between the negative electrodes and positive electrode precursors, and each was evaluated. The evaluation results for the obtained nonaqueous lithium power storage elements are shown in Table 5 below.

Comparative Example 79

For fabrication of the positive electrode, the time for pulverization of positive electrode activated carbons $1_{a3}$ and $2_{a3}$ with a ball mill and the mixing ratio of the positive electrode coating solution were changed, and the type of degassing valve was also changed. The obtained double-sided negative electrode and double-sided positive electrode precursor were cut to 12 cm×230 cm (2760 cm$^2$). Nonaqueous lithium power storage elements were fabricated in the same manner as Example 60, except that lithium metal with a thickness of 30 μm and a size of 9 cm×220 cm (1980 cm$^2$) was contact bonded onto one side of the active material region of the double-sided negative electrode, using a roll press with a contact pressure of 0.3 kgf/cm$^2$, and each was evaluated. The evaluation results for the obtained nonaqueous lithium power storage elements are shown in Table 5 below.

Comparative Example 80

For fabrication of the positive electrode, the time for pulverization of positive electrode activated carbons $1_{a3}$ and $2_{a3}$ with a ball mill and the mixing ratio of the positive electrode coating solution were changed, and the type of degassing valve was also changed. The obtained double-sided negative electrode and double-sided positive electrode precursor were cut to 10 cm×10 cm (100 cm$^2$). Nonaqueous lithium power storage elements were fabricated in the same manner as Example 60, except that lithium metal with a thickness of 30 μm and a size of 9 cm×9 cm (81 cm$^2$) was contact bonded onto one side of the active material region of the double-sided negative electrode, using a roll press with a contact pressure of 0.3 kgf/cm$^2$, and each was evaluated. The evaluation results for the obtained nonaqueous lithium power storage elements are shown in Table 5 below.

TABLE 5

| | Assembly type | Positive electrode active material Active material particle diameter [μm] | Lithium compound Lithium compound | Lithium compound particle diameter [μm] | Positive electrode precursor composition ratio Active material [weight %] | Lithium compound [weight %] | KB [weight %] | PVP [weight %] | PVDF [weight %] |
|---|---|---|---|---|---|---|---|---|---|
| Example 60 | Wound | 5.0 | Li$_2$CO$_3$ | 1.0 | 86 | 1.5 | 3.0 | 1.5 | 8.0 |
| Example 61 | Wound | 5.0 | Li$_2$CO$_3$ | 1.0 | 84.5 | 3 | 3.0 | 1.5 | 8.0 |
| Example 62 | Wound | 5.0 | Li$_2$CO$_3$ | 1.0 | 67.5 | 20 | 3.0 | 1.5 | 8.0 |
| Example 63 | Wound | 5.0 | Li$_2$CO$_3$ | 1.0 | 42.5 | 45 | 3.0 | 1.5 | 8.0 |
| Example 64 | Wound | 5.0 | Li$_2$CO$_3$ | 0.2 | 84.5 | 3 | 3.0 | 1.5 | 8.0 |
| Example 65 | Wound | 5.0 | Li$_2$O | 1.0 | 84.5 | 3 | 3.0 | 1.5 | 8.0 |
| Example 66 | Wound | 2.5 | Li$_2$CO$_3$ | 1.0 | 86 | 1.5 | 3.0 | 1.5 | 8.0 |
| Example 67 | Wound | 2.5 | Li$_2$CO$_3$ | 1.0 | 84.5 | 3 | 3.0 | 1.5 | 8.0 |
| Example 68 | Wound | 2.5 | Li$_2$CO$_3$ | 1.0 | 67.5 | 20 | 3.0 | 1.5 | 8.0 |
| Example 69 | Wound | 2.5 | Li$_2$CO$_3$ | 1.0 | 42.5 | 45 | 3.0 | 1.5 | 8.0 |
| Example 70 | Wound | 2.5 | Li$_2$CO$_3$ | 0.2 | 84.5 | 3 | 3.0 | 1.5 | 8.0 |
| Example 71 | Wound | 2.5 | Li$_2$O | 1.0 | 84.5 | 3 | 3.0 | 1.5 | 8.0 |
| Example 72 | Wound | 18.2 | Li$_2$CO$_3$ | 1.0 | 86 | 1.5 | 3.0 | 1.5 | 8.0 |
| Example 73 | Wound | 18.2 | Li$_2$CO$_3$ | 1.0 | 84.5 | 3 | 3.0 | 1.5 | 8.0 |
| Example 74 | Wound | 18.2 | Li$_2$CO$_3$ | 1.0 | 67.5 | 20 | 3.0 | 1.5 | 8.0 |
| Example 75 | Wound | 18.2 | Li$_2$CO$_3$ | 1.0 | 42.5 | 45 | 3.0 | 1.5 | 8.0 |
| Example 76 | Wound | 18.2 | Li$_2$CO$_3$ | 0.2 | 84.5 | 3 | 3.0 | 1.5 | 8.0 |
| Example 77 | Wound | 18.2 | Li$_2$CO$_3$ | 8.0 | 84.5 | 3 | 3.0 | 1.5 | 8.0 |
| Example 78 | Wound | 18.2 | Li$_2$O | 1.0 | 84.5 | 3 | 3.0 | 1.5 | 8.0 |
| Example 79 | Wound | 5.0 | Li$_2$CO$_3$ | 1.0 | 86 | 1.5 | 3.0 | 1.5 | 8.0 |
| Example 80 | Laminate | 5.0 | Li$_2$CO$_3$ | 1.0 | 84.5 | 3 | 3.0 | 1.5 | 8.0 |
| Example 81 | Laminate | 5.0 | Li$_2$CO$_3$ | 0.2 | 84.5 | 3 | 3.0 | 1.5 | 8.0 |
| Example 82 | Laminate | 5.0 | Li$_2$CO$_3$ | 1.0 | 67.5 | 20 | 3.0 | 1.5 | 8.0 |
| Example 83 | Laminate | 5.0 | Li$_2$O | 1.0 | 84.5 | 3 | 3.0 | 1.5 | 8.0 |
| Comp. Example 65 | Wound | 5.0 | Li$_2$CO$_3$ | 8.0 | 84.5 | 3 | 3.0 | 1.5 | 8.0 |
| Comp. Example 66 | Wound | 1.1 | Li$_2$CO$_3$ | 1.0 | 84.5 | 3 | 3.0 | 1.5 | 8.0 |
| Comp. Example 67 | Wound | 25.3 | Li$_2$CO$_3$ | 1.0 | 84.5 | 3 | 3.0 | 1.5 | 8.0 |
| Comp. Example 68 | Wound | 5.0 | Li$_2$CO$_3$ | 12.0 | 84.5 | 3 | 3.0 | 1.5 | 8.0 |
| Comp. Example 69 | Wound | 5.0 | Li$_2$CO$_3$ | 1.0 | 27.5 | 60 | 3.0 | 1.5 | 8.0 |
| Comp. Example 70 | Wound | 5.0 | Li$_2$CO$_3$ | 8.0 | 86 | 1.5 | 3.0 | 1.5 | 8.0 |
| Comp. Example 71 | Wound | 5.0 | Li$_2$CO$_3$ | 8.0 | 86 | 1.5 | 3.0 | 1.5 | 8.0 |
| Comp. Example 72 | Wound | 5.0 | Li$_2$CO$_3$ | 8.0 | 86 | 1.5 | 3.0 | 1.5 | 8.0 |
| Comp. Example 73 | Laminate | 5.0 | Li$_2$CO$_3$ | 8.0 | 84.5 | 3 | 3.0 | 1.5 | 8.0 |
| Comp. Example 74 | Laminate | 1.1 | Li$_2$CO$_3$ | 1.0 | 84.5 | 3 | 3.0 | 1.5 | 8.0 |
| Comp. Example 75 | Laminate | 25.3 | Li$_2$CO$_3$ | 1.0 | 84.5 | 3 | 3.0 | 1.5 | 8.0 |
| Comp. Example 76 | Laminate | 5.0 | Li$_2$CO$_3$ | 12.0 | 84.5 | 3 | 3.0 | 1.5 | 8.0 |
| Comp. Example 77 | Laminate | 5.0 | Li$_2$CO$_3$ | 1.0 | 27.5 | 60 | 3.0 | 1.5 | 8.0 |
| Comp. Example 78 | Laminate | 5.0 | Li$_2$CO$_3$ | 8.0 | 86 | 1.5 | 3.0 | 1.5 | 8.0 |
| Comp. Example 79 | Wound | 5.0 | None | 0.0 | 87.5 | 0 | 3.0 | 1.5 | 8.0 |
| Comp. Example 80 | Laminate | 5.0 | None | 0.0 | 87.5 | 0 | 3.0 | 1.5 | 8.0 |

| | Degassing valve Degassing valve present | Degassing valve Working pressure [MPa] | Initial properties Early resistance Ra [mΩ] | Cycle test Resistance increase rate Rb/Ra | Cycle test Capacitance increase rate Fb/Fa | Fluid leakage Casing | Fluid leakage Degassing valve | Corrosion |
|---|---|---|---|---|---|---|---|---|
| Example 60 | Yes | 0.10 | 1.91 | 1.21 | 1.07 | No | No | No |
| Example 61 | Yes | 0.10 | 1.71 | 1.03 | 1.12 | No | No | No |
| Example 62 | Yes | 0.10 | 1.60 | 1.02 | 1.13 | No | No | No |
| Example 63 | Yes | 0.10 | 1.89 | 1.33 | 1.06 | No | No | No |
| Example 64 | Yes | 0.10 | 1.79 | 1.31 | 1.08 | No | No | No |
| Example 65 | Yes | 0.10 | 1.90 | 1.59 | 1..02 | No | No | No |
| Example 66 | Yes | 0.10 | 2.01 | 1.50 | 1.06 | No | No | No |
| Example 67 | Yes | 0.10 | 1.90 | 1.26 | 1.10 | No | No | No |
| Example 68 | Yes | 0.10 | 1.85 | 1.28 | 1.11 | No | No | No |
| Example 69 | Yes | 0.10 | 2.00 | 1.58 | 1.08 | No | No | No |
| Example 70 | Yes | 0.10 | 1.95 | 1.51 | 1.09 | No | No | No |
| Example 71 | Yes | 0.10 | 2.03 | 1.62 | 1.03 | No | No | No |
| Example 72 | Yes | 0.10 | 2.03 | 1.51 | 1.05 | No | No | No |
| Example 73 | Yes | 0.10 | 1.93 | 1.28 | 1.09 | No | No | No |
| Example 74 | Yes | 0.10 | 1.88 | 1.30 | 1.11 | No | No | No |
| Example 75 | Yes | 0.10 | 2.02 | 1.57 | 1.08 | No | No | No |
| Example 76 | Yes | 0.10 | 1.97 | 1.50 | 1.06 | No | No | No |
| Example 77 | Yes | 0.10 | 2.04 | 1.30 | 1.06 | No | No | No |
| Example 78 | Yes | 0.10 | 2.10 | 1.62 | 1.02 | No | No | No |
| Example 79 | Yes | 0.13 | 1.92 | 1.22 | 1.08 | No | No | No |

TABLE 5-continued

| | | | | | | | | |
|---|---|---|---|---|---|---|---|---|
| Example 80 | Yes | 0.10 | 1.63 | 1.04 | 1.11 | No | No | No |
| Example 81 | Yes | 0.10 | 1.77 | 1.34 | 1.07 | No | No | No |
| Example 82 | Yes | 0.10 | 1.68 | 1.06 | 1.11 | No | No | No |
| Example 83 | Yes | 0.10 | 1.79 | 1.57 | 1.01 | No | No | No |
| Comp. Example 65 | Yes | 0.10 | 2.61 | 2.10 | 0.96 | No | No | Yes |
| Comp. Example 66 | Yes | 0.10 | 2.30 | 2.08 | 0.89 | No | Yes | Yes |
| Comp. Example 67 | Yes | 0.10 | 2.25 | 2.30 | 0.88 | No | No | Yes |
| Comp. Example 68 | Yes | 0.10 | 2.40 | 3.01 | 0.81 | No | Yes | Yes |
| Comp. Example 69 | Yes | 0.10 | 2.78 | 3.32 | 0.70 | No | Yes | Yes |
| Comp. Example 70 | Yes | 0.30 | 1.93 | 2.25 | 0.71 | No | Yes | Yes |
| Comp. Example 71 | Yes | 0.005 | 1.94 | 1.6 | 1.07 | No | Yes | Yes |
| Comp. Example 72 | No | — | 1.93 | 3.31 | 0.69 | Yes | — | Yes |
| Comp. Example 73 | Yes | 0.10 | 2.63 | 2.13 | 0.95 | No | No | Yes |
| Comp. Example 74 | Yes | 0.10 | 2.33 | 2.10 | 0.87 | No | No | Yes |
| Comp. Example 75 | Yes | 0.10 | 2.24 | 2.31 | 0.85 | No | No | Yes |
| Comp. Example 76 | Yes | 0.10 | 2.41 | 3.11 | 0.81 | No | Yes | Yes |
| Comp. Example 77 | Yes | 0.10 | 2.91 | 3.20 | 0.72 | No | Yes | Yes |
| Comp. Example 78 | No | — | 1.93 | 3.22 | 0.71 | Yes | — | Yes |
| Comp. Example 79 | Yes | 0.10 | 2.21 | 1.60 | 1.09 | Yes | Yes | Yes |
| Comp. Example 80 | Yes | 0.10 | 2.18 | 1.40 | 1.06 | Yes | Yes | Yes |

By the examples described above, it was confirmed that the nonaqueous lithium power storage element of the third embodiment, having an electrode body housed in a metal casing and having in at least a portion of the casing at least one valve capable of controlling the pressure in the casing to a low pressure, and exhibiting a high input/output characteristic, simultaneously exhibits high safety and a high load charge/discharge cycle characteristic which have not been obtainable in the prior art.

INDUSTRIAL APPLICABILITY

With the nonaqueous lithium power storage element of the invention, a plurality of nonaqueous lithium power storage elements may be connected in series or in parallel to create a power storage module. The nonaqueous lithium power storage element and power storage module of the invention may be suitably utilized in various power storage systems such as, for example: a power regenerating system of an automobile hybrid drive system; a power load-leveling system for natural power generation such as solar power generation or wind power generation, or a microgrid; an uninterruptable power source system for factory production equipment or the like; a non-contact power supply system designed for leveling of voltage fluctuation in microwave power transmission or electrolytic resonance, or energy storage; or an energy harvesting system designed for utilization of electric power generated by vibration or the like, which are purposes that require a high load charge/discharge cycle characteristic.

The nonaqueous lithium power storage element of the invention is preferably applied in a lithium ion capacitor or lithium ion secondary battery, where the effect of the invention will be maximally exhibited.

REFERENCE SIGNS LIST

1 Positive electrode active material layer $C_x$ side
2 Positive electrode active material layer $C_y$ side
3 Positive electrode power collector
4 Negative electrode active material layer $A_y$ side
5 Negative electrode power collector
6 Separator
7 Electrode laminated body
8 Casing

The invention claimed is:

1. A nonaqueous lithium power storage element having at least one positive electrode, at least one negative electrode, at least one separator, and a lithium ion-containing nonaqueous electrolytic solution,
   wherein the positive electrode has a positive electrode power collector and a positive electrode active material layer on one or both sides of the positive electrode power collector, and the positive electrode active material layer contains a positive electrode active material and a lithium compound other than the positive electrode active material,
   wherein an amount of the lithium compound is 1 weight % to 50 weight % based on the total weight of the positive electrode active material layer,
   wherein the positive electrode active material contains 50 wt % or more of an activated carbon based on the total weight of the positive electrode active material,
   wherein in elemental mapping obtained by SEM-EDX of the positive electrode surface, an area overlapping ratio $U_1$ of fluorine mapping relative to oxygen mapping, as binarized based on the average value of brightness, is 40% to 99%,
   wherein the area overlapping ratio $U_1$=100×(the area of overlapping between oxygen mapping and fluorine mapping)/(the area of oxygen mapping), in a binarized SEM-EDX elemental mapping image of the positive electrode surface,
   wherein the lithium compound is at least one selected from among lithium carbonate, lithium hydroxide and lithium oxide,
   wherein a coating film formed from a fluorine containing compound is formed on the surface of the lithium compound, and
   wherein 0.1 µm≤$G_1$≤10 µm, where $G_1$ is the mean particle diameter of the lithium compound, and 2 µm≤$H_1$≤20 µm and $G_1$<$H_1$, where $H_1$ is the mean particle diameter of the positive electrode active material.

2. The nonaqueous lithium power storage element according to claim 1, wherein an area overlapping ratio $U_2$ of fluorine mapping relative to oxygen mapping, as binarized based on the average value of brightness, is 10% to 60%, in element mapping of a Broad Ion Beam (BIB)-processed positive electrode cross-section by SEM-EDX, wherein the area overlapping ratio $U_2$ is calculated based on the following formula: $U_2$=100×(the area of overlapping between oxygen mapping and fluorine mapping)/(the area of oxygen mapping), in a binarized SEM-EDX elemental mapping image of the BIB-processed positive electrode cross-section.

3. The nonaqueous lithium power storage element according to claim 1, wherein power collectors of the positive electrode and the negative electrode are metal foils without through-holes.

4. The nonaqueous lithium power storage element according to claim 1, wherein, in an image obtained by microscopic Raman spectroscopy of a cross-section of the positive electrode, an area ratio S of carbonate ion mapping of the cross section of the positive electrode is 1% to 50%, wherein the area ratio S is calculated based on the following formula: $S=100\times$(mapping frequency for $CO_3^{2-}$ ion)/2700, in a histogram for peak areas of $CO_3^{2-}$ in the area of from 1071 $cm^{-1}$ to 1104 $cm^{-1}$ in the Raman spectra measured at 2700 points of the image obtained by microscopic Raman spectroscopy.

5. The nonaqueous lithium power storage element according to claim 1, wherein the lithium compound is lithium carbonate.

6. The nonaqueous lithium power storage element according to claim 5, which is a nonaqueous lithium power storage element comprising:
an electrode laminated body or wound electrode comprising at least two positive electrodes that contain a positive electrode active material and lithium carbonate, at least one negative electrode and at least two separators, and having the positive electrode and the negative electrode laminated or wound across the separator; and
the lithium ion-containing nonaqueous electrolytic solution;
wherein
at least one of the positive electrodes contains a nonporous positive electrode power collector and has the positive electrode active material coated on both sides of the nonporous positive electrode power collector,
at least one of the negative electrodes contains a nonporous negative electrode power collector and has a negative electrode active material capable of intercalating and releasing lithium ions coated on both sides of the nonporous negative electrode power collector,
in the electrode laminated body or wound electrode, at least one of the negative electrodes faces at least two of the positive electrodes across the separator,
the electrode laminated body or wound electrode contains the positive electrode as at least one outermost layer, the positive electrode of the outermost layer having a positive electrode active material layer $C_x$ side that does not face a negative electrode,
$C_{x1}$ is 5.0 to 25.0, where $C_{x1}$ (g/m²) is the amount of lithium carbonate per area contained on the $C_x$ side, and
$C_{y1}$ is 0.1 to 15.0 and $C_{x1} > C_{y1}$, where the $C_y$ side is the positive electrode active material layer on the back side of the $C_x$ side and $C_{y1}$ (g/m²) is the amount of lithium carbonate per area contained on the $C_y$ side.

7. The nonaqueous lithium power storage element according to claim 6, wherein $C_{x2}/C_{y2}$ is 0.86 to 1.14, where $C_{x2}$ (g/m²) is the amount of active material per area contained on the $C_x$ side, and $C_{y2}$ (g/m²) is the amount of active material per area contained on the C side.

8. The nonaqueous lithium power storage element according to claim 6, wherein in an image obtained by microscopic Raman spectroscopy of the $C_x$ side, $S_x$ is 10% to 50%, where $S_x$ is the area ratio of carbonate ion mapping, wherein the area ratio $S_x$ is calculated based on the following formula: $S_x=100\times$(mapping frequency for $CO_3^{2-}$ ion)/2700, in a histogram for peak areas of $CO_3^{2-}$ in the area of from 1071 $cm^{-1}$ to 1104 $cm^{-1}$ in the Raman spectra measured at 2700 points of the image obtained by microscopic Raman spectroscopy.

9. The nonaqueous lithium power storage element according to claim 8, wherein in an image obtained by microscopic Raman spectroscopy of the $C_y$ side, $S_y$ is 1% to 40% and $S_y < S_x$, where $S_y$ is the area ratio of carbonate ion mapping, wherein the area ratio $S_y$ is calculated based on the following formula: $S_x=100\times$(mapping frequency for $CO_3^{2-}$ ion)/2700, in a histogram for peak areas of $CO_3^{2-}$ in the area of from 1071 $cm^{-1}$ to 1104 $cm^{-1}$ in the Raman spectra measured at 2700 points of the image obtained by microscopic Raman spectroscopy.

10. The nonaqueous lithium power storage element according to claim 6, wherein
the $C_y$ side contains one or more compounds represented by the following formulas (1) to (3):

$$LiX^1\text{—}OR^1O\text{—}X^2Li \qquad \text{formula (1)}$$

where $R^1$ is an alkylene group of 1 to 4 carbon atoms or a halogenated alkylene group of 1 to 4 carbon atoms, and $X^1$ and $X^2$ respectively and independently represent $-(COO)_n$ (where n is 0 or 1), $$LiX^1\text{—}OR^1O\text{—}X^2R^2 \qquad \text{formula (2)}$$

where $R^1$ is an alkylene group of 1 to 4 carbon atoms or a halogenated alkylene group of 1 to 4 carbon atoms, $R^2$ is hydrogen, an alkyl group of 1 to 10 carbon atoms, a mono- or polyhydroxyalkyl group of 1 to 10 carbon atoms, an alkenyl group of 2 to 10 carbon atoms, a mono- or polyhydroxyalkenyl group of 2 to 10 carbon atoms, a cycloalkyl group of 3 to 6 carbon atoms, or an aryl group, and $X^1$ and $X^2$ respectively and independently represent $-(COO)_n$ (where n is 0 or 1), and $$R^2X^1\text{—}OR^1O\text{—}X^2R^3 \qquad \text{formula (3)}$$

where $R^1$ is an alkylene group of 1 to 4 carbon atoms or a halogenated alkylene group of 1 to 4 carbon atoms, $R^2$ and $R^3$ respectively and independently represent hydrogen, an alkyl group of 1 to 10 carbon atoms, a polyhydroxyalkyl group of 1 to 10 carbon atoms, an alkenyl group of 2 to 10 carbon atoms, a mono- or polyhydroxyalkenyl group of 2 to 10 carbon atoms, a cycloalkyl group of 3 to 6 carbon atoms or an aryl group, and $X^1$ and $X^2$ respectively and independently represent $-(COO)_n$ (where n is 0 or 1), and
$C_{y3}$ is $1.60\times10^{-4}$ to $300\times10^{-4}$, where $C_{y3}$ (mol/g) is the total content of the compound represented by formulas (1) to (3) per unit weight on the $C_y$ side.

11. The nonaqueous lithium power storage element according to claim 10, wherein $C_{y3}/A_{y3}$ is 0.2 to 20, where $A_{y3}$ (mol/g) is the total content of the compound represented by formulas (1) to (3) on $A_y$ side of the negative electrode active material layer that faces the $C_y$ side.

12. The nonaqueous lithium power storage element according to claim 1, comprising an electrode laminated body or wound electrode having the positive electrode and the negative electrode laminated or wound across the separator, and the lithium ion-containing nonaqueous electrolytic solution, in a metal casing, wherein
the casing has at least one valve capable of controlling the pressure in the casing,
the negative electrode has a negative electrode power collector and a negative electrode active material layer on one or both sides of the negative electrode power collector, and the negative electrode active material layer comprises a negative electrode active material that can intercalate and release lithium ions.

13. The nonaqueous lithium power storage element according to claim 12, wherein the metal casing is rectilinear.

14. The nonaqueous lithium power storage element according to claim 12, wherein the metal casing is cylindrical.

15. The nonaqueous lithium power storage element according to claim 12, wherein the nonaqueous electrolytic solution comprises at least one organic solvent selected from the group consisting of ethylene carbonate, propylene carbonate, butylene carbonate, vinylene carbonate and fluoroethylene carbonate.

16. The nonaqueous lithium power storage element according to claim 12, wherein the nonaqueous electrolytic solution contains at least one from among $LiPF_6$ and $LiBF_4$.

17. The nonaqueous lithium power storage element according to claim 12, wherein a concentration of $LiN(SO_2F)_2$ in the nonaqueous electrolytic solution is 0.3 mol/L to 1.5 mol/L based on the total amount of the nonaqueous electrolytic solution.

18. The nonaqueous lithium power storage element according to claim 12, wherein a value calculated by dividing atomic % of fluorine atoms by atomic % of carbon atoms obtained by XPS (X-ray photoelectron spectroscopy) measurement of the separator surface, is $1.0 \times 10^{-2}$ to $10 \times 10^{-2}$.

19. The nonaqueous lithium power storage element according to claim 12, wherein in SEM observation of the surface of the separator, the number of particulates of 50 nm to 500 nm on the separator surface is $1.5/\mu m^2$ to $15/\mu m^2$.

20. The nonaqueous lithium power storage element according to claim 1, wherein the positive electrode active material in the positive electrode active material layer is activated carbon satisfying $0.3 < V_1 \leq 0.8$ and $0.5 \leq V_2 \leq 1.0$, where $V_1$ (cc/g) is the mesopore volume due to pores with diameters of 20 Å to 500 Å as calculated by a BJH method, and $V_2$ (cc/g) is the micropore volume due to pores with diameters of smaller than 20 Å as calculated by a MP method, and has a specific surface area of 1,500 $m^2/g$ to 3,000 $m^2/g$, as measured by a BET method.

21. The nonaqueous lithium power storage element according to claim 1, wherein the positive electrode active material in the positive electrode active material layer is activated carbon in which the mesopore volume due to pores with diameters of 20 Å to 500 Å as calculated by a BJH method $V_1$ (cc/g) satisfies $0.8 < V_1 \leq 2.5$, the micropore volume due to pores with diameters of smaller than 20 Å as calculated by a MP method $V_2$ (cc/g) satisfies $0.8 < V_2 \leq 3.0$, and the specific surface area as measured by a BET method is 2,300 $m^2/g$ to 4,000 $m^2/g$.

22. The nonaqueous lithium power storage element according to claim 1, wherein the negative electrode contains a negative electrode active material, and a doping amount of lithium ion in the negative electrode active material is 530 mAh/g to 2,500 mAh/g per unit weight.

23. The nonaqueous lithium power storage element according to claim 1, wherein the negative electrode contains a negative electrode active material, and a BET specific surface area of the negative electrode active material is 100 $m^2/g$ to 1,500 $m^2/g$.

24. The nonaqueous lithium power storage element according to claim 1, wherein the negative electrode contains a negative electrode active material, and a doping amount of lithium ion in the negative electrode active material is 50 mAh/g to 700 mAh/g per unit weight.

25. The nonaqueous lithium power storage element according to claim 1, wherein the negative electrode contains a negative electrode active material, and a BET specific surface area of the negative electrode active material is 1 $m^2/g$ to 50 $m^2/g$.

26. The nonaqueous lithium power storage element according to claim 1, wherein the negative electrode contains a negative electrode active material, and a mean particle diameter of the negative electrode active material is 1 μm to 10 μm.

27. A power storage device, comprising:
a nonaqueous lithium power storage element having at least one positive electrode, at least one negative electrode, at least one separator, and a lithium ion-containing nonaqueous electrolytic solution,
wherein the positive electrode has a positive electrode power collector and a positive electrode active material layer on one or both sides of the positive electrode power collector, and the positive electrode active material layer contains a positive electrode active material and a lithium compound other than the positive electrode active material,
wherein an amount of the lithium compound is 1 weight % to 50 weight % based on the total weight of the positive electrode active material layer,
wherein the positive electrode active material contains 50 wt % or more of an activated carbon based on the total weight of the positive electrode active material,
wherein in elemental mapping obtained by SEM-EDX of the positive electrode surface, an area overlapping ratio $U_1$ of fluorine mapping relative to oxygen mapping, as binarized based on the average value of brightness, is 40% to 99%,
wherein the area overlapping ratio $U_1 = 100 \times$(the area of overlapping between oxygen mapping and fluorine mapping)/(the area of oxygen mapping), in a binarized SEM-EDX elemental mapping image of the positive electrode surface,
wherein the lithium compound is at least one selected from among lithium carbonate, lithium hydroxide and lithium oxide,
wherein a coating film formed from a fluorine containing compound is formed on the surface of the lithium compound, and
wherein $0.1 \mu m \leq G_1 \leq 10 \mu m$, where $G_1$ is the mean particle diameter of the lithium compound, and $2 \mu m \leq H_1 \leq 20 \mu m$ and $G_1 < H_1$, where $H_1$ is the mean particle diameter of the positive electrode active material.

28. The power storage device according to claim 27, wherein the power storage device is a power storage module, an uninterruptable power source system, a non-contact power supply system, or a power storage system.

29. A power-related system, comprising:
a nonaqueous lithium power storage element having at least one positive electrode, at least one negative electrode, at least one separator, and a lithium ion-containing nonaqueous electrolytic solution,
wherein the positive electrode has a positive electrode power collector and a positive electrode active material layer on one or both sides of the positive electrode power collector, and the positive electrode active material layer contains a positive electrode active material and a lithium compound other than the positive electrode active material,
wherein an amount of the lithium compound is 1 weight % to 50 weight % based on the total weight of the positive electrode active material layer, wherein the positive electrode active material contains 50 wt % or more of an activated carbon based on the total weight of the positive electrode active material, wherein in elemental mapping obtained by SEM-EDX of the positive electrode surface, an area overlapping ratio $U_1$ of fluorine mapping relative to oxygen mapping, as binarized based on the average value of brightness, is 40% to 99%, wherein the area overlapping ratio $U_1$=100×(the area of overlapping between oxygen mapping and fluorine mapping)/(the area of oxygen mapping), in a binarized SEM-EDX elemental mapping image of the positive electrode surface, wherein the lithium compound is at least one selected from among lithium carbonate, lithium hydroxide and lithium oxide, wherein a coating film formed from a fluorine containing compound is formed on the surface of the lithium compound, and wherein 0.1 µm≤$G_1$≤10 µm, where $G_1$ is the mean particle diameter of the lithium compound, and 2 µm≤$H_1$≤20 µm and $G_1$<$H_1$ where $H_1$ is the mean particle diameter of the positive electrode active material.

30. The power-related system according to claim 29, wherein the power storage is a power regenerating system, a power load-leveling system, or an energy harvesting system.

\* \* \* \* \*